(12) United States Patent
Tanaka et al.

(10) Patent No.: US 7,406,252 B2
(45) Date of Patent: Jul. 29, 2008

(54) ENCODING APPARATUS OF AUDIO SIGNAL, AUDIO DISC AND DISC REPRODUCING APPARATUS

(75) Inventors: Yoshiaki Tanaka, Fujisawa (JP); Shoji Ueno, Fujisawa (JP); Norihiko Fuchigami, Yamato (JP)

(73) Assignee: Victor Company of Japan, Ltd. (JP)

( * ) Notice: Subject to any disclaimer, the term of this patent is extended or adjusted under 35 U.S.C. 154(b) by 1050 days.

(21) Appl. No.: 10/464,783

(22) Filed: Jun. 17, 2003

(65) Prior Publication Data

US 2003/0215219 A1    Nov. 20, 2003

Related U.S. Application Data

(62) Division of application No. 09/197,171, filed on Nov. 20, 1998, now Pat. No. 6,618,551.

(30) Foreign Application Priority Data

Nov. 21, 1997  (JP)  ................................. 9-337714
Nov. 28, 1997  (JP)  ................................. 9-369983

(51) Int. Cl.
*H04N 5/91* (2006.01)
(52) U.S. Cl. .............................. 386/96; 386/39; 386/65
(58) Field of Classification Search ................... None
See application file for complete search history.

(56) References Cited

U.S. PATENT DOCUMENTS 4,698,695 A    10/1987   Kosaka et al.

(Continued)

FOREIGN PATENT DOCUMENTS

DE    29619764    1/1997

(Continued)

OTHER PUBLICATIONS

National Technical Report, vol. 43, No. 3, Jun. 1997, "Outline of DVD Standard" pp. 223-229, by M. Moriya et al, English Abstract.

(Continued)

*Primary Examiner*—John W. Miller
*Assistant Examiner*—James A. Fletcher
(74) *Attorney, Agent, or Firm*—Baker & Hostetler

(57) ABSTRACT

DVD-video data and DVD-audio data are recorded in a DVD-Avd disc. The DVD-audio data is composed of an audio manager having an audio manager information, an audio manager menu, a first audio title set including first audio data and a second audio title set including second audio data. The first audio data of the first audio title set is connected with audio contents included in the DVD-video data, and a real time information (RTI). pack or a still picture (SPCT) pack is included in the second audio title set. Therefore, the audio contents of the DVD-video data and the audio data of the DVD-audio data are managed by the audio manager information, and text information indicated by real time information or a still picture is displayed while reproducing the audio data. Also, DVD-video data recorded in a DVD-video disc, which is normally reproduced by using a reproducing apparatus dedicated to the DVD-video disc, can be reproduced by using a reproducing apparatus for the DVD-Avd disc.

1 Claim, 46 Drawing Sheets

U.S. PATENT DOCUMENTS

| | | | |
|---|---|---|---|
| 5,309,249 A | 5/1994 | Ishii | |
| 5,652,824 A * | 7/1997 | Hirayama et al. | 386/95 |
| 5,687,160 A | 11/1997 | Aotake et al. | |
| 5,745,643 A | 4/1998 | Mishina | |
| 5,757,742 A | 5/1998 | Akiba et al. | |
| 5,761,374 A | 6/1998 | Kagoshima | |
| 5,812,736 A * | 9/1998 | Anderson | 386/96 |
| 5,844,513 A | 12/1998 | Nishio | |
| 5,859,602 A | 1/1999 | Tanaka et al. | |
| 5,892,848 A | 4/1999 | Nishiwaki et al. | |
| 5,963,705 A | 10/1999 | Kim et al. | |
| 5,999,694 A | 12/1999 | Yasuda et al. | |
| 6,122,436 A * | 9/2000 | Okada et al. | 386/126 |
| 6,222,983 B1 | 4/2001 | Heo | |
| 6,449,227 B1 | 9/2002 | Heo | |

FOREIGN PATENT DOCUMENTS

| | | |
|---|---|---|
| EP | 0325325 | 7/1989 |
| EP | 0464482 | 1/1992 |
| EP | 0677848 | 10/1995 |
| EP | 0714098 | 5/1996 |
| EP | 0795870 | 9/1997 |
| EP | 0817195 | 1/1998 |
| EP | 0855715 | 7/1998 |
| EP | 0856849 | 8/1998 |
| EP | 0867877 | 9/1998 |
| EP | 0892404 | 1/1999 |
| EP | 0896335 | 2/1999 |
| JP | 8-273304 | 10/1996 |
| JP | 09-120645 | 5/1997 |
| JP | 09-120647 | 5/1997 |
| WO | 9715924 | 5/1997 |
| WO | WO 9715924 | 5/1997 |

OTHER PUBLICATIONS

An Audio Engineering Society Prepring, Sep. 1997, "DVD-Audio Format" PS. 1-8, by E. Funasaka.

* cited by examiner

AUDIO MANAGER INFORMATION

| |
|---|
| AMGI MANAGEMENT TABLE (AMGI-MAT) |
| TITLE SEARCH POINTER TABLE (T-SRPT) |
| AUDIO MANAGER MENU PGCI UNIT TABLE (AMGM-PGCI-UT) |
| PAIR RENTAL MANAGEMENT INFORMATION TABLE (PTL-MAIT) |
| AUDIO TITLE SET-ATTRIBUTE TABLE (ATS-ATRT) |
| TEXT DATA MANAGER (TXTDT-MG) |
| AUDIO MANAGER MENU CELL ADDRESS TABLE (AMGM-C-ADT) |
| AUDIO MANAGER MENU-AUDIO CONTENTS BLOCK UNIT-ADDRESS MAP (AMGM-ACBU-ADMAP) |

} REFER TO FIG. 5

*FIG. 4*

| AUDIO TITLE SET-ATTRIBUTE DATA (ATS-ATR) | |
|---|---|
| END ADDRESS (ATS-ATR-EA) | 4 BYTES |
| CATEGORY (ATS-CAT) | 4 BYTES |
| INFORMATION (ATS-ATRI) | 768 BYTES |

AUDIO TITLE SET INFORMATION-MANAGEMENT TABLE (ATSI-MAT)

| |
|---|
| IDENTIFIER (ATS-ID) |
| END ADDRESS (ATS-EA) |
| END ADDRESS (ATSI-EA) |
| VERSION NUMBER (VERN) |
| CATEGORY (ATS-CAT) |
| ATSI-MAT-EA |
| START ADDRESS (ATSM-ACBS-SA) |
| ATST-ACBS-SA |
| ATS-PTA-SRPT-SA |
| ATS-PGCIT-SA |
| ATSM-PGCI-UT-SA |
| ATS-TMAP-SA |
| ATSM-C-ADT-SA |
| ATSM-ACBU-ADMAP-SA |
| ⁓ |
| AUDIO STREAM-ATTRIBUTE DATA (ATSM-AST-ATR) |
| THE NUMBER OF AUDIO OF STREAMS (ATS-AST-Ns) |
| AUDIO STEAM-ATTRIBUTE TABLE (ATS-AST-ATRT) |

REFER TO FIG. 9

REFER TO FIG. 10

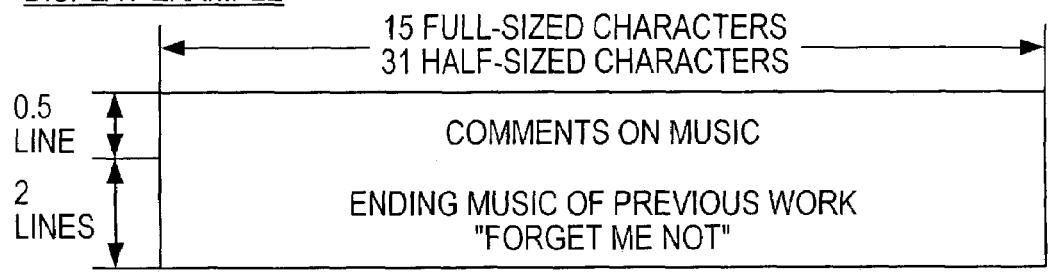

DISPLAY EXAMPLE

|←— 15 FULL-SIZED CHARACTERS —→|
|←— 31 HALF-SIZED CHARACTERS —→|

0.5 LINE

2 LINES

COMMENTS ON MUSIC

ENDING MUSIC OF PREVIOUS WORK
"FORGET ME NOT"

FIG. 17

AUDIO SEARCH DATA (ASD)

| | |
|---|---|
| GENERAL INFORMATION | 16 BYTES |
| CURRENT NUMBER INFORMATION | 8 BYTES |
| CURRENT DATE AND TIME INFORMATION | 16 BYTES |
| TITLE SET SEARCH INFORMATION | 8 BYTES |
| TITLE SEARCH INFORMATION | 8 BYTES |
| TRACK SEARCH INFORMATION | 404 BYTES |
| INDEX SEARCH INFORMATION | 408 BYTES |
| HIGHLIGHT SEARCH INFORMATION | 80 BYTES |
| RESERVED AREA | 52 BYTES |

| AUDIO MANAGER INFORMATION (AMGI) | |
|---|---|
| AMGI MANAGEMENT TABLE (AMGI-MAT) | |
| TITLE SEARCH POINTER TABLE (T-SRPT) | |
| AUDIO MANAGER MENU PGCI UNIT TABLE (AMGM-PGCI-UT) | |
| PAIR RENTAL MANAGEMENT INFORMATION TABLE (PTL-MAIT) | |
| AUDIO TITLE SET ATTRIBUTE TABLE (ATS-ATRT) | REFER TO FIG. 5 |
| TEXT DATA MANAGER (TXTDT-MG) | |
| AMGM CELL ADDRESS TABLE (AMGM-C-ADT) | |
| AMGM-ACBU-ADDRESS MAP (AMGM-ACBU-ADMAP) | |
| TOC INFORMATION | REFER TO FIG. 22 |

| FRAME NO. | POINT | PMIN | PSEC | PFRAME |
|---|---|---|---|---|
| n | 01 | 00 | 02 | 32 |
| n+1 | 01 | 00 | 02 | 32 |
| n+2 | 01 | 00 | 02 | 32 |
| n+3 | 02 | 10 | 15 | 12 |
| n+4 | 02 | 10 | 15 | 12 |
| n+5 | 02 | 10 | 15 | 12 |
| n+6 | 03 | 16 | 28 | 63 |
| n+7 | 03 | 16 | 28 | 63 |
| n+8 | 03 | 16 | 28 | 63 |
| n+9 | 04 | . | . | . |
| n+10 | 04 | . | . | . |
| n+11 | 04 | . | . | . |
| n+12 | 05 | . | . | . |
| n+13 | 05 | . | . | . |
| n+14 | 05 | . | . | . |
| n+15 | 06 | 49 | 10 | 03 |
| n+16 | 06 | 49 | 10 | 03 |
| n+17 | 06 | 49 | 10 | 03 |
| n+18 | A0 | 01 | 00 | 00 |
| n+19 | A0 | 01 | 00 | 00 |
| n+20 | A0 | 01 | 00 | 00 |
| n+21 | A1 | 06 | 00 | 00 |
| n+22 | A1 | 06 | 00 | 00 |
| n+23 | A1 | 06 | 00 | 00 |
| n+24 | A2 | 52 | 48 | 41 |
| n+25 | A2 | 52 | 48 | 41 |
| n+26 | A2 | 52 | 48 | 41 |
| n+27 | 01 | 00 | 02 | 32 |
| n+28 | 01 | 00 | 02 | 32 |

1 SET (n through n+26)

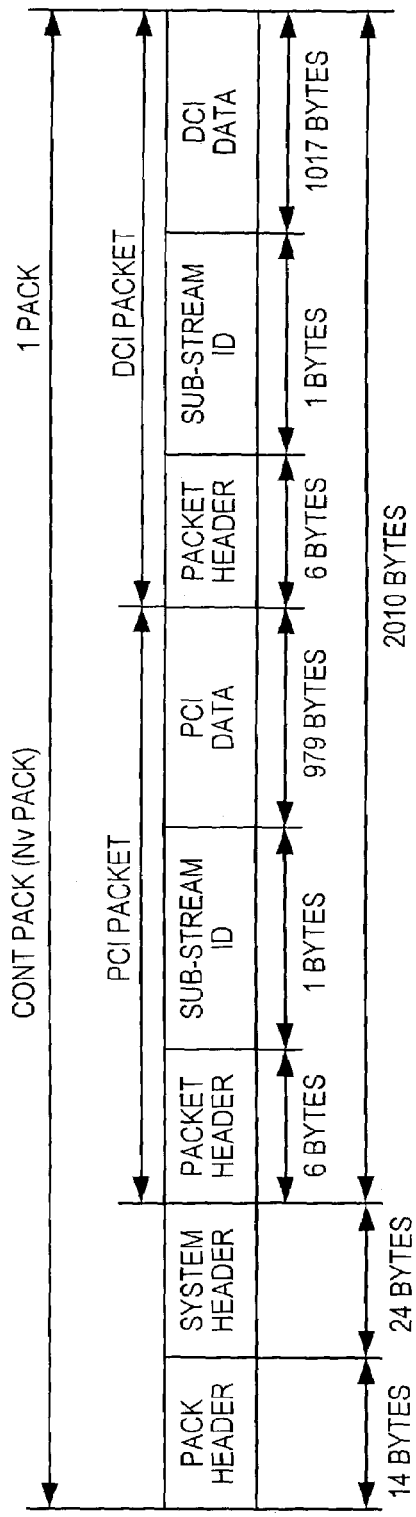

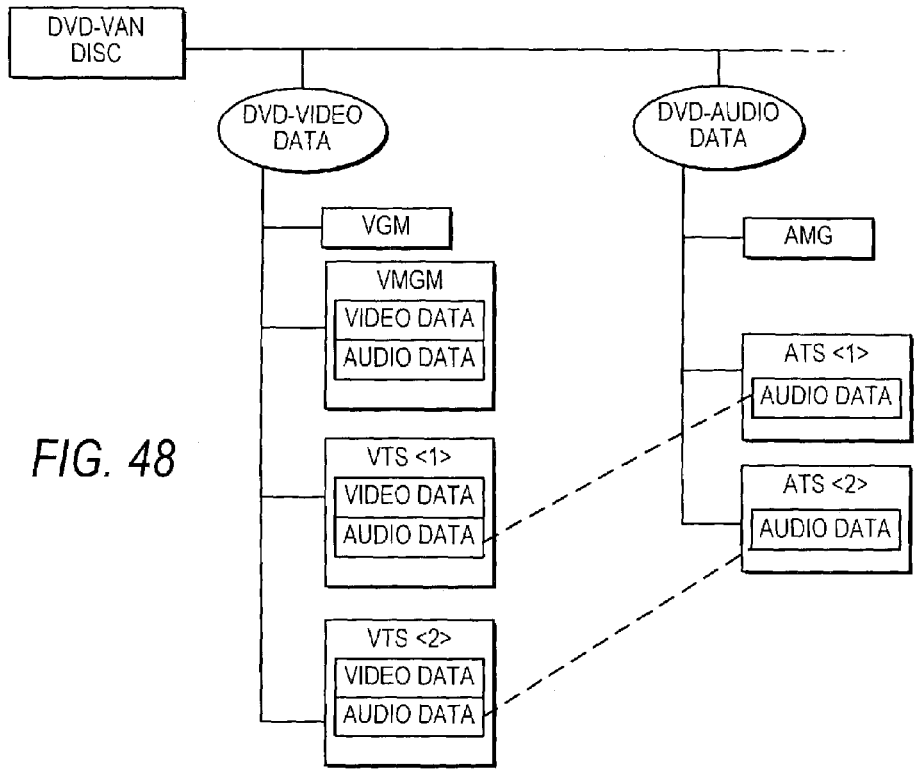
FIG. 48
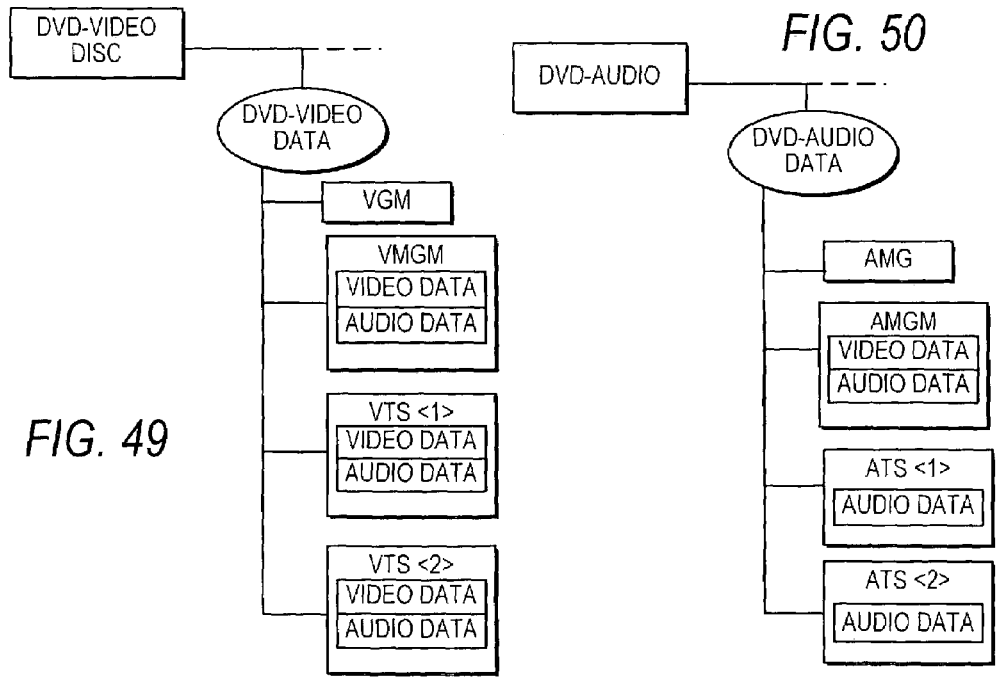
FIG. 49
FIG. 50

ATSI-MAT

| BYTE NO. | FIELD | THE NUMBER OF BYTES |
|---|---|---|
| 0~11 | ATS IDENTIFIER (ATS-ID) | 12 |
| 12~15 | ATS END ADDRESS (ATS-EA) | 4 |
| 16~27 | RESERVED | 12 |
| 28~31 | ATSI END ADDRESS (ATSI-EA) | 4 |
| 32~33 | VERSION NUMBER (VERN) | 2 |
| 34~127 | RESERVED | 94 |
| 128~131 | ATSI-MAT END ADDRESS | 4 |
| 132~191 | RESERVED | 60 |
| 192~195 | AOTT VTS START ADDRESS | 4 |
| 196~199 | AOTT AOBS START ADDRESS | 4 |
| 200~203 | (AOTT VOBS START ADDRESS) RESERVED | 4 |
| 204~207 | ATS-PGCIT START ADDRESS | 4 |
| 208~255 | RESERVED | 48 |
| 256~383 | AOTT-AOB-ATR, AOTT-VOB-AST-ATR | 128 |
| 384~671 | ATS-DM-COEFT #0~#15 | 288 |
| 672~703 | RESERVED | 32 |
| 704~705 | STILL PICTURE DATA ATTRIBUTE (ATS-SPCT-ATR) | 2 |
| 706~2047 | RESERVED | 1342 |

FIG. 51D

LINEAR PCM MODE-PRIVATE HEADER

| FIELD | THE NUMBER OF BITS | THE NUMBER OF BYTES |
|---|---|---|
| SUB-STREAM ID | 8 | 1 |
| RESERVED | 4 | 1 |
| ISRC NUMBER | 4 | |
| ISRC DATA | 8 | 1 |
| PRIVATE HEADER LENGTH | 8 | 1 |
| FIRST ACCESS UNIT POINTER | 16 | 2 |
| AUDIO EMPHASIS FLAG F1 | 1 | 1 |
| AUDIO EMPHASIS FLAG F2 | 1 | |
| RESERVED | 1 | |
| DOWN MIX CODE | 5 | |
| QUANTIZATION WORD LENGTH 1 | 4 | 1 |
| QUANTIZATION WORD LENGTH 2 | 4 | |
| AUDIO SAMPLING FREQUENCY Fs1 | 4 | 1 |
| AUDIO SAMPLING FREQUENCY Fs2 | 4 | |
| RESERVED | 4 | 1 |
| MULTI-CHANNEL TYPE | 4 | |
| CHANNEL ALLOCATION 1 | 4 | 1 |
| CHANNEL ALLOCATION 2 | 4 | |
| DYNAMIC RANGE CONTROL | 8 | 1 |
| STUFFING BYTES | — | 0~7 |

FIG. 52

ENCODING APPARATUS OF AUDIO SIGNAL, AUDIO DISC AND DISC REPRODUCING APPARATUS

This is a divisional application of U.S. patent application Ser. No. 09/197,171 in the name of TANAKA, et al filed on Nov. 20, 1998 now U.S. Pat. No. 6,618,551.

BACKGROUND OF THE INVENTION

1. Field of the Invention

The present invention relates to an audio disc in which an audio signal of text information indicating a music name or the like is recorded, an encoding apparatus in which the audio signal of the text information is recorded in the audio disc, and a disc reproducing apparatus in which the audio signal recorded in the audio disc is reproduced to display the text information indicated by the audio signal.

2. Description of the Related Art 2.1. Previously Proposed Art:

A conventional compact disc (CD) has been known as a conventional audio signal reproducing optical disc. Also, a digital video disc (DVD) has been recently known as an optical disc having a packing density higher than the CD.

Also, another conventional compact disc (CD) has been known as a storage medium in which text information (or character information) indicating a music name of each music source is recorded as an audio signal with control information. In this conventional CD, sub-codes of 8 bits such as P, Q, R, S, T, U, V and W are prepared. When text information is recorded in the conventional CD, channels of 6 bits composed of R, S, T, U, V and W are used.

2.2. First Problems to be Solved by the Invention:

However, in cases where both a video signal and an audio signal are recorded in the DVD, the video signal is primarily recorded in the DVD (hereinafter, this type of DVD is called DVD-video disc), and the recording of the audio signal is subordinated to the recording of the video signal. Therefore, there are following problems.

First, the audio signal is integrally formed with the video signal, and the audio signal and the video signal are recorded as a set. Therefore, a memory capacity for the audio signal is considerably lower than that for the video signal.

Secondly, a time management for the audio signal cannot be performed independent of the video signal.

Thirdly, simple text information such as a music name cannot be read out from the DVD-video disc.

Also, because users for the audio signal require a broaden usage from the DVD-video disc as compared with users for the video signal, a simple reproducing method is required of the DVD-video disc. For example, the users for the audio signal desires to arrange an area of table-of-contents (TOC) in the DVD-video disc in the same manner as in the CD. However, in the DVD-video disc, a video contents block unit is composed of a navigation control pack (CONT pack), a plurality of video packs and a plurality of audio packs, and the reproduction of the video and audio packs is controlled by using the CONT pack. Therefore, even though the audio signal is primarily recorded in the DVD-video disc independence of the video signal, a user cannot easily reproduce the audio signal, so that there is a problem that the DVD-video disc is not very useful for the user.

Also, the time management in the DVD-video disc is performed for each video frame. Therefore, even though the audio signal is primarily recorded in the DVD-video disc independence of the video signal, because it is important to continuously reproduce the audio signal as compared with the video signal, there is a problem that it is difficult to perform a time management for the audio signal in real time.

Also, the DVD-video disc and a DVD-video disc reproducing apparatus dedicated to the DVD-video disc are put on the market. In this DVD-video disc reproducing apparatus, a signal recorded in a music CD or a video CD can be reproduced as well as a signal recorded in the DVD-video disc. However, users desire a disc reproducing apparatus in which an audio signal recorded in any type DVD can be reproduced as well as the reproduction of an audio signal primarily recorded in a DVD (hereinafter, this type of DVD is called DVD-audio disc)

2.3. Second Problems to be Solved by the Invention:

Also, text information indicating contents of a music source and other information are recorded in the conventional CD by scatteringly arranging the text information and the other information in a storage region of the conventional CD. In this case, it is difficult, for example, to display the text information and the other information while the text information and the other information follow the music source reproduced and while promptly changing the text information and the other information. Therefore, there is a problem that a text indicated by a video signal cannot be effectively displayed in connection with the music source indicated by an audio signal.

In general, in cases where a dialogue (or a caption) superimposed on a moving picture such as a movie is recorded in a digital versatile disc (DVD)-video disc, text information represented by the dialogue is recorded by successively arranging the text information in a storage region of the DVD-video disc. However, because audio data such as a music source is primarily recorded in the DVD-audio disc as compared with the DVD, there is a problem that a specific storage region allocated to the audio data is considerably reduced in the DVD-audio disc in cases where text information is successively arranged in a storage region of the DVD-audio disc.

SUMMARY OF THE INVENTION

A first object of the present invention is to provide, with due consideration to the drawbacks of such a conventional audio disc and a conventional disc reproducing apparatus, an audio disc in which an audio signal primarily recorded is easily read out without any troublesomeness, a real time management is easily. performed and the audio signal is producible by using a DVD video player, and a disc reproducing apparatus in which the audio signal recorded in the audio disc is reproduced.

A second object of the present invention is to provide an audio disc in which audio data of a music source or the like is primarily recorded while effectively recording text information indicating contents of the music source or the like, an encoding apparatus in which the text information is encoded so as to effectively record the text information in the audio disc with the audio data primarily recorded, and a disc reproducing apparatus in which the text information recorded in the audio disc is effectively reproduced and displayed.

The first object is achieved by the provision of an audio disc having a data structure comprising:

a video title set;

a first managing area (VMG) including information (VMGI) for managing the video title set;

an audio title set not including a pack for reproduction control but including audio data; and a second managing area (AMG) including information (AMGI) for managing the audio title set and managing audio contents of the video title set.

In the above configuration, because the audio title set is not managed by the information (VMGI) of the first managing area (VMG) but is managed by the information (AMGI) of the second managing area (AMG), the audio data can be recorded independent of video data of the video title set. Therefore, time of an audio signal reproduced from the audio data can be easily managed. Also, in cases where text information or still picture data is recorded in the disc, the text information or the still picture data can be easily reproduced at a predetermined time while reproducing the audio data.

Also, the first object is achieved by the provision of an audio disc reproducing apparatus for reproducing data recorded in an audio disc, of which a data structure comprises:

a video title set;

a first managing area (VMG) including information (VMGI) for managing the video title set;

an audio title set not including a pack for reproduction control but including audio data; and a second managing area (AMG) including information (AMGI) for managing the audio title set and managing audio contents of the video title set, the audio disc reproducing apparatus comprising:

reproducing means for reproducing the audio contents of the video title set and the audio data of the audio title set by using the information of the second managing area.

In the above configuration, because the audio title set and managing audio contents of the video title set are managed by the information (AMGI) of the second managing area (AMG), the audio contents of the video title set and the audio data of the audio title set can be reproduced by using the information of the second managing area. Also, because the audio title set is not managed by the information (VMGI) of the first managing area (VMG) but is managed by the information (AMGI) of the second managing area (AMG), the audio data can be recorded independent of video data of the video title set. Therefore, time of an audio signal reproduced from the audio data can be easily managed. Also, in cases where text information or still picture data is recorded in the disc, the text information or the still picture data can be easily reproduced at a predetermined time while reproducing the audio data.

Also, the first object is achieved by the provision of an audio disc reproducing apparatus for reproducing data recorded in an audio disc, of which a data structure comprises:

a video title set;

a first managing area (VMG) including information (VMGI) for managing the video title set;

an audio title set not including a pack for reproduction control but including either first audio data obtained by performing an analog-digital conversion for an analog audio signal at a first sampling frequency or second audio data obtained by performing an analog-digital conversion for an analog audio signal at a second sampling frequency; and a second managing area (AMG) including information (AMGI) for managing the audio title set and managing audio contents of the video title set, the audio disc reproducing apparatus comprising:

first reproducing means for reproducing a first analog audio signal by performing a digital-analog conversion for the first audio data; and second reproducing means for reproducing a second analog audio signal by performing a digital-analog conversion, for the second audio data.

In the above configuration, regardless of whether audio data of the audio title set is converted at a first sampling frequency or at a second sampling frequency, the audio data can be reproduced.

Also, the first object is achieved by the provision of an audio disc having a data structure comprising:

an audio title set having audio data and still picture data;

a video title set;

a first managing area (VMG) including information for managing the video title set;

a second managing area (AMG) including information for managing the audio title set and the video title set; and TOC information.

In the above configuration, because TOC information is recorded in the audio disc, audio data of the audio title set can be easily reproduced. Also, because still picture data is arranged in the audio title set, a recording capacity of video data can be reduced, and an audio signal can be mainly recorded independent of the video data. Also, because still picture data is arranged in the audio title set, a still picture indicated by the still picture data can be easily displayed while reproducing the audio data.

The second object is achieved by the provision of an audio signal encoding apparatus, comprising:

formatting means for formatting an audio dedicated title having audio data to a data structure in which the audio data of the title is arranged in a first pack, text information relating to the audio data of the first pack and display time control data for controlling a display time of the text information are arranged in a second pack, and information for managing the reproduction of the first pack is arranged in a managing area of audio manager information (AMGI).

Also, the second object is achieved by the provision of a disc having a data structure in which a first pack including audio data, a second pack including both text information relating to the audio data of the first pack and display time control data for controlling a display time of the text information and an audio manager information (AMGI) managing area including information for managing the reproduction of the first pack are arranged as an audio dedicated title.

In the above configuration, because a disc has a data structure composed of audio data of a first pack and text information and display time control data of a second pack, audio data can be primarily recorded while effectively recording text information, and the text information can be encoded so as to effectively record the text information in the audio disc with the audio data primarily recorded. Also, the text information can be reproduced at a predetermined time according to the display time control data while reproducing the audio data.

Also, the second object is achieved by the provision of an audio signal encoding apparatus of a disc, in which a title having first audio data and video data and an audio dedicated title having second audio data are recorded, comprising:

formatting means for formatting the audio dedicated title to a data structure, in which the second audio data of the audio dedicated title is arranged in a first pack, text information relating to the second audio data of the first pack and display time control data for controlling a display time of the text information are arranged in a second pack and information for managing the reproduction of the first pack is arranged in a managing area of audio manager information (AMGI), and formatting the title having first audio data and video data to a data structure in which the first audio data of the title is arranged in a first pack, the video data is arranged in a third pack, information for controlling the reproduction of the first and third packs is arranged in a navigation pack of a prescribed standard, and information for managing the reproduction of the first and third packs is arranged in a managing area of video manager information (VMGI).

Also, the second object is achieved by the provision of a disc having a data structure in which a first pack including audio data, a second pack including both text information relating to the audio data of the first pack and display time control data for controlling a display time of the text information and an audio manager information (AMGI) managing area including information for managing the reproduction of the first pack are arranged as an audio dedicated title having the audio data and in which a first pack including audio data, a third pack including video data, a navigation pack of a prescribed standard including information for controlling the reproduction of the first and third packs and a video manager information (VMGI) managing area including information for managing the reproduction of the first and third packs are arranged as a title having the audio data and the video data.

In the above configuration, in case of the audio dedicated title, audio data is arranged in a first pack such as an audio pack, text information and display time control data are arranged in a second pack such as a D pack, and audio manager information is arranged in a managing area. In case of the title having first audio data and video data, audio data is arranged in a first pack such as an audio pack, video data is arranged in a third pack such as a video pack, control information is arranged in a navigation pack (or a CONT pack), and video manager information is arranged in a managing area.

Therefore, regardless of the audio dedicated title or the title having first audio data and video data, the title can be reliably encoded. Also, in case of the audio dedicated title, audio data can be primarily recorded while effectively recording text information, and the text information can be encoded so as to effectively record the text information in the audio disc with the audio data primarily recorded.

Also, the second object is achieved by the provision of a disc reproducing apparatus for reproducing data recorded in a disc having a data structure in which a first pack including audio data, a second pack including both text information relating to the audio data of the first pack and display time control data for controlling a display time of the text information and an audio manager information (AMGI) managing area including information for managing the reproduction of the first pack are arranged as an audio dedicated title, comprising:

reproducing means for reproducing the audio data of the first pack and the text information and the display time control data of the second pack;

first decoding means for decoding the text information reproduced by the reproducing means;

second decoding means for decoding the display time control data reproduced by the reproducing means; and text information displaying means for displaying the text information decoded by the first decoding means according to the display time control data decoded by the second decoding means.

Also, the second object is achieved by the provision of a disc reproducing apparatus for reproducing data recorded in a disc having a data structure, in which a first pack including audio data, a second pack including both text information relating to the audio data of the first pack and display time control data for controlling a display time of the text information and an audio manager information (AMGI) managing area including information for managing the reproduction of the first pack are arranged as an audio dedicated title and in which a first pack including audio data, a third pack including video data, a navigation pack of a prescribed standard including information for controlling the reproduction of the first and third packs and a video manager information (VMGI) managing area including information for managing the reproduction of the first and third packs are arranged as a title having the audio data and the video data, comprising:

reproducing means for reproducing the audio data of the first pack and the text information and the display time control data of the second pack;

first decoding means for decoding the text information reproduced by the reproducing means;

second decoding means for decoding the display time control data reproduced by the reproducing means; and text information displaying means for displaying the text information decoded by the first decoding means according to the display time control data decoded by the second decoding means.

In the above configuration, audio data arranged in a first pack and text information and display time control data arranged in a second pack are reproduced by the reproducing means, the text information is decoded by the first decoding means, the display time control data is decoded by the second decoding means, and the text information is displayed while controlling a display time according to the display time control data. Accordingly, the text information recorded in the audio disc is effectively reproduced and displayed.

Also, the second object is achieved by the provision of an audio signal encoding apparatus, comprising:

formatting means for formatting to a data structure in which audio data is arranged in a first pack, video data is arranged in a second pack, text information relating to the audio data of the first pack is arranged in a third pack, and both information for controlling the reproduction of the first and second packs and display time control data. for controlling a display time of the text information arranged in the third pack are arranged in a navigation pack of a prescribed standard.

Also, the second object is achieved by the provision of a disc having a data structure in which a first pack including audio data, a second pack including video data, a third pack including text information relating to the audio data of the first pack and a navigation pack of a prescribed standard including both information for controlling the reproduction of the first and second packs and display time control data for controlling a display time of the text information arranged in the third pack are arranged.

Also, the second object is achieved by the provision of a disc reproducing apparatus for reproducing data recorded in a disc having a data structure, in which a first pack including audio data, a second pack including video data, a third pack including text information relating to the audio data of the first pack and a navigation pack of a prescribed standard including both information for controlling the reproduction of the first and second packs and display time control data for controlling a display time of the text information arranged in the third pack are arranged, comprising:

reproducing means for reproducing the audio data of the first pack and the text information of the third pack and the display time control data of the navigation pack;

first decoding means for decoding the text information reproduced by the reproducing means;

second decoding means for decoding the display time control data reproduced by the reproducing means; and text information displaying means for displaying the text information decoded by the first decoding means according to the display time control data decoded by the second decoding means.

In the above configuration, audio data is arranged in a first pack, video data is arranged in a second pack, text information is arranged in a third pack, control information and display time control data are arranged in a navigation pack, and the data and information are formatted. Therefore, audio data is primarily recorded while effectively recording text information, the text information is encoded so as to effectively record the text information in the audio disc with the audio data primarily recorded, and the text information recorded in the audio disc is effectively reproduced and displayed.

Also, the second object is achieved by the provision of an audio signal encoding apparatus, comprising:

formatting means for formatting an audio dedicated title to a data structure in which audio data of the title is arranged in a first pack, both sound control information relating to the audio data of the first pack and application time control data for controlling an application time of the sound control information is arranged in a second pack and information for managing the reproduction of the first pack is arranged in an audio manager information (AMGI) managing area.

Also, the second object is achieved by the provision of a disc having a data structure in which a first pack including audio data, a second pack including both sound control information relating to the audio data of the first pack and application time control data for controlling an application time of the sound control information and an audio manager information (AMGI) managing area including information for managing the reproduction of the first pack are arranged as an audio dedicated title having the audio data.

Also, the second object is achieved by the provision of a disc reproducing apparatus for reproducing data recorded in a disc having a data structure, in which a first pack including audio data, a second pack including both sound control information relating to the audio data of the first pack and application time control data for controlling an application time of the sound control information and an audio manager information (AMGI) managing area including information for managing the reproduction of the first pack are arranged as an audio dedicated title having the audio data, comprising:

reproducing means for reproducing the audio data of the first pack and both the sound control information and the application time control data of the second pack;

first decoding means for decoding the sound control information reproduced by the reproducing means;

second decoding means for decoding the application time control data reproduced by the reproducing means; and text information displaying means for displaying the sound control information decoded by the first decoding means according to the application time control data decoded by the second decoding means.

In the above configuration, audio data is arranged in a first pack, sound control information and application time control data are arranged in a second pack, and audio manager information (AMGI) is arranged in a managing area. Therefore, audio data is primarily recorded while effectively recording text information, the sound control information is encoded so as to effectively record the sound control information in the audio disc with the audio data primarily recorded, and the sound control information recorded in the audio disc is effectively used to adjust a sound quality of the audio signal.

Also, the second object is achieved by the provision of an audio signal encoding apparatus of a disc, in which a title having first audio data and video data and an audio dedicated title having second audio data are recorded, comprising: formatting means for formatting the audio dedicated title to a data structure, in which the second audio data of the audio dedicated title is arranged in a first pack, sound control information relating to the second audio data of the first pack and application time control data for controlling an application time of the sound control information is arranged in a second pack and information for managing the reproduction of the first pack is arranged in an audio manager information (AMGI) managing area, and formatting the title having first audio data and video data to a data structure in which the first audio data of the title is arranged in a first pack, the video data is arranged in a third pack, information for controlling the reproduction of the first and third packs is arranged in a navigation pack of a prescribed standard and information for managing the reproduction of the first and third packs is arranged in a video manager information (VMGI) managing area.

Also, the second object is achieved by the provision of a disc having a data structure in which a first pack including audio data, a second pack including both sound control information relating to the audio data of the first pack and application time control data for controlling an application time of the sound control information and an audio manager information (AMGI) managing area including information for managing the reproduction of the first pack are arranged as an audio dedicated title having the audio data and in which a first pack including audio data, a third pack including video data, a navigation pack of a prescribed standard including information for controlling the reproduction of the first and third packs and a video manager information (VMGI) managing area including information for managing the reproduction of the first and third packs are arranged as a title having the audio data and the video data.

Also, the second object is achieved by the provision of a disc reproducing apparatus for reproducing data recorded in a disc having a data structure, in which a first pack including audio data, a second pack including both sound control information relating to the audio data of the first pack and application time control data for controlling an application time of the sound control information and an audio manager information (AMGI) managing area including information for managing the reproduction of the first pack are arranged as an audio dedicated title having the audio data and in which a first pack including audio data, a third pack including video data, a navigation pack of a prescribed standard including information for controlling the reproduction of the first and third packs and a video manager information (VMGI) managing area including information for managing the reproduction of the first and third packs are arranged as a title having the audio data and the video data, comprising:

reproducing means for reproducing the audio data of the first pack and both the sound control information and the application time control data of the second pack;

first decoding means for decoding the sound control information reproduced by the reproducing means;

second decoding means for decoding the application time control data reproduced by the reproducing means; and text information displaying means for displaying the sound control information decoded by the first decoding means according to the application time control data decoded by the second decoding means.

In the above configuration, in case of an audio dedicated title, audio data is arranged in a first pack, sound control information and application time control data are arranged in a second pack, and audio manager information (AMGI) is arranged in a managing area. In case of a title having the audio data and the video data, audio data is arranged in a first pack, video data is arranged in a third pack, video data reproduction control information is arranged in a navigation pack, and video manager information (VMGI) is arranged in a managing area.

Therefore, in case of the audio dedicated title, audio data is primarily recorded while effectively recording text information, the sound control information is encoded so as to effectively record the sound control information in the audio disc with the audio data primarily recorded, and the sound control information recorded in the audio disc is effectively used to adjust a sound quality of the audio signal.

BRIEF DESCRIPTION OF THE DRAWINGS

The objects, features and advantages of the present invention will be apparent from the following description taken in conjunction with the accompanying drawings, in which:

FIG. 4 is an explanatory view showing in detail a format of an audio manager information (AMGI) shown in FIG. 2;

FIG. 8 is an explanatory view showing in detail a format of audio title set information—management table (ATSI-MAT) shown in FIG. 7;

FIG. 16 is an explanatory view showing an example displayed according to information arranged in a name space area shown in FIG. 15;

FIG. 17 is an explanatory view showing in detail a format of an audio search data (ASD) area shown in FIG. 12;

FIG. 21 is an explanatory view showing in detail a format of an audio manager information (AMGI), in which TOC information is additionally arranged, according to a second embodiment of the present invention;

FIG. 22 is an explanatory view showing in detail the TOC information shown in FIG. 21;

FIG. 26 is an explanatory view showing in detail a format of a CONT pack shown in FIG. 1A;

FIG. 27 is an explanatory view showing in detail presentation control information (PCI) data shown in FIG. 26;

FIG. 28 is an explanatory view showing in detail data search information (DSI) data shown in FIG. 26;

FIG. 48 shows a data structure of data recorded in a DVD-Van disc as another type of disc;

FIG. 49 shows a data structure of data recorded in a DVD-video-disc as another type of disc;

FIG. 50 shows a data structure of data recorded in a DVD-audio disc as another type of disc;

FIG. 51D shows a configuration of ATSI-MAT data shown in FIG. 51A;

FIG. 52 is an explanatory view showing a private header of a linear PCM in the DVD-avd disc shown in FIG. 46;

DETAILED DESCRIPTION OF THE EMBODIMENTS

Preferred embodiments of an encoding apparatus of an audio signal, an audio disc and a disc reproducing apparatus according to the present invention are described with reference to the drawings.

In a transitional period from a CD age to a DVD-audio disc age, the DVD-audio disc is applicable for stereo 2-channel signals and for multi-channel signals (for example, 5-channel signals, 6-channel signals and/or 8-channel signals called 5/6/8-channel signals). That, not only the stereo 2-channel signals can be recorded as an audio signal in the DVD-audio disc, but also the 5/6/8-channel signals can be recorded as an audio signal in the DVD-audio disc. After the transitional period, the DVD-audio disc is applicable only for the 5/6/8-channel signals, so that the 5/6/8-channel signals can be only recorded as an audio signal in the DVD-audio disc.

Figure 1A:
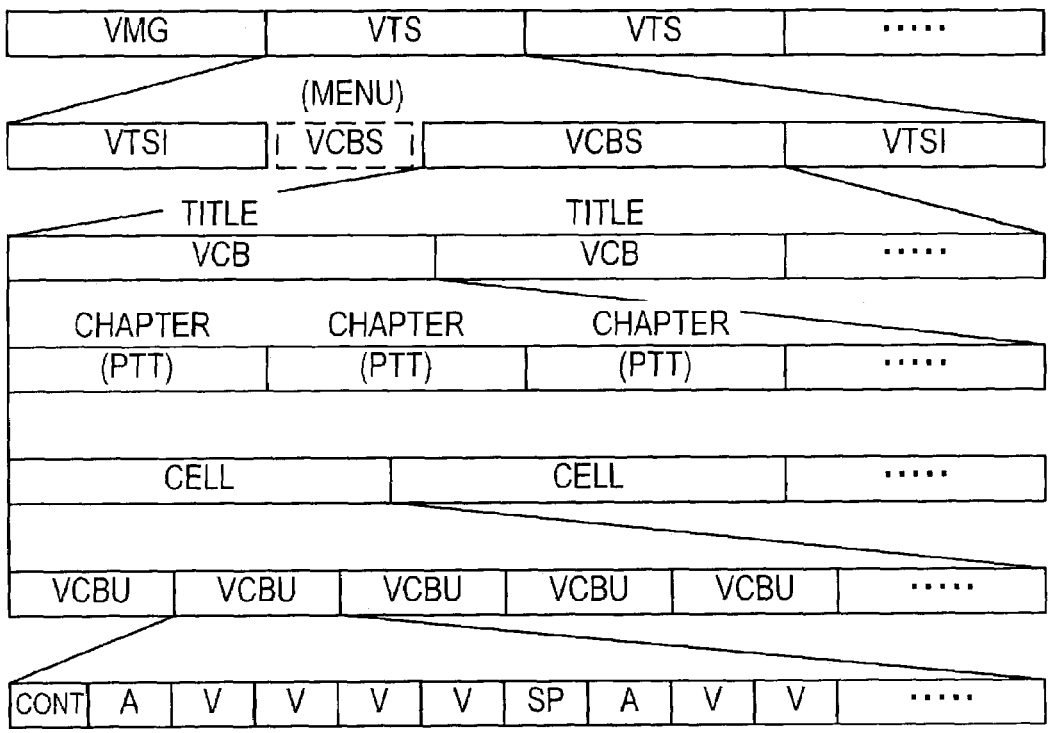
FIG. 1A is an explanatory view showing a data format in a DVD-video disk according to first to sixth embodiments of the present invention.
Figure 1B:
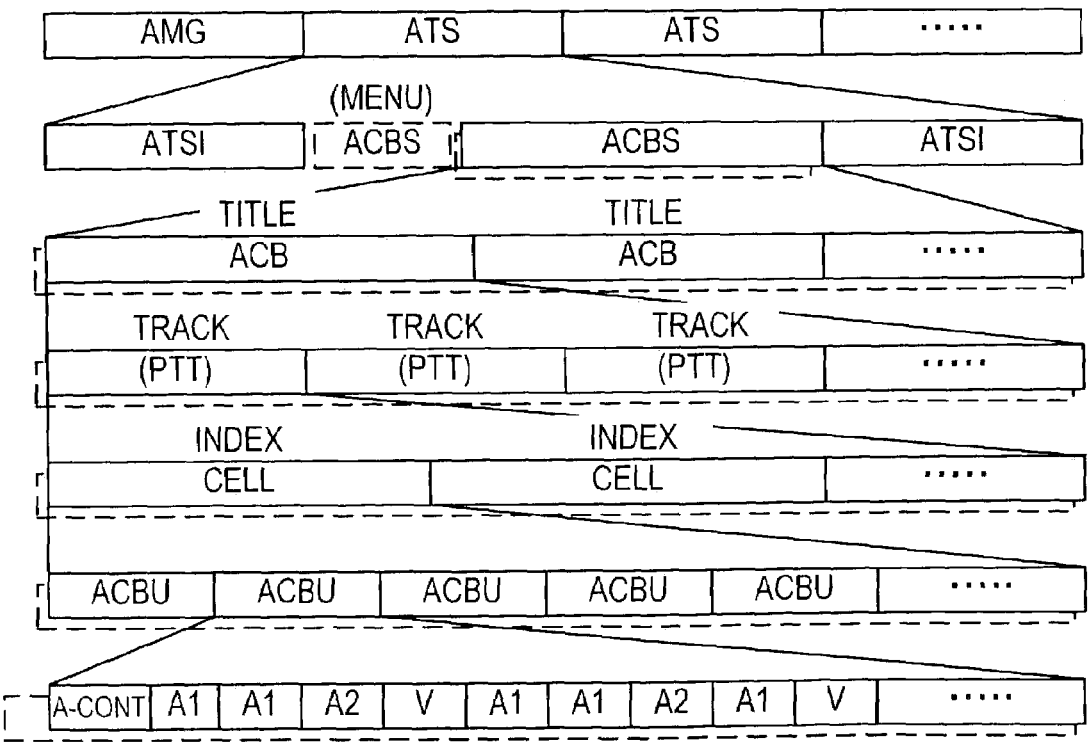
FIG. 1B is an explanatory view showing a data format based on initial standards in a DVD-audio disk (and a DVD-Avd disk) according to first, second, sixth embodiments of the present invention.

FIG. 1A is an explanatory view showing a data format in a DVD-video disc according to a first embodiment of the present invention, and FIG. 1B is an explanatory view showing a data format based on initial standards in a DVD-audio disk (and a DVD-Avd disk) according to the first embodiment of the present invention.

Though area names in a data format of a DVD-video disc differ from those in a data format of a DVD-audio disc, the data formats are compatible with each other.

Figure 2:
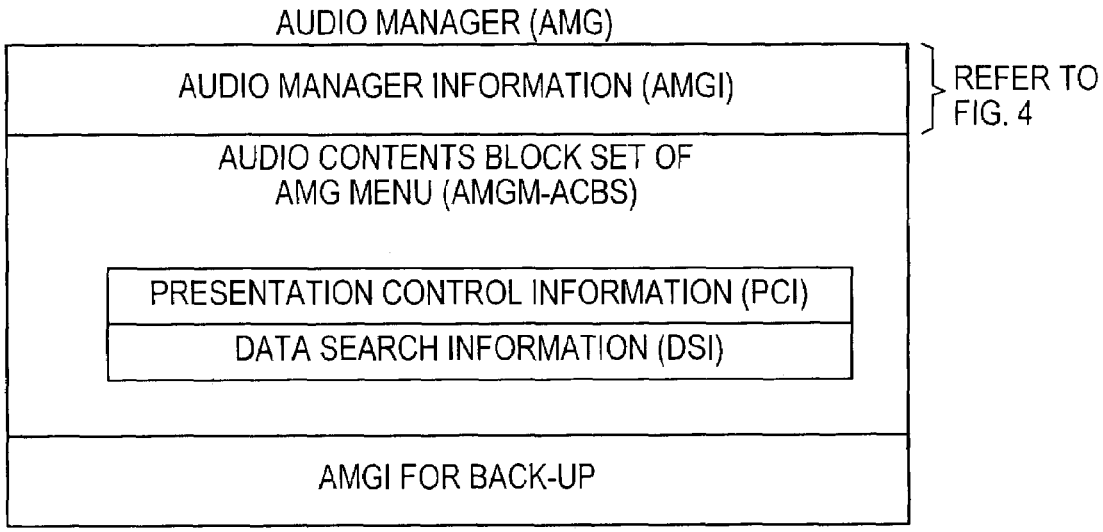
FIG. 2 is an explanatory view showing in detail a format of an audio manager (AMG) shown in FIG. 1B.

As shown in FIG. 1A and FIG. 1B, a data format in a DVD-video disc is composed of a top area of a video manager (VMG) and areas of a plurality of video title sets (VTS) succeeding the VMG, and a data format in a DVD-audio disc (and a DVD-Avd disc described in a third embodiment) is composed of a top area of an audio manager (AMG) shown in FIG. 2 in detail and areas of a plurality of audio title sets (ATS) succeeding the AMG.

Each VMG includes video manager information (VMGI) for managing the video title sets (VTS).

Each VTS is composed of a top area of VTS information (VTSI), one or more areas of one or more video contents block sets (VCBS) succeeding the VTS and a final area of a VTS information (VTSI) arranged in that order, and each ATS is composed of a top area of ATS information (ATSI), one or more areas of one or more audio contents block sets (ACBS) and a final area of an ATS information (ATSI) arranged in that order. Contents of each musical composition is set in the area of one ACBS, and a musical performance time of each musical composition is set in the area of one ATSI.

Each VCBS is composed of a plurality of video contents block (VCB) respectively corresponding to one title of a video, and each VCB is composed of a plurality of chapters. Each chapter includes a part of title (PTT). Also, each ACBS is composed of a plurality of audio contents blocks (ACB) respectively corresponding to one title of an audio, and each ACB is composed of a plurality of tracks corresponding to the chapters. Each track includes a part of title (PTT). Each chapter is composed of a plurality of cells, each cell is composed of a plurality of VCB units (VCBU), and each VCBU is composed of a plurality of packs. Also, each track is composed of a plurality of indexes corresponding to the cells, each index is composed of a plurality of ACB units (ACBU) corresponding to the VCB units, and each ACBU is composed of a plurality of packs. Each pack of the ACBU (or the VCBU) is composed of 2048 bytes, and Each pack of the VCBU is composed of 2048 bytes.

The packs of the VCBU are classified into a control (CONT) pack placed in the top area, a plurality of video (V) packs, a plurality of audio (A) packs and a plurality of subpicture (SP) packs succeeding the CONT pack. Also, the packs of the ACBU are classified into an audio-control (A-CONT) pack placed in the top area, a plurality of audio (A) packs and a plurality of video (V) packs succeeding the A-CONT pack.

In the CONT pack, information for controlling the video packs succeeding the CONT pack is arranged. In the A-CONT pack, information (for example, TOC information arranged in the CD) for managing an audio signal of the audio packs succeeding the A-CONT pack is arranged. In each audio pack, audio data is arranged. In each video pack, video data and data (for example, closed caption (CC) data) other than the audio data are arranged.

FIG. 2 is an explanatory view showing in detail a format of the audio manager (AMG).

As shown in FIG. 2, the audio manager (AMG) is composed of audio manager information (AMGI) shown in FIG. 4 in detail, an audio contents block set of an AMG menu (AMGM-ACBS), and an AMGI for back-up. The AMGM-ACBS includes presentation control information (PCI) and data search information (DSI) as control information.

Figure 3:
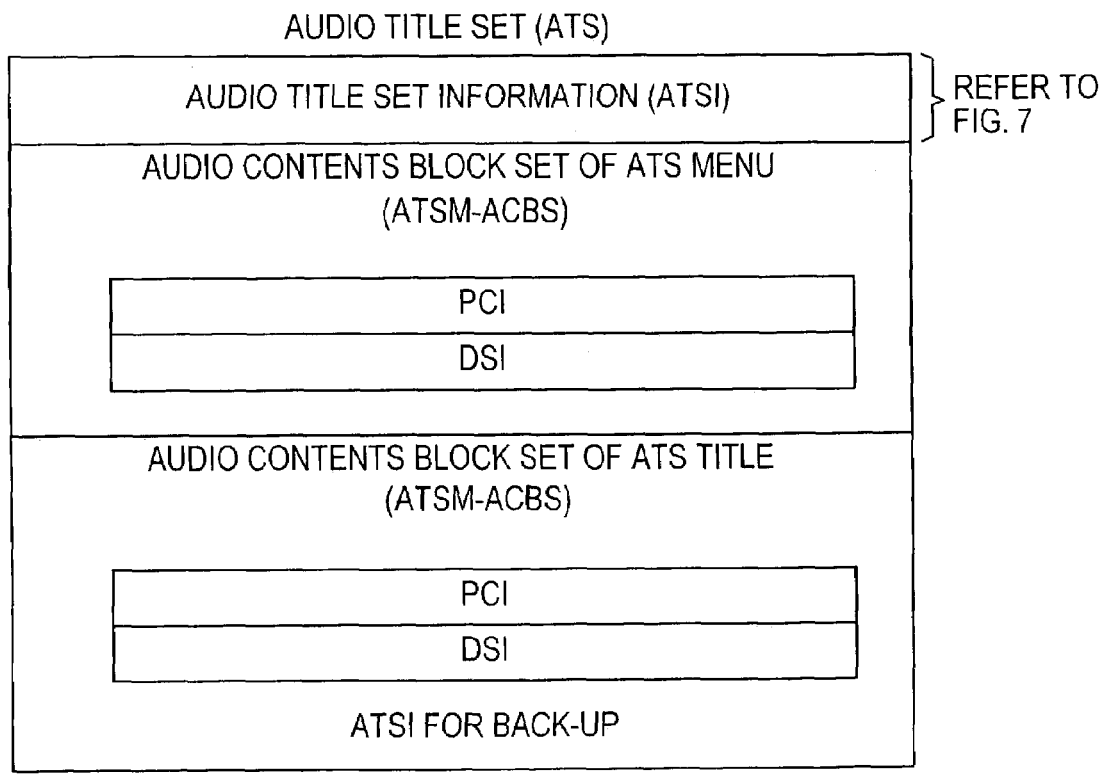
FIG. 3 is an explanatory view showing in detail a format of an audio title set (ATS) shown in FIG. 1B.

FIG. 3 is an explanatory view showing in detail a format of the audio title set (ATS).

Figure 7:
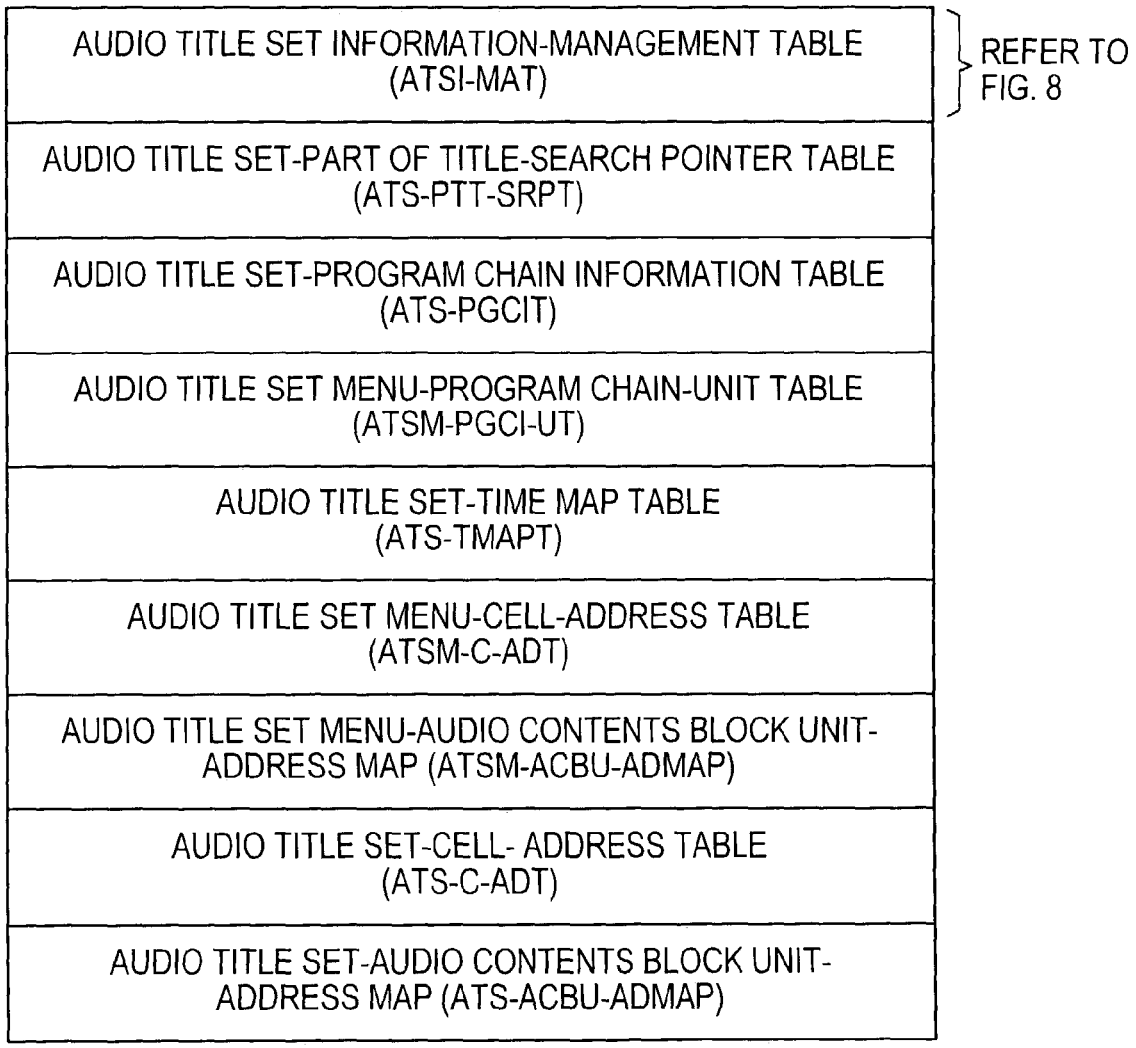
FIG. 7 is an explanatory view showing in detail a format of an audio title set information (ATSI) shown in FIG. 3.

As shown in FIG. 3, the audio title set (ATS) is composed of an audio title set information (ATSI) shown in FIG. 7 in detail, an audio contents block set of an ATS menu (ATSM-ACBS), an audio contents block set (ATST-ACBS) of an ATS title, and an ATSI for back-up. The ATSM-ACBS and the ATST-ACBS respectively have the PCI and the DSI shown in FIG. 2.

FIG. 4 is an explanatory view showing in detail a format of the audio manager information (AMGI).

Figures 5, 6:
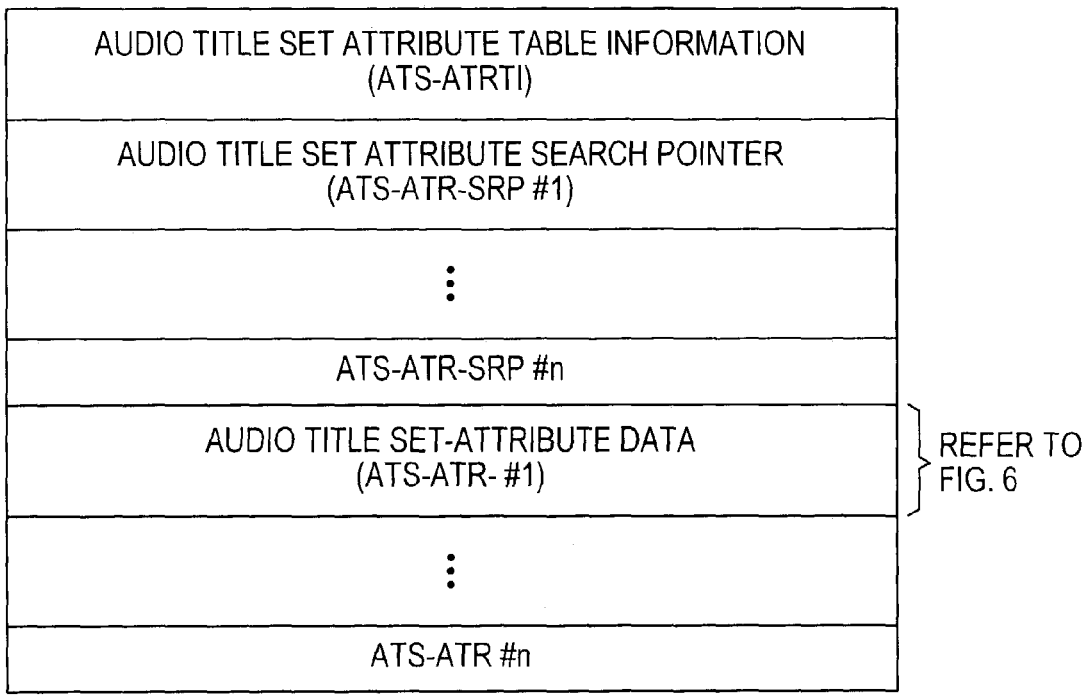
FIG. 5 is an explanatory view showing in detail a format of an audio title set—attribute table (ATS-ATRT) shown in FIG. 4.
FIG. 6 is an explanatory view showing in detail a format of an audio title set—attribute data (ATS-ATR) shown in FIG. 5.

As shown in FIG. 4, the audio manager information (AMGI) for managing the audio title sets (ATS) is composed of an AMGI management table (AMGI-MAT), a title search pointer table (T-SRPT), an audio manager menu PGCI unit table (AMGM-PGCI-UT), a pair rental management information table (PTL-MAIT), an audio title set—attribute table (ATS-ATRT) shown in FIG. 5 in detail, a text data manager (TXTDT-MG), an audio manager menu cell (index) address table (AMGM-C-ADT), and an audio manager menu—audio contents block unit—address map (AMGM-ACBU-ADMAP).

FIG. 5 is an explanatory view showing in detail a format of the audio title set—attribute table (ATS-ATRT).

As shown in FIG. 5, the audio title set—attribute table (ATS-ATRT) is composed of audio title set attribute table information (ATS-ATRTI), each audio title set attribute search pointer (ATS-ATR-SRP#1-#n) of a plurality of ATSs (n ATSs), and each audio title set—attribute data (ATS-ATR-#1-#n) of a plurality of ATSs (n ATSs).

FIG. 6 is an explanatory view showing in detail a format of the audio title set—attribute data (ATS-ATR).

As shown in FIG. 6, the audio title set—attribute data (ATS-ATR) is composed of an end address (ATS-ATR-EA), a category (ATS-CAT), and attribute information (ATS-ATRI).

FIG. 7 is an explanatory view showing in detail a format of the audio title set information (ATSI).

As shown in FIG. 7, the audio title set information (ATSI) shown in FIG. 3 is composed of an audio title set information—management table (ATSI-MAT) shown in FIG. 8 in detail, an audio title set—part of title—search pointer table (ATS-PTT-SRPT), an audio title set—program chain information table (ATS-PGCIT), an audio title set menu—program chain—unit table (ATSM-PGCI-UT), an audio title set—time map table (ATS-TMAPT), an audio title set menu—cell—address table (ATSM-C-ADT), an audio title set menu—audio contents block unit—address map (ATSM-ACBU-ADMAP), an audio title set cell—address table (ATS-C-ADT), and an audio title set—audio contents block unit—address map (ATS-ACBU-ADMAP).

FIG. 8 is an explanatory view showing in detail a format of the audio title set information—management table (ATSI-MAT).

Figure 9:
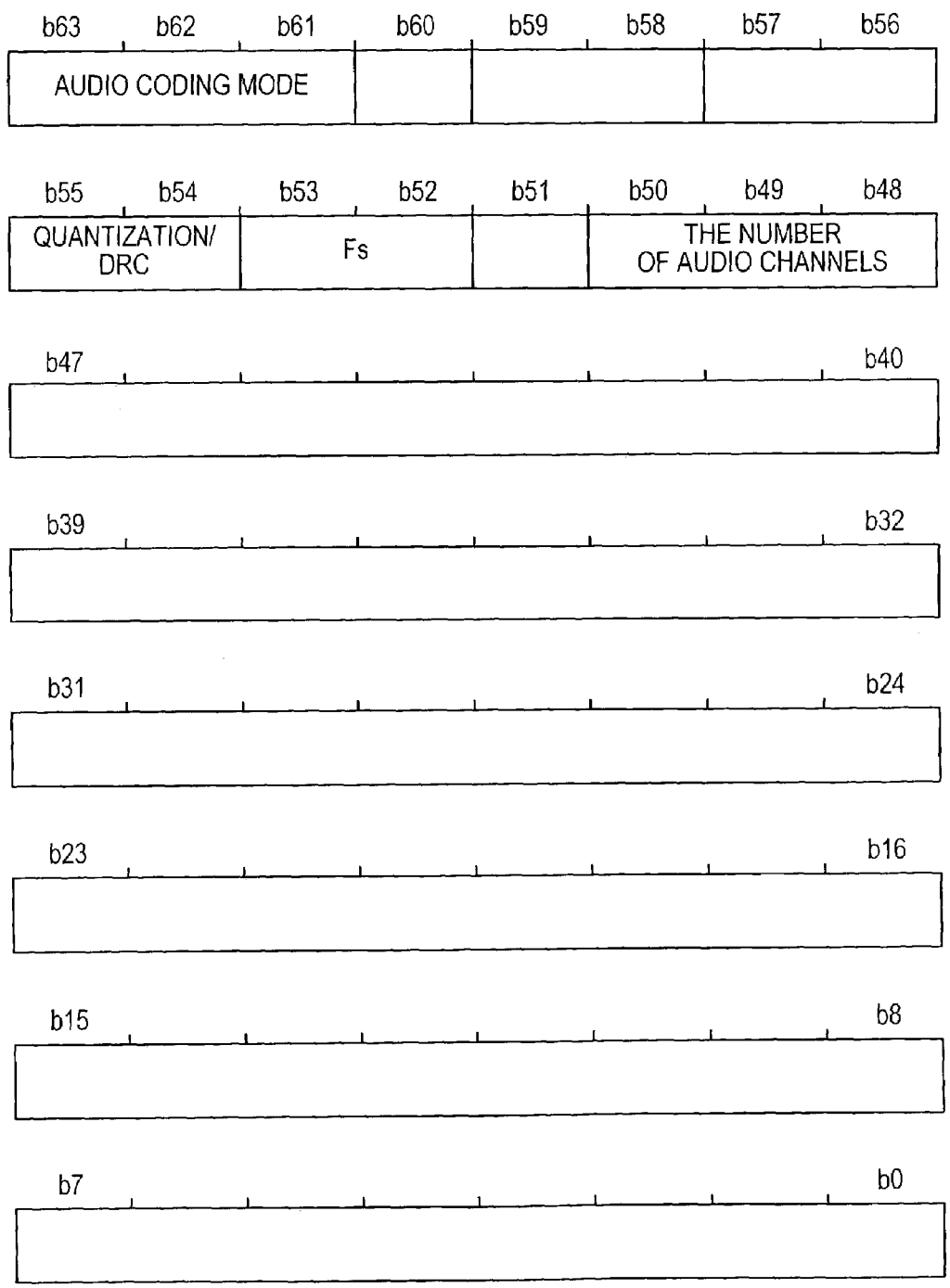
FIG. 9 is an explanatory view showing in detail a format of an audio title set menu—audio stream—attribute data (ATSM-AST-ATR) shown in FIG. 8.

As shown in FIG. 8, the audio title set information—management table (ATSI-MAT) is composed of an identifier (ATS-ID), an end address (ATS-EA), an ATSI-EA, a version number of an DVD-audio specification (VERN), a category (ATS-CAT), an ATSI-MAT-EA, a start address (ATSM-ACBS-SA), an ATST-ACBS-SA, an ATS-PTA-SRPT-SA, ATS-PGCIT-SA, ATSM-PGCI-UT-SA, ATS-TMAP-SA, ATSM-C-ADT-SA, ATSM-ACBU-ADMAP-SA, an audio stream—attribute data (ATSM-AST-ATR) shown in FIG. 9 in detail, the number of audio streams of the ATS (ATS-AST-Ns), and an audio stream—attribute table of the ATS (ATS-AST-ATRT).

FIG. 9 is an explanatory view showing in detail a format of the audio title set menu—audio stream—attribute data (ATSM-AST-ATR).

As shown in FIG. 9, the ATSM-AST-ATR has 8 bytes (from the bit No. b63 to the bit No. b0), pieces of data D1 to D4 expressing attributes of a coded audio signal recorded in the DVD-audio disc are arranged as the ATSM-AST-ATR.

(1) D1: audio coding mode (3 bits, from the bit No. b63 to the bit No. b61)

Data "000b" denotes a mode of Dolby-AC-3 prescribed by Dolby Laboratories Incorporation.

Data "010b" denotes a mode of MPEG-1 (Moving Picture Experts Group-1) or MPEG-2 (no extended bit stream).

Data "011b" denotes a mode of MPEG-2 (including an extended bit stream).

Data "100b" denotes a mode of a linear PCM audio.

Data "101b" denotes a mode of a linear PCM audio (including 2-ch+5-ch, 2-ch+6-ch, and 2-ch+8-ch).

(2) D2: quantization/DRC (dynamic range control) information (2 bits, from the bit No. b55 to the bit No. b54)

Data "11b" is set in case of the audio coding mode "000b".

In case of the audio coding mode indicated by data D1="010b" or "011b", data "00b" indicating information that any dynamic range control data does not exist in the MPEG audio stream, data "01b" indicating information that dynamic range control data exists in the MPEG audio stream, data "10b" indicating information of "reserve" or data "11b" indicating information of "reserve" is set.

In case of the audio coding mode indicated by data D1="100b" or "101b", data "00b" indicating information of 16 bits, data "01b" indicating information of 20 bits, data "10b" indicating information of 24 bits or data "11b" indicating information of "reserve" is set for the stereo 2-channel.

(3) D3: sampling frequency Fs (2 bits, from the bit No. b53 to the bit No. b52)

Data "00b" indicating a frequency of 48 kHz, data "01b" indicating a frequency of 96 kHz, data "10b" indicating a frequency of 192 kHz is set for the stereo 2-channel.

(4) D4: the number of audio channels (3 bits, from the bit b50 to the bit b48)

Data "000b" indicating 1 channel (monophonic), data "001b" indicating 2 channels (stereo), data "010b" indicating 3 channels, data "011b" indicating 4 channels, data "100b" indicating 2 channels (stereo) and 5 channels, data "101b" indicating 2 channels (stereo) and 6 channels, data "110b" indicating 7 channels or data "111b" indicating 2 channels (stereo) and 8 channels is set.

Figure 10:
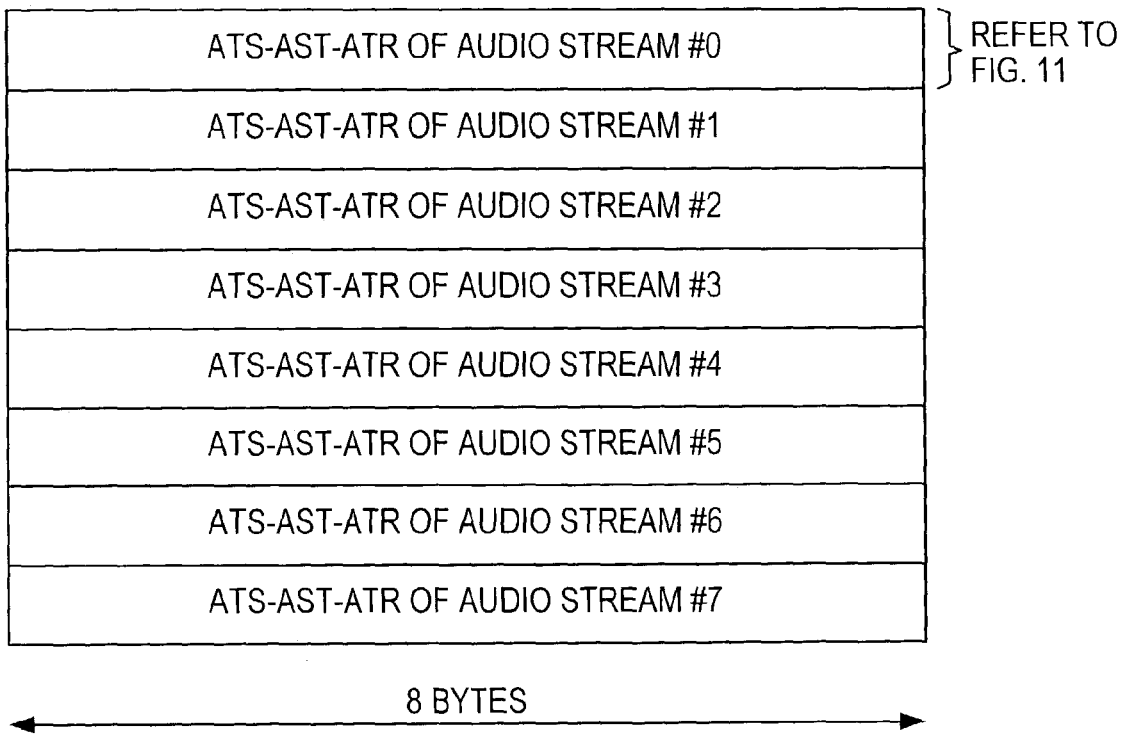
FIG. 10 is an explanatory view showing in detail a format of an audio title set—audio stream—attribute table (ATS-AST-ATRT) shown in FIG. 8.

FIG. 10 is an explanatory view showing in detail a format of the audio title set—audio stream—attribute table (ATS-AST-ATRT).

Figure 11:
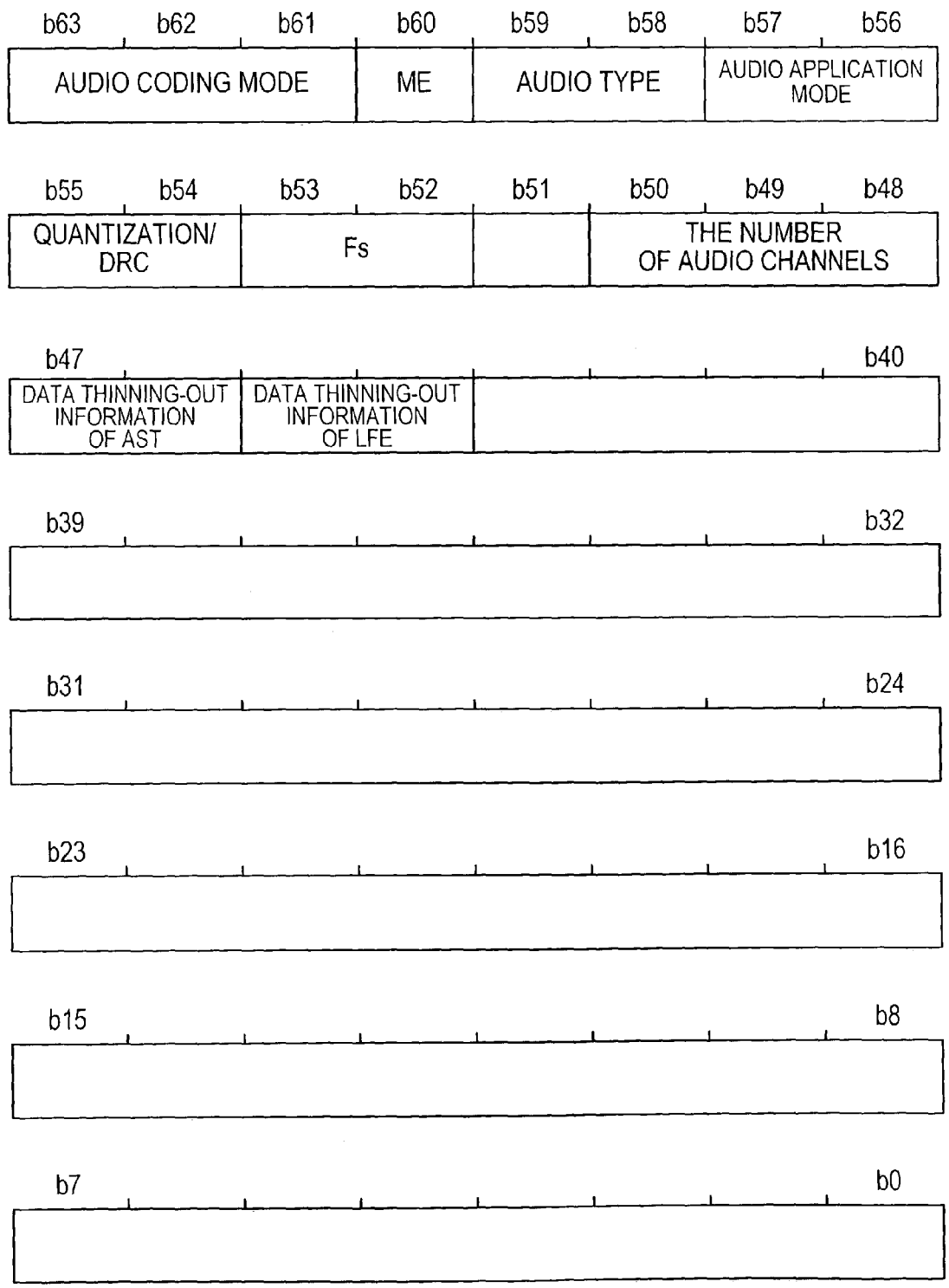
FIG. 11 is an explanatory view showing in detail a format of attribute data (ATS-AST-ATR) of each audio stream shown in FIG. 10.

As shown in FIG. 10, the audio title set—audio stream—attribute table (ATS-AST-ATRT) is composed of a plurality of ATS-AST-ATRs of audio streams #0-#7 shown in FIG. 11 in detail, and each ATS-AST-ATR has 8 bytes, so that the ATS-AST-ATRT has 64 bytes (8*8).

FIG. 11 is an explanatory view showing in detail a format of the attribute data (ATS-AST-ATR).

As shown in FIG. 11, the attribute data (ATS-AST-ATR) of each audio stream has 8 bytes (64 bits from the bit No. b63 to the bit No. b0) in the same manner as the audio title set menu—audio stream—attribute data (ATSM-AST-ATR) shown in FIG. 9. The ATS-AST-ATR is composed of the attribute data D1, D2, D3 and D4 described above, data D5 indicating multi-channel extension (1 bit, the bit No. b60), data D6 indicating an audio type (2 bits, the bit No. b59 and the bit No. b58), data D7 indicating an audio application mode (2 bits, the bit No. b57 and the bit No. b56), data D8 indicating data thinning-out information of the audio stream (AST) (2 bits, the bit No. b47 and the bit No. b46) and data D9 indicating data thinning-out information of 1-channel low frequency effect (LFE).

Also, data D7="11b" indicating a 2-channel and surround mode is recorded as the audio application mode of the DVD-audio disc, and data D8="00b" indicating "full" (1/1), data D8="01b" indicating "half" (½) or data D8="11b" indicating "quarter" (¼) is recorded as band information of the data thinning-out information. Also, the data D9 is recorded in the same manner as the data D8.

Also, the number of audio channels indicated by the data D4 of the ATS-AST-ATR is necessarily 2 channels in the audio stream #0, and the number of audio channels is 3 channels of the front side in the audio stream #1. That is, in cases where an audio signal corresponding to one title is recorded at 2 channels and 6 channels, the 2-channel stereo signal is allocated to the audio stream #0, the front signal of 3 channels extracted from the 6 channels is allocated to the audio stream #1, the rear signal of 2 channels extracted from the 6 channels and the LFE signal of 1 channel extracted from the 6 channels are allocated to the audio stream #2, and a numeral "3", is recorded in the audio management information—management table (AMGI-MAT) shown in FIG. 4 and the audio title set information—management table (ATSI-MAT) shown in FIG. 8 as data indicating the use of three audio streams #0 to #2.

Also, for example, a sampling operation is performed for an analog audio signal of (2+6) channels at following sampling frequencies Fs, and the sampled signal is quantized at following quantizing bit numbers to record the quantized signal.

| channel | sampling frequency Fs | quantizing bit number |
|---|---|---|
| stereo 2 channels | 48 kHz | 20 bits |
| front 2 channels | 96 kHz | 16 bits |
| rear 2 channels | 48 kHz | 16 bits |
| LFE 1 channel | | (no thinning-out) |

In this case, data D1="101b indicating the linear PCM audio (including 2-ch+5-ch, 2-ch+6-ch, and 2-ch+8-ch) as the audio coding mode, the data D2="01b" indicating 20 bits as the quantization/DRC (dynamic range control) information, the data D3=00b" indicating 48 kHz as the sampling frequency Fs and the data D4="101b" indicating stereo 2 channels and 6 channels as the number of audio channels are recorded as attributes of the stereo 2 channels in the area of the audio title set menu—audio stream—attribute data (ATSM-AST-ATR).

Also, data D1="101b" indicating the linear PCM audio (including 2-ch+5-ch, 2-ch+6-ch, and 2-ch+8-ch) as the audio coding mode, the data D2="01b" indicating 20 bits as the quantization/DRC (dynamic range control) information, the data D3="00b" indicating 48 kHz as the sampling frequency Fs, the data D4="001b" indicating stereo 2 channels as the number of audio channels, the data D7="11b" indicating 2 channels and the surround mode as the audio application mode, the data D8="00b" indicating "full" (1/1) as the data thinning-out information of a corresponding audio stream and the data D9="00b" indicating "full" (1/1) as the data thinning-out information of the LFE 1 channel are recorded in the area of the ATS-AST-ATR of the audio stream #0.

Also, data D1="101b" indicating the linear PCM audio (including 2-ch+5-ch, 2-ch+6-ch, and 2-ch+8-ch) as the audio coding mode, the data D2="00b" indicating 16 bits as the quantization/DRC (dynamic range control) information, the data D3="01b" indicating 96 kHz as the sampling frequency Fs, the data D4="010b" indicating 3 channels as the number of audio channels, the data D7="11b" indicating 2 channels and the surround mode as the audio application mode, the data D8="00b" indicating "full" (1/1) as the data thinning-out information of a corresponding audio stream and the data D9="00b" indicating "full" (1/1) as the data thinning-out information of the LFE 1 channel are recorded in the area of the ATS-AST-ATR of the audio stream #1.

Also, data D1="101b" indicating the linear PCM audio (including 2-ch+5-ch, 2-ch+6-ch, and 2-ch+8-ch) as the audio coding mode, the data D2="00b" indicating 16 bits as the quantization/DRC (dynamic range control) information, the data D3="00b" indicating 48 kHz as the sampling frequency Fs, the data D4="010b" indicating 3 channels as the number of audio channels, the data D7="11b" indicating 2 channels and the surround mode as the audio application mode, the data D8="00b" indicating "full" (1/1) as the data thinning-out information of a corresponding audio stream and the data D9="00b" indicating "full" (1/1) as the data thinning-out information of the LFE 1 channel are recorded in the area of the ATS-AST-ATR of the audio stream #2.

Next, the audio (A) pack and the audio-control (A-CONT) pack recorded in the audio stream are described.

Figure 12:
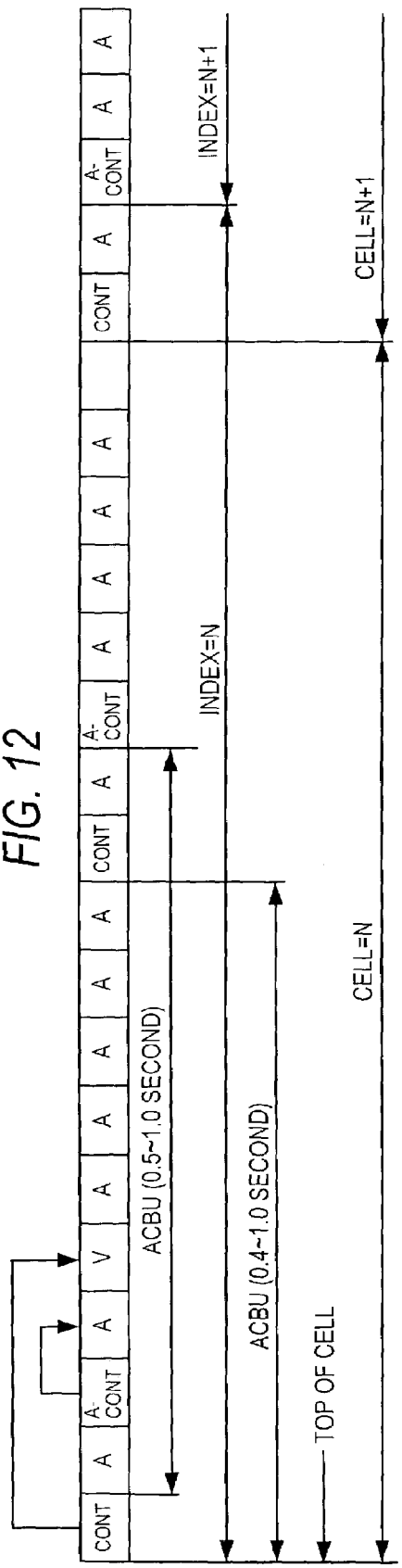
FIG. 12 is an explanatory view showing an audio contents block unit (ACBU) shown in FIG. 1B.

FIG. 12 is an explanatory view showing the audio contents block unit (ACBU) shown in FIG. 1B.

As shown in FIG. 12, each VCB unit of the ACBU is composed of a plurality of packs corresponding to a time period ranging from 0.4 to 1.0 second (the number of packs is arbitrary), and each ACB unit of the ACBU is composed of a plurality of packs corresponding to a time period ranging from 0.5 to 1.0 second (the number of packs is arbitrary). Also, the A-CONT pack in the ACB unit of the DVD-audio format is arranged as the third pack in the VCB unit of the DVD-video format.

The A-CONT pack is basically arranged for each audio time of 0.5 second, and a final A-CONT pack placed in the end portion of each index is spaced apart from an A-CONT pack adjacent to the final A-CONT pack at a time period ranging from 0.5 to 1.0 second. Also, a group of audio frame units (GOF) corresponding to one audio time is indicated by the A-CONT pack, and a data position of the A-CONT pack is determined by the number of audio frames, the number of first access unit pointers and the number of frame headers. Also, it is not required that the A pack just before the A-CONT pack is packed at an interval of 0.5 second in the audio time.

A pair of audio packs A1 adjacent to each other are arranged to correlate audio signals of the audio packs A1 with each other. For example, an audio pack A1 of an L-channel audio signal is adjacent to an audio pack A1 of a R-channel audio signal in case of a stereo. Also, a plurality of adjacent audio packs A1 of audio signals in a multi-channel such as 5/6/8 channels are arranged to correlate a plurality of audio signals of the adjacent audio packs A1 with each other. In cases where a video is displayed when an audio signal is reproduced, a video pack of the video is arranged in adjacent to an audio pack of the audio signal.

Figure 13:
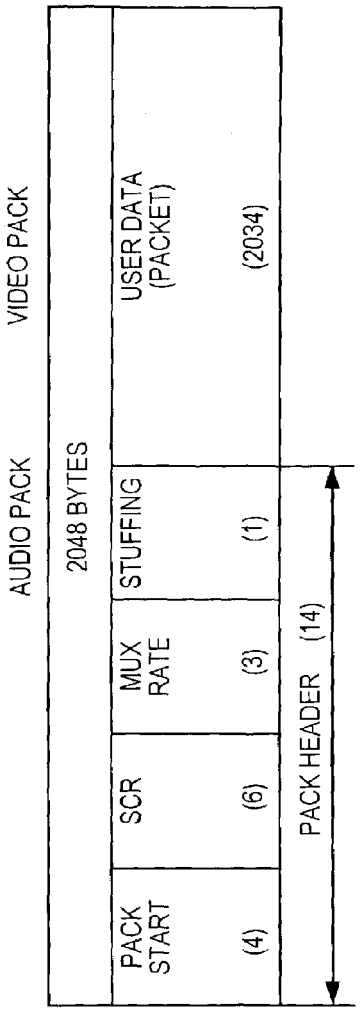
FIG. 13 is an explanatory view showing in detail a format of an audio pack (and a video pack)

FIG. 13 is an explanatory view showing in detail a format of each pack (the audio pack and the video pack).

As shown in FIG. 13, in each pack (A pack and V pack), a pack header (14 bytes) composed of pack start information of 4 bytes, system clock reference (SCR) information of 6 bytes, multiplex (MUX) rate information of 3 bytes and a stuffing of 1 byte is added to user data (audio data of the pack or video data of the pack) of 2034 bytes. Therefore, each pack (A pack and V pack) has 2048 bytes. In this case, the SCR information denoting a time stamp is set to "1" in the top pack of each ACB unit corresponding to one title, and the values of the SCR information in the packs of the same title are consecutively changed. Therefore, the playback time for the A packs in the same title can be managed.

Figures 14, 15:
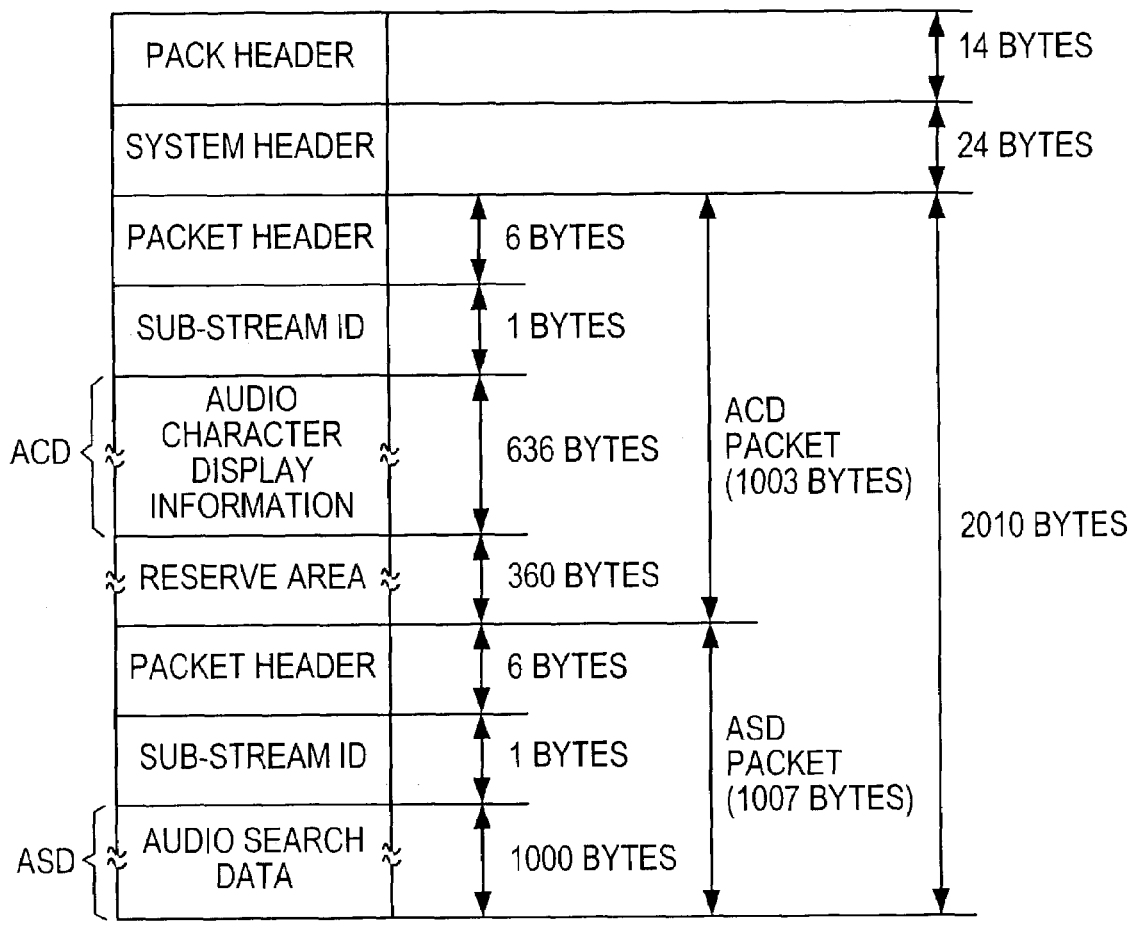
FIG. 14 is an explanatory view showing in detail a format of an audio control (A-CONT) pack shown in FIG. 1B.
FIG. 15 is an explanatory view showing in detail a format of an audio character display (ACD) area shown in FIG. 14.

FIG. 14 is an explanatory view showing in detail a format of the audio control (A-CONT) pack.

In contrast, as shown in FIG. 14, a back header of 14 bytes, a system header of 24 bytes, an audio character display (ACD) packet of 1003 bytes and an audio search data (ASD) packet of 1007 bytes are arranged in that order in each A-CONT pack. Also, a packet header of 6 bytes, sub-stream identification data of 1 byte, audio character display (ACD) information of 636 bytes shown in FIG. 15 in detail and a reserve area of 360 bytes are arranged in that order in each ACD packet. The audio character display (ACD) information indicates display characters (or a display text) relating to audio data of the audio (A) packs succeeding the A-CONT pack, and the display characters indicated by the audio character display (ACD) information are displayed while reproducing the audio data of the A packs. Also, the ASD packet is composed of a packet header of 6 bytes, sub-stream identification data of 1 byte and audio search data (ASD) of 1000 bytes shown in FIG. 17 in detail. The audio search data (ASD) denotes display time control data for controlling a display time of the display characters indicated by the audio character display (ACD) information.

FIG. 15 is an explanatory view showing in detail a format of the audio character display (ACD) area.

As shown in FIG. 15, an area of the ACD information is composed of an area (48 bytes) for general information, an area (294 bytes) for characters CH1 of a first language and an area (294 bytes) for characters CH2 of a second language. Each character area is composed of an area (93 bytes) of a name space, two areas of two free spaces respectively having 93 bytes, an area (15 bytes) of a data pointer.

FIG. 16 is an explanatory view showing an example displayed according to information arranged in the name space area.

Title information indicating a music name in Japanese is arranged in one of the name space areas of the characters CH1 and CH2, so that the music name is, for example, displayed in Japanese. Also, title information indicating the music name in English is arranged in the other name space area, so that the music name is displayed in English as shown in FIG. 16. It is applicable that the information be set by a disc selling agency.

The general information of 48 bytes is, for example, composed of service level information of 16 bytes, language code information of 12 bytes, character set code information of 6 bytes, display item information of 6 bytes, "difference of ACD information from previous ACD information" information of 2 bytes and reserve information of 6 bytes. The service level information of 16 bytes indicates a display size of the title information, a display type of the title information, a distinction between audio information, video information and sub-picture (SP) information, and an audio stream. Also, the characters of the title information is mandatory, and a bit map of the title information is optional. In the language code information of 12 bytes, the first language and the second language are respectively indicated by a language code of 2 bytes in the same manner as in a video file, and the language code information can indicate a maximum of 8 languages. English is mandatory.

As the character set code information of 6 bytes, a maximum of 15 character codes corresponding to the language codes can be arranged. The existence of the characters Ch1 or Ch2 in one language and a type of the language are indicated by a character code of 1 byte. For example, character codes IS0646, IS08859-1 and MS-JIS are used.

The display item information of 6 bytes indicates the existence of data arranged in each free space, the existence of data arranged in the data pointer and an identifier. Data arranged in the name space is mandatory, and a title name, a music name and an artist name are necessarily written.

FIG. 17 is an explanatory view showing in detail a format of the audio search data (ASD) area.

As shown in FIG. 17, the audio search data (ASD) of 1000 bytes is composed of general information of 16 bytes, current number information of 8 bytes, current date and time information of 16 bytes, title set search information of 8 bytes, title search information of 8 bytes, track search information of 404 bytes, index search information of 408 bytes, highlight search information of 80 bytes and a reserve area of 52 bytes.

The current number information of 8 bytes is composed of a current title number (2 bytes: BCD) in a title set, a current track number (2 bytes: BCD) in the title set, a current index number (2 bytes: BCD) in a track and a reserve area (2 bytes). The current date and time information of 16 bytes is composed of a playback time (4 bytes: BCD) in the track, a playback time (4 bytes: BCD) in the remaining portion of the track, an absolute time (4 bytes: BCD) in a title and an absolute time (4 bytes: BCD) in the remaining portion of the title.

The title set search information of 8 bytes is composed of a top sector number (4 bytes) of the title set and a final sector number (4 bytes) of the title set. The title set search information of 8 bytes is composed of a top sector number (4 bytes) of one title and a final sector number (4 bytes) of the title. The track search information of 404 bytes is composed of track and sector numbers (4 bytes*99) of one title, a top track number (4 bytes) of the title and a final track number (4 bytes) of the title.

The index search information of 408 bytes is composed of index and sector numbers (4 bytes*100) of one track, a top index number (4 bytes) of the track and a final index number (4 bytes) of the track. The highlight search information of 80 bytes is composed of a plurality of in-sector numbers (4 bytes*100) of one track and a plurality of out-sector numbers (4 bytes*100) of the track.

In the above DVD-audio format of the DVD-audio disc, because the A-CONT pack of the DVD-audio format is arranged at the top portion of each ACBU in the same manner as the TOC information of the CD to manage an audio signal of a group of A packs succeeding the A-CONT pack, audio data packed in the A packs is not integrally formed with video data of V packs. Therefore, the audio data is arranged independent of the video data, so that a memory capacity for the audio data can be sufficiently obtained.

Also, an audio playback time of the audio data can be managed according to audio control data of the A-CONT pack, and information of simple characters such as a music name relating to the audio data can be easily extracted from the ACD area of the A-CONT pack and can be displayed.

Also, TOC information such as information of a title, information of a start address, information of a music playing time and the like is arranged in the A-CONT pack, even though the reproduction of the audio data is continued, the information corresponding to a user's operation can be extracted from the TOC information of the A-CONT pack, and the reproduction of the extracted information can be started. Therefore, the extracted information can be displayed while the user entertains a musical composition. Also, in cases where the TOC information is arranged in the audio manager information (AMGI) and the audio title set information (ATSI), the TOC information is stored in a memory of a disc reproducing apparatus, the information corresponding to a user's operation can be immediately extracted from the memory, and the reproduction of the extracted information can be started. Also, though a large capacity of information like program chain information (PGCI) is usually recorded in the DVD-video disc, because it is not required to record a large capacity of information like program chain information (PGCI) in the DVD-audio disc, the DVD-audio disc can be efficiently managed.

Also, in cases where any video (V) data is not arranged in ACBS, three effects can be obtained. That is, a search operation and a random access operation for each title-music-index of three hierarchies can be performed (first effect). The detection of a top portion of each audio frame unit of the GOF, a time search and a random access can be performed (second effect). A time for playing back each title, a time for playing back each musical composition and a time for playing back each index can be managed in real time (third effect).

Also, in cases where video (V) data is arranged in the ACBS, the first to third effects can be obtained for the audio data, and a current time and a remaining time can be displayed and managed in real time for the audio data during the reproduction of each title or music. Also, in cases where video (V) data is arranged in contents, following effects can be obtained for the video data. A search operation and a random access operation for each title-PTT-cell of three hierarchies can be performed (first effect for the video data). The detection of a top portion of each video frame unit, a time search and a random access can be performed (second effect for the video data). A time for displaying each title, a time for displaying each PTT and a time for displaying each cell can be managed in real time (third effect for the video data). A current time and a remaining time can be displayed and managed in video frame unit time during the reproduction of each title or PTT (fourth effect for the video data).

Figure 18:
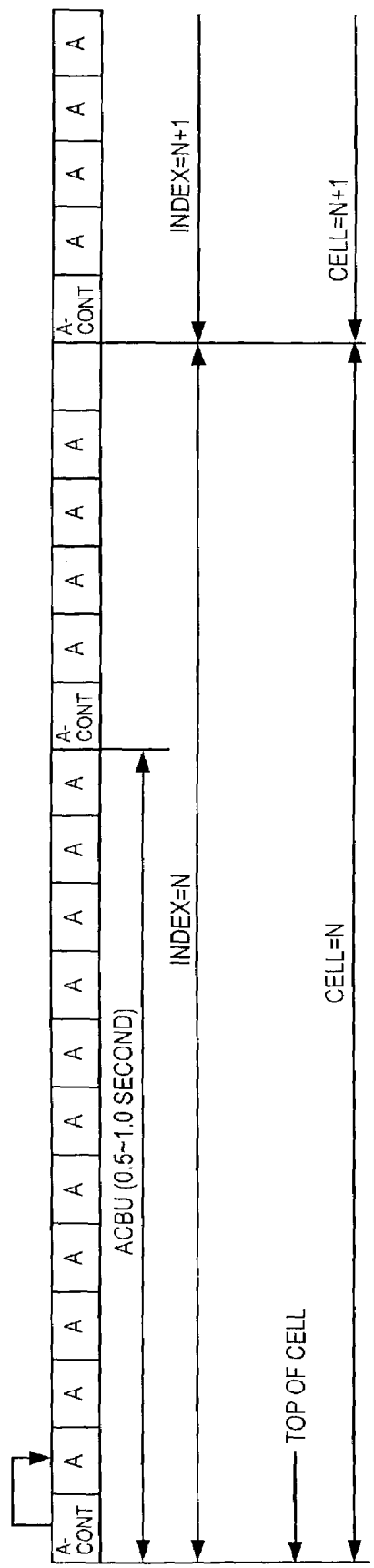
FIG. 18 is an explanatory view showing a modified example of an audio contents block unit (ACBU) shown in FIG. 1B.

In this embodiment, each ACBU of the DVD-audio format shown in FIG. 1B includes one A-CONT pack and one CONT pack. However, as shown in FIG. 18, it is applicable that each ACBU does not include any CONT pack. In this case, though any video signal is not recorded in the DVD-audio disc, a recording capacity for the audio signal in the DVD-audio disc can be increased, so that a size of the DVD-audio disc can be made small. Also, because a reproducing mechanism in a disc reproducing apparatus can be simplified, so that a DVD-audio disc suitable for a portable type disc reproducing apparatus can be obtained.

Next, a disc reproducing apparatus for the DVD-audio disc is described with reference to FIG. 19.

Figure 19:
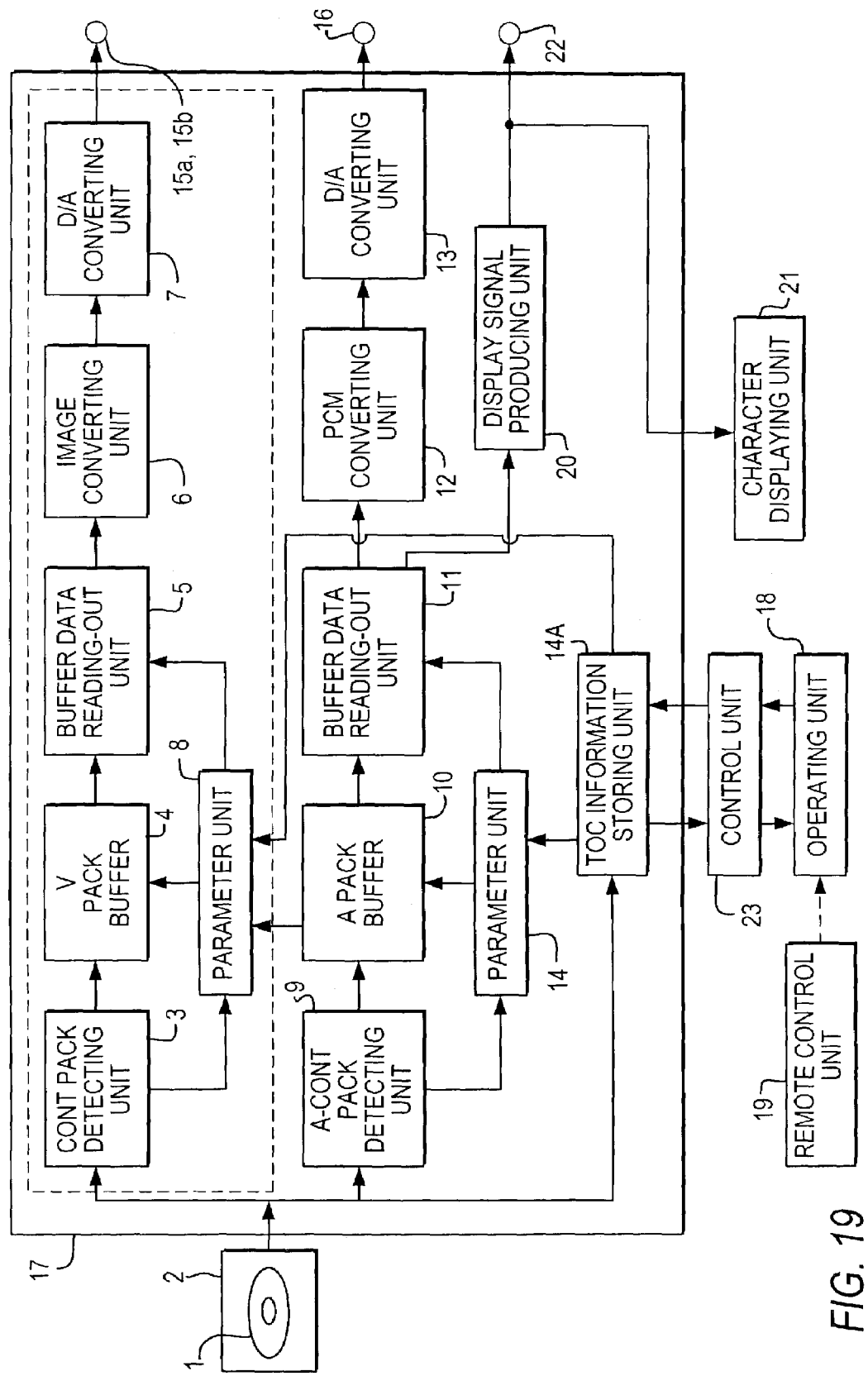
FIG. 19 is a block diagram showing a reproducing apparatus for a DVD-audio disc and its peripheral devices according to the first embodiment of the present invention.

FIG. 19 is a block diagram showing a reproducing apparatus for a DVD-audio disc and its peripheral devices according to the first embodiment of the present invention.

Pieces of data are modulated in the eight to fourteen modulation (EFM) to produce pieces of bit data, and the pieces of bit data are recorded in a DVD-audio disc 1 to have a data structure described above according to the first embodiment. When a control signal indicating a music selection, a reproducing operation, a fast feeding operation or a reproduction stopping operation is sent from a remote control unit 19 or an operating unit 18 to a control unit 23, a driving unit 2 and a disc reproducing apparatus 17 are controlled by the control unit 23. In cases where the reproducing operation is instructed by the unit 18 or 19, the bit data recorded in the DVD-audio disc 1 are read out by the driving unit 2, and an EFM demodulation is performed for the bit data. Therefore, a readout signal is obtained.

In the disc reproducing apparatus 17, the readout signal is sent to a CONT pack detecting unit 3 and an A-CONT pack detecting unit 9. In the CONT pack detecting unit 3, each CONT pack is detected from readout data of the readout signal, one or more control parameters of the CONT pack are set in a parameter unit 8, and a plurality of V packs controlled by the CONT pack are detected from the readout data of the readout signal and are written in a video (V) pack buffer 4 one after another. Pieces of user data (a video signal, sub-picture signal) of the V packs written in the V pack buffer 4 are read out by a buffer data reading-out unit 5 in the pack order indicated by the SCR (refer to FIG. 13) of each V pack and in the outputting time order indicated by a presentation time stamp (PTS) of the CONT pack. Thereafter, the user data are processed in an image converting unit 6 and a digital/analog (D/A) converting unit 7 and are output as an analog video signal through a pair of video output terminals 15a and 15b.

Also, in the A-CONT pack detecting unit 9, each A-CONT pack is detected from the readout data of the readout signal, one or more control parameters of the A-CONT pack are set in a parameter unit 14, and a plurality of A packs to be controlled by the A-CONT pack are detected from the readout data of the readout signal and are written in an A pack buffer 10 one after another. Pieces of user data (an audio signal) of the A packs written in the A pack buffer 10 are read out by a buffer data reading-out unit 11 in the pack order indicated by the SCR (refer to FIG. 13) of each A pack and in the outputting time order indicated by a current time of audio search data (ASD) of each A-CONT pack. Thereafter, the user data are processed in a pulse count modulation (PCM) converting unit 12 and a D/A converting unit 13 and are output as an analog audio signal through an audio output terminals 16. Also, display data (corresponding to audio character display information (ACD) shown in FIG. 15 and FIG. 16) of the A-CONT pack is sent to a display signal producing unit 20, and a display signal is produced from the display data. The display signal is output through a display signal output terminal 22 and/or is output to a character displaying unit 21.

Figure 20:
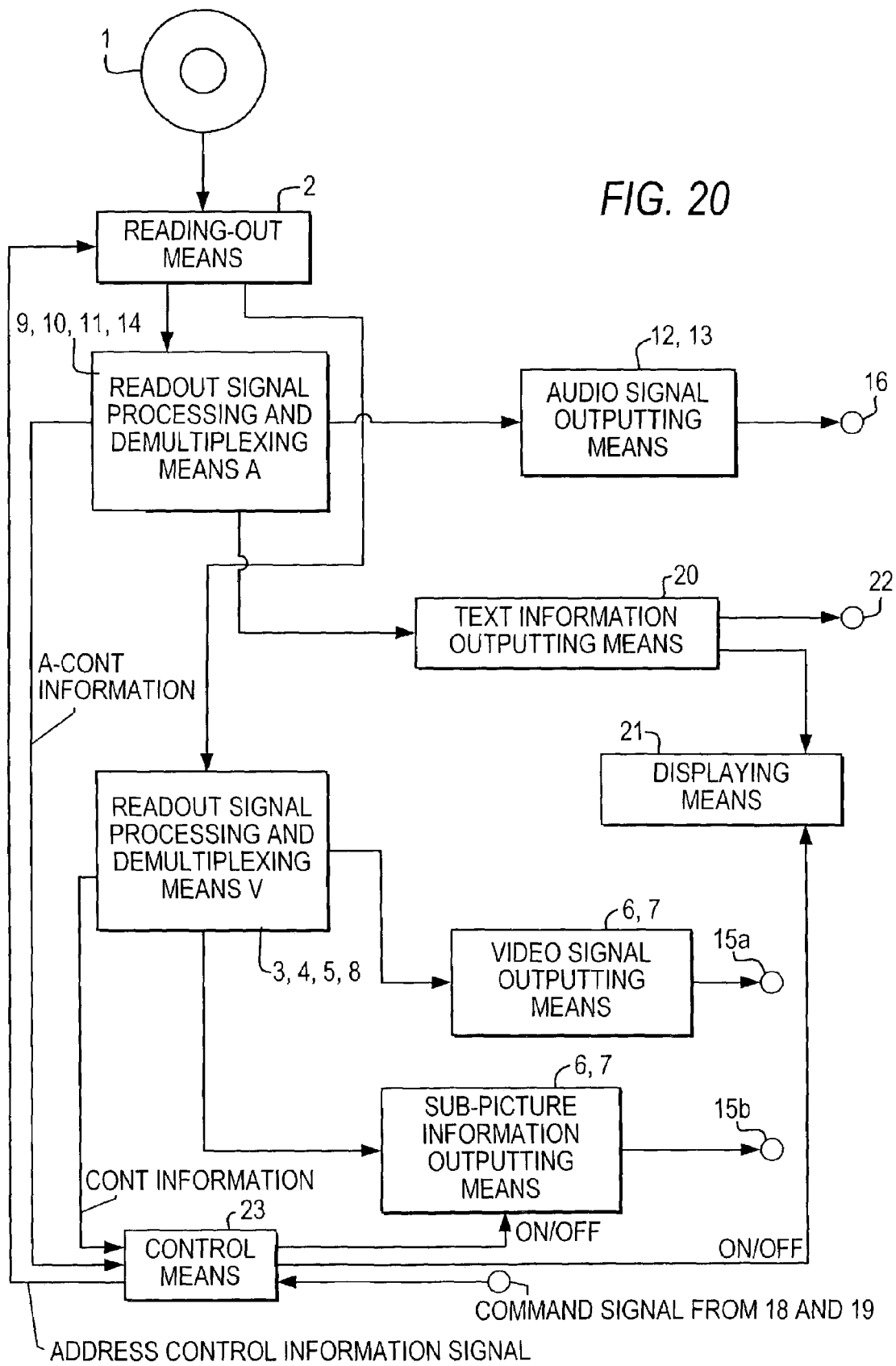
FIG. 20 is a block diagram functionally showing the disc reproducing apparatus and its peripheral devices shown in FIG. 19.

FIG. 20 is a block diagram functionally showing the disc reproducing apparatus 17 and its peripheral devices shown in FIG. 19.

In FIG. 20, a reading-out means 2 corresponds to the driving apparatus 2 shown in FIG. 19, a readout signal processing and demultiplexing means A (9, 10, 11 and 14) corresponds to the A-CONT pack detecting unit 9, the A pack buffer 10, the buffer data reading-out unit 11 and the parameter unit 14, an audio signal outputting means (12, 13) corresponds to the PCM converting unit 12 and the D/A converting unit 13, and a text information outputting means 20 corresponds to the display signal producing unit 20. Also, a readout signal processing and demultiplexing means V (3, 4, 5 and 8) corresponds to the CONT pack detecting unit 3, the V pack buffer 4, the buffer data reading-out unit 5 and the parameter unit 8, and a video signal outputting means (6, 7) and a sub-picture information outputting means (6, 7) correspond to the image converting unit 6 and the D/A converting unit 7. A displaying means 21 corresponds to the character displaying unit 21, and a control means 23 corresponds to the control unit 23.

As shown in FIG. 20, when a command signal indicating to play back a remarked musical composition is transmitted from the operating unit 18 or the remote control apparatus 19 to the control means 23, an address control information signal corresponding to the command signal is transmitted from the control means 23 to the reading-out means 2, so that the reading-out means 2 reads out data of the remarked musical composition from the DVD-audio disc 1 to obtain a readout data. The readout data is processed and demultiplexed in the readout signal processing and demultiplexing means A to obtain A-CONT information, an audio signal and text information (or character information) from the readout data. The A-CONT information is sent to the control means 23, the audio signal is sent to the audio signal outputting means (12, 13), and the text information is sent to the text information outputting means 20. Also, the readout data is processed and demultiplexed in the readout signal processing and demultiplexing means V to obtain CONT information, a video signal and sub-picture information from the readout data. The CONT information is sent to the control means 23, the video signal is sent to the video signal outputting means (6, 7), and the sub-picture signal is sent to the sub-picture information outputting means (6, 7).

Next, a disc reproducing apparatus using table-of-contents (TOC) information is described according to a second embodiment of the present invention.

FIG. 21 is an explanatory view showing in detail a format of audio manager information (AMGI).

As shown in FIG. 21, TOC information shown in FIG. 22 in detail is additionally recorded in an empty area of audio manager information (AMGI), a disc reproducing apparatus accesses to the TOC information, so that the top of a remarked musical composition is detected.

FIG. 22 is an explanatory view showing an example of general TOC information recorded in a read-in area of a CD.

As shown in FIG. 22, the same information is repeatedly recorded three times in a CD. When the TOC information is recorded in the DVD-audio disc, each piece of information of the TOC information is repeatedly recorded in the same manner as in the CD, or each piece of information of the TOC information is recorded only once.

In the TOC information used in the CD, in case of points ranging from 00 to 99, an absolute time (PMIN,PSEC,P-FRAME), at which each movement of a musical composition (or each musical composition) indicated by a point value is started, is expressed by PMIN indicating minute, PSEC indicating second and PFRAME indicating frame. Also, PMIN=01 for point=A0 indicates the first movement (or the first musical composition), and PSEC=PFRAME 0 is set. Also, PMIN=06 for point A1 indicates the final movement (or the final musical composition), and PSEC=PFRAME=0 is set. Also, in case of point=A2, an absolute time, at which a read-out area is started, is expressed by PMIN indicating minute, PSEC indicating second and PFRAME indicating frame. Therefore, the TOC information shown in FIG. 22 indicates that six movements of one musical composition (or six musical compositions) are recorded in the DVD-audio disc 1 (from point=01 to point=06).

Figure 23:
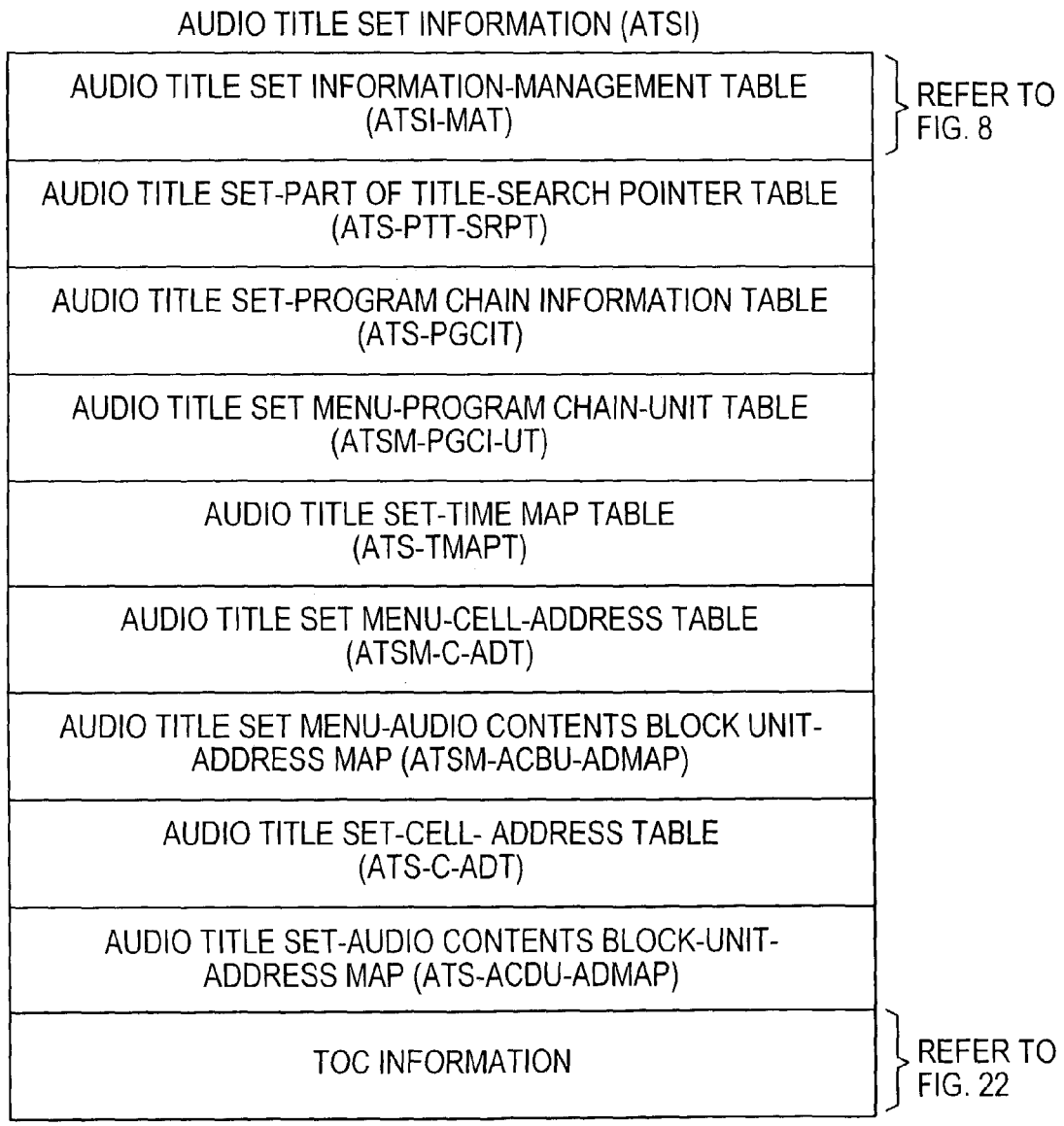
FIG. 23 is an explanatory view showing in detail a format of an audio title set information (ATSI), in which TOC information shown in FIG. 22 is additionally arranged, according to a modification of the second embodiment.

In this embodiment, the TOC information is recorded in an empty area of the AMGI. However, as shown in FIG. 23, it is applicable that the TOC information be additionally recorded in an empty area of audio title set information (ATSI). Also, it is applicable that the TOC information be additionally recorded in a reserve area (360 bytes) of the ACD packet of the A-CONT pack shown in FIG. 14.

Next, an audio signal encoding apparatus is described.

Figure 24:
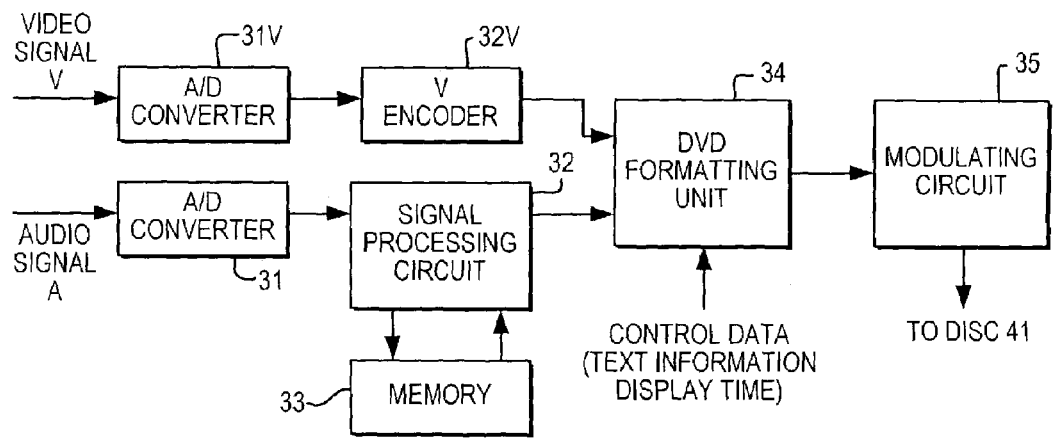
FIG. 24 is a block diagram of an audio signal encoding apparatus according to a third embodiment of the present invention.

FIG. 24 is a block diagram of an audio signal encoding apparatus according to a third embodiment of the present invention. An audio signal and a video signal processed in the encoding apparatus are prepared according to a DVD video standard as an example of a prescribed standard in this embodiment.

As shown in FIG. 24, an analog audio signal A is sampled in an A/D converter 31 at a high sampling frequency (corresponding to a sampling frequency At) such as 192 kHz, so that a PCM digital audio signal having a high resolution is produced from the analog audio signal. The PCM digital audio signal is composed of a series of PCM audio data ($Xb1,X1,Xa1,X2,Xb2,X3,Xa2,$ - - - ,$Xbi,X2i-1,Xai,X2i,$ - - - ) corresponding to a high resolution curved line α. Here, each piece of PCM audio data is, for example, expressed by 24 bits, and the symbol "i" is a positive integral number. Thereafter, the series of PCM audio data $\{Xbi,X2i-1,Xai,X2i\}$ is encoded in a signal processing circuit 32 shown in FIG. 25 in detail and a memory 33 and is sent to a DVD formatting unit 34.

Figure 25:
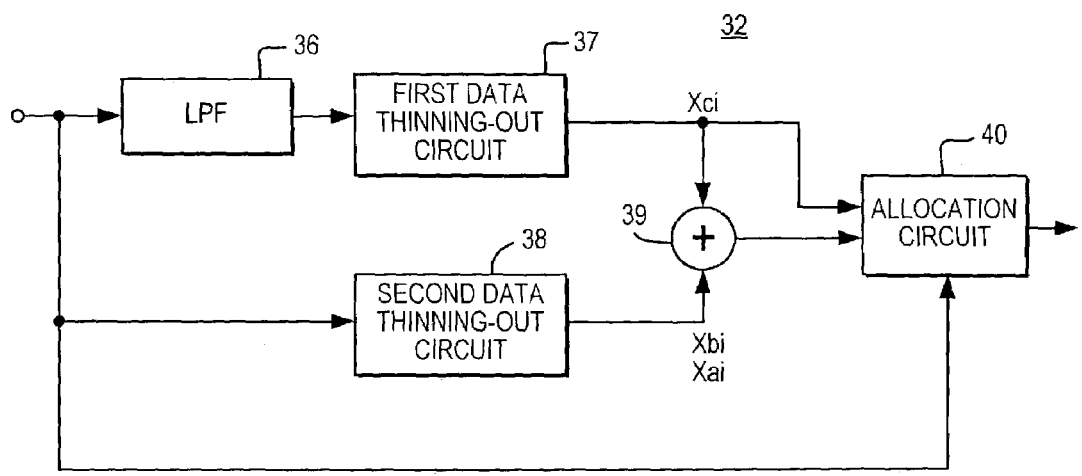
FIG. 25 is a block diagram of a signal processing circuit shown in FIG. 24.

FIG. 25 is a block diagram of the signal processing circuit 32.

As shown in FIG. 25, a frequency band of the series of PCM audio data $\{Xbi,X2i-1,Xai,X2i\}$ is limited to half in a low pass filter (LPF) 36 such as a finite-duration impulse-respons e (FIR) filter. Therefore, a series of band limited audio data ($Xc1,*,*,*,Xc2,*,*,*,Xc3,*,*,*,$ - - - ,$Xci,*,*,*,$ - - - ) corresponding to a low resolution curved line β is produced as a band limited digital audio signal from the series of PCM audio data $\{Xbi,X2i-1,Xai,X2i\}$. Here, the symbol "*" denotes one piece of band limited audio data.

Thereafter, in a first data thinning-out circuit 37, the piece of data "*" are removed from the series of band limited audio data, and a series of sampling frequency reduced data $\{Xci\}$= ($Xc1,Xc2,Xc3,$ - - - ,$Xci,$ - - - ) is produced as a sampling frequency reduced signal from the series of band limited audio data. The series of sampling frequency reduced data $\{Xci\}$ denotes a data series obtained by band-limiting the series of PCM audio data $\{Xbi,X2i-1,Xai,X2i\}$ and reducing the sampling frequency (192 kHz) to ¼.

Also, in a second data thinning-out circuit 38, the pieces of data Xi are removed from the PCM audio data {Xbi,X2$i$−1, Xai,X2$i$}, and a series of thinned-out audio data (Xb1,Xa1, Xb2,Xa2, - - - ,Xbi,Xai, - - - ) is produced as a thinned-out audio signal from the PCM audio data.

Thereafter, in a difference calculating circuit 39 made of an adder, a difference Δ1$i$=Xbi−Xci and a difference Δ2$i$=Xai−Xci are calculated, so that a series of differential audio data {Δ1$i$} and a series of differential audio data {Δ2$i$} are produced from the series of sampling frequency reduced data {Xci} and the series of thinned-out audio data {Xbi,Xai}. The differential audio data Δ1$i$ and Δ2$i$ can be respectively expressed by 24 bits (=3 bytes) or less, and the number of bits expressing each piece of differential data is set to a fixed value of 24 or is set to be variable.

Thereafter, in an allocation circuit 40, the series of sampling frequency reduced data {Xci}, the series of differential audio data {Δ1$i$} and the series of differential audio data {Δ2$i$} are packed to produce a packet of user data {Xci,Δ1$i$,Δ2$i$} (refer to FIG. 13) having 2034 bytes (1 packet=2034 bytes). The packet of user data {Xci,Δ1$i$,Δ2$i$} is output to the DVD formatting unit 34.

Also, in cases where each piece of PCM audio data is expressed by 16 bits, it is applicable that the series of PCM audio data {Xbi,X2$i$−1,Xai,X2$i$} be directly packed in the allocation circuit 40 to produce a packet of user data {Xbi, X2$i$−1,Xai,X2$i$}. In this case, the packet of user data {Xbi, X2$i$−1,Xai,X2$i$} is output to the DVD formatting unit 34.

Also, an analog video signal V is converted into a digital video signal in an A/D converting unit 31V, the digital video signal is encoded in a V encoder 32V to produce pieces encoded video data of the MPEG format, the pieces encoded video data are packed to produce a packet of user data shown in FIG. 13, and the packet of user data is sent to the DVD formatting unit 34.

In the DVD formatting unit 34, the packet of user data produced from the analog audio signal and the packet of user data produced from the analog video signal are packed in a format shown in FIG. 1C, FIG. 13, FIG. 29A, FIG. 15, FIG. 16 and FIG. 26. Thereafter, the data formatted in the DVD formatting unit 34 are modulated in a modulating circuit 35 according to a modulation method corresponding to a DVD-audio disc 41 (or a DVD-Avd disc 41) to produce pieces of modulated data, and the pieces of modulated data are recorded in the DVD-audio disc (or a DVD-Avd disc).

In the CONT pack of each video contents block unit (VCBU) of the DVD-video format shown in FIG. 1A, information (shown in FIG. 26 to FIG. 28 in detail) for controlling a plurality of packs such as V packs succeeding the CONT pack is arranged. Also, audio data is arranged in each A pack shown in FIG. 13, and closed caption (CC) data is arranged as well as video data in each V pack shown in FIG. 13 as data other than audio data. Also, a D pack of real time information data (D) is arranged in each audio contents block unit (ACBU) of the DVD-audio format shown in FIG. 1C, and text information relating to audio data of the A packs of the ACBU and a displaying time of the text information are arranged in the D pack as the real time information data.

Figure 1C:
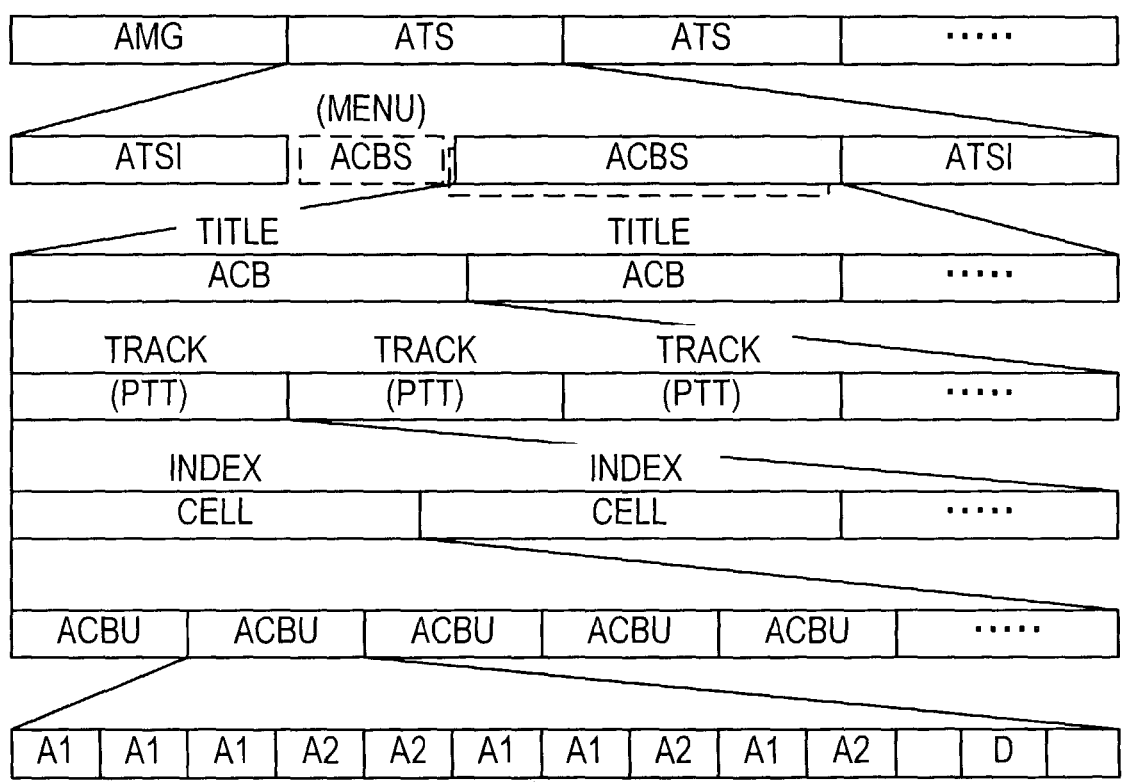
FIG. 1C is an explanatory view showing a format of a DVD-audio according to third to fifth embodiments of the present invention.

In cases where a first audio signal arranged in one A1 pack relates to a second audio signal arranged in one A2 pack, as shown in FIG. 1C, the A1 pack and the A2 pack are arranged in adjacent to each other. For example, because an L-channel audio signal and a R-channel audio signal relating to each other in stereo are arranged in adjacent to each other in the ACBU. Also, a plurality of audio signals relating to each other in multi-channel such as 5/6/8 channels are arranged in adjacent to each other in the ACBU.

Also, in cases where a text (or characters) is displayed during the reproduction of an audio signal, a D pack indicating the text is arranged in adjacent to an A pack indicating the audio signal. Also, in cases where a still picture is displayed during the reproduction of an audio signal, a V pack or SPCT pack indicating the still picture is arranged in adjacent to an A pack indicating the audio signal.

As shown in FIG. 13, in each D pack, a pack header (14 bytes) composed of pack start information of 4 bytes, system clock reference (SCR) information of 6 bytes, multiplex (MUX) rate information of 3 bytes and a stuffing of 1 byte is added to user data of 2034 bytes in the same manner as in the A pack and V pack.

Next, the configuration of pieces of information packed in the CONT pack is described in detail with reference to FIG. 26 to FIG. 28.

FIG. 26 is an explanatory view showing in detail a format of a CONT pack shown in FIG. 1A, FIG. 27 is an explanatory view showing in detail presentation control information (PCI) data shown in FIG. 26, and FIG. 28 is an explanatory view showing in detail data search information (DSI) data shown in FIG. 26.

As shown in FIG. 26, the CONT pack, called a navigation (NV) pack in the DVD video standard, is composed of a pack header of 14 bytes, a system header of 24 bytes, a presentation control information (PCI) packet of 986 bytes and a data search information (DSI) packet of 1024 bytes. The PCI is called reproduction control information, and the PCI packet is composed of a packet header of 6 bytes, a sub-stream identification of 1 byte and PCI data of 979 bytes. The DSI packet is composed of a packet header of 6 bytes, a sub-stream identification of 1 byte and DSI data of 1017 bytes.

As shown in FIG. 27, the PCI data, which denotes navigation data for controlling the reproduction of a VOBU, is composed of PCI general information (PCI-GI) of 60 bytes, a non-seamless angle information (NSML-AGLI) of 36 bytes, highlight information (HLI) of 694 bytes and record information (RECI) of 189 bytes. Here, the VCBU shown in FIG. 1A is the same as the VOBU provided in the DVD video standard. The presentation control information (PCI) is also called real time information (RTI).

As shown in FIG. 28, the data search information (DSI), which denotes navigation data used to search data and to perform the seamless playback of the VCBU, is composed of DSI general information (DSI-GI) of 32 bytes, seamless playback information (SML-PBI) of 148 bytes, seamless angle information (SML-AGLI) of 54 bytes, VOBU search information (VOBU-SRI) of 168 bytes, synchronization information (SYNCI) of 144 bytes and a reserve area of 471 bytes.

Next, the configuration of pieces of information packed in each D pack is described.

Figure 29A:
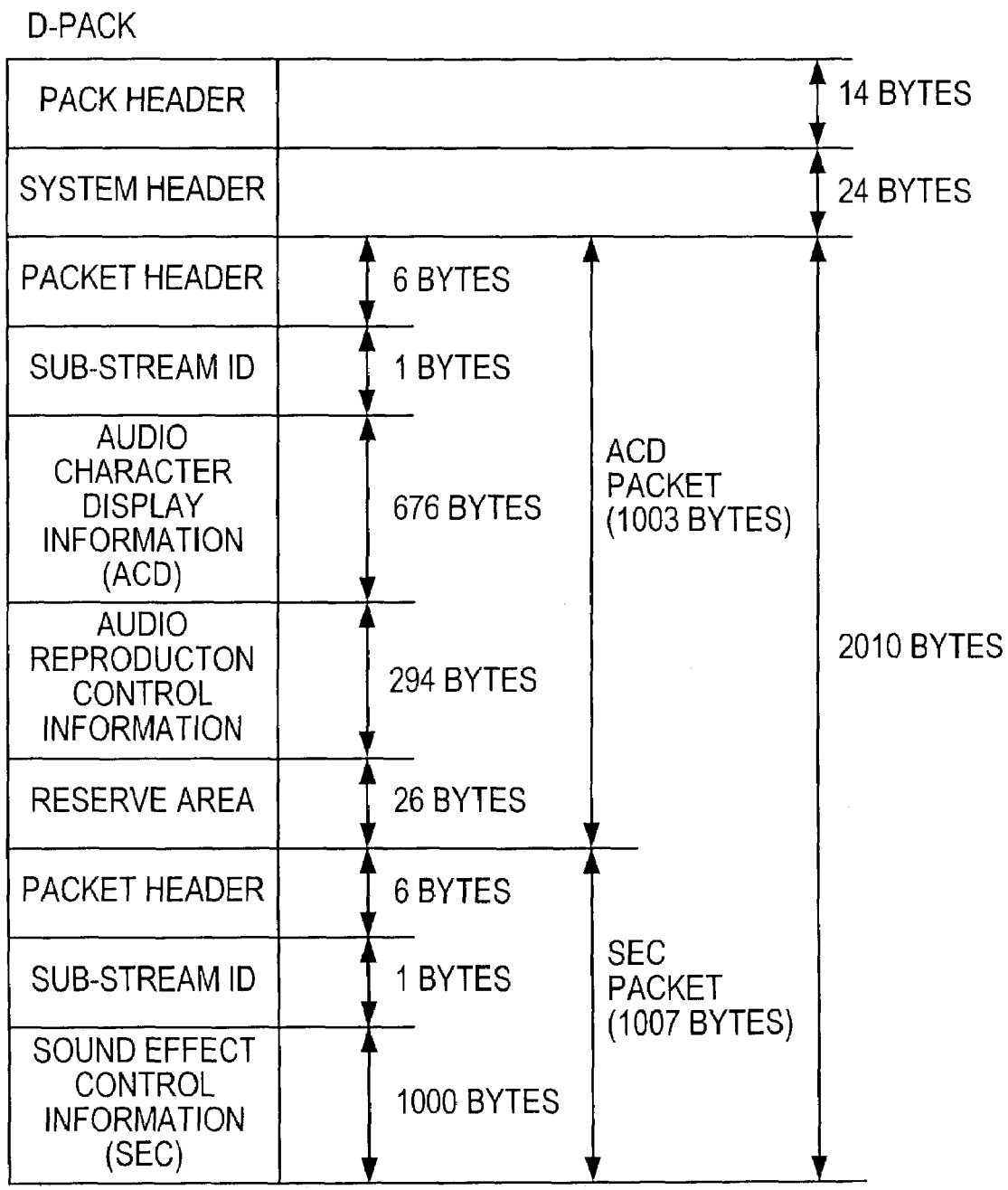
FIG. 29A is an explanatory view showing in detail a format of a real time information data (D) pack shown in FIG. 1B.

FIG. 29A is an explanatory view showing in detail a format of the D pack.

As shown in FIG. 29A, the D pack is composed of a pack header of 14 bytes, a system header of 24 bytes, an audio character real time information data (ACD) packet of 1003 bytes and a sound effect control (SEC) packet of 1007 bytes. The ACD packet is composed of a packet header of 6 bytes, a sub-stream identification of 1 byte, audio character display (ACD) information of 676 bytes, a plurality of types of audio reproduction control information of 294 bytes and a reserve area of 26 bytes. Also, the SEC packet is composed of a packet header of 6 bytes, a sub-stream identification of 1 byte and pieces of sound effect control (SEC) information of 1000 bytes. The ACD information indicates an application time period (indicated by a display start time and a display end time), and the SEC information is applied for audio data during the application time period.

Figure 29B:
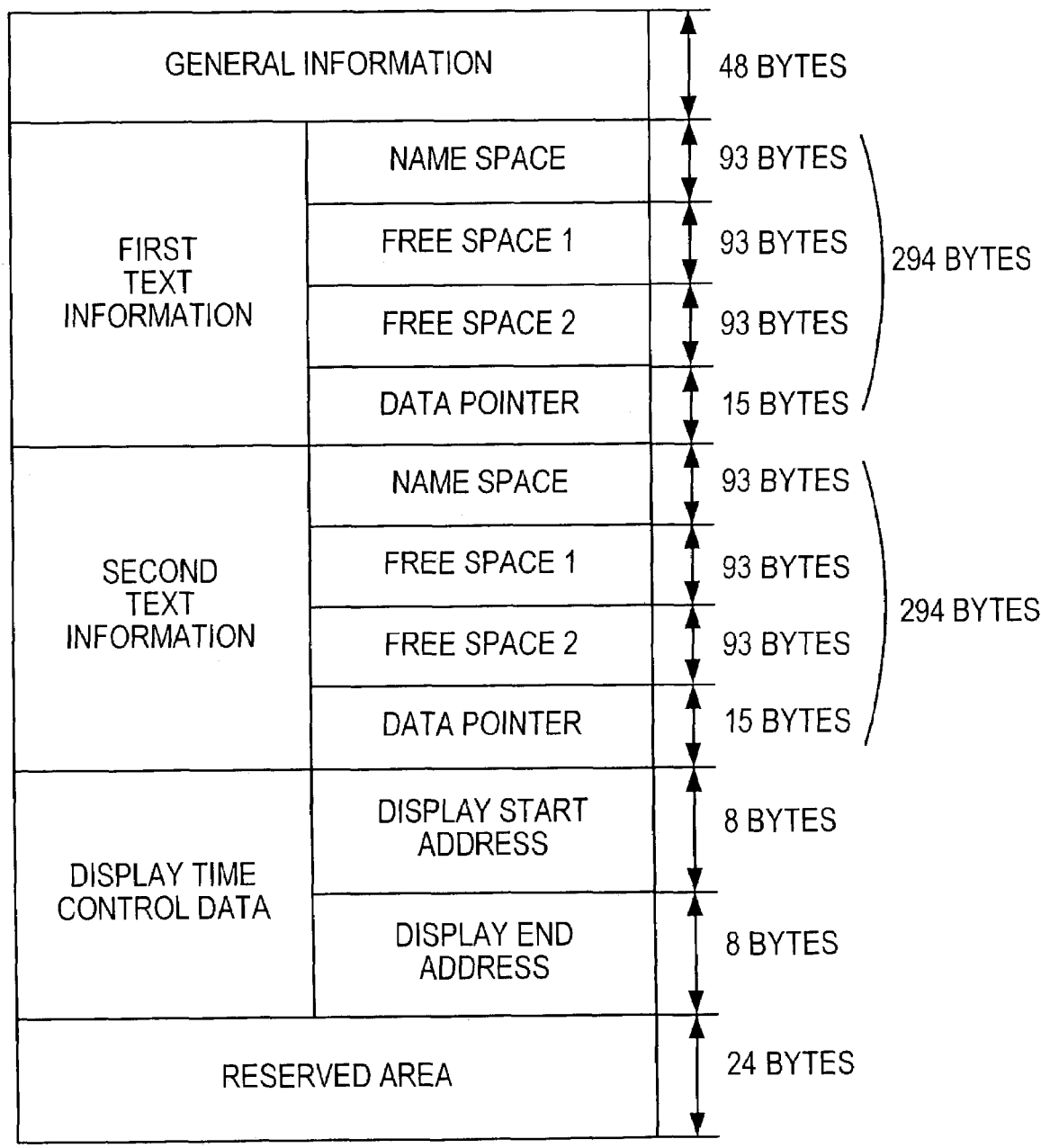
FIG. 29B is an explanatory view showing a first example of a format of an audio character display (ACD) area shown in FIG. 29A according to the third embodiment.

FIG. 29B is an explanatory view showing a first example of a format of the ACD information area.

As shown in FIG. 29B, an area of the ACD information in a first example is composed of a general information area of 48 bytes, a first text information area of 294 bytes, a second text information area of 294 bytes, a display time control data area of 16 bytes and a reserve area of 24 bytes. The first text information area for first characters Ch1 and the second text information area for second characters Ch2 are respectively composed of a name space area of 93 bytes, two free space areas of 186 bytes (93 bytes * 2) and a data pointer area of 15 bytes. In each name space area, as shown in FIG. 16, header data of quarter-sized characters (31 bytes) and text data of full-sized characters and/or half-sized characters (62 bytes) are, for example, arranged to display a music name. Also, an address of the top A pack and an address of the final A pack in a series of A packs are arranged in the display time control data area as a display start time (8 bytes) and a display end time (8 bytes) for the displayed characters.

The general information of 48 bytes is, for example, composed of service level information of 16 bytes, language code information of 12 bytes, character set code information of 6 bytes, display item information of 6 bytes, "difference of ACD information from previous ACD information" information of 2 bytes and reserve information of 6 bytes. The service level information of 16 bytes indicates a display size, a display type, a distinction between audio information, video information and sub-picture (SP) information, and an audio stream. Also, the inputting of the characters is mandatory, and a bit map of the characters is optional. In the character set code information of 6 bytes, a first language of the first characters Ch1 and a second language of the second characters Ch2 are respectively indicated by 2 bytes in the same manner as in a video file, a maximum of 8 languages are indicated for each file. English is mandatory.

As the character set code information of 6 bytes, a maximum of 15 character codes corresponding to the language codes can be arranged. The existence of the languages for the characters Ch1 or Ch2 and types of the languages are indicated by 1 byte. For example, character codes IS0646, IS08859-1 and MS-JIS are used.

The display item information of 6 bytes indicates the existence of data arranged in each free space shown in FIG. 29B, the existence of data arranged in the data pointer and an identification. Data arranged in the name space is mandatory, and a title name, a music name and an artist name are necessarily written.

Contents of the sound effect control (SEC) information of 1000 bytes are arbitrary. For example, the SEC information is composed of 40 types of sound effect control information (or audio reproduction control information) respectively having 25 bytes. In an area of each type of audio reproduction control information, graphic equalizer information of 20 bytes, level balance information of 3 bytes and reverberation adding information of 2 bytes are arranged. These piece of information are selected as audio reproduction control information by a user to control a sound quality of the reproduced audio signal. These pieces of audio reproduction control information are recommended by professional human mixers and are determined to set a sound quality of an audio signal in a reproduction operation to a best condition according to a music category (for example, classic, jazz, rock or background music) of the audio signal, a playing condition of the music, a recording condition of the audio signal or circumstances of a reproducing condition in cases where the user reproduces the music of the audio signal arranged in the A packs.

Figure 30A:
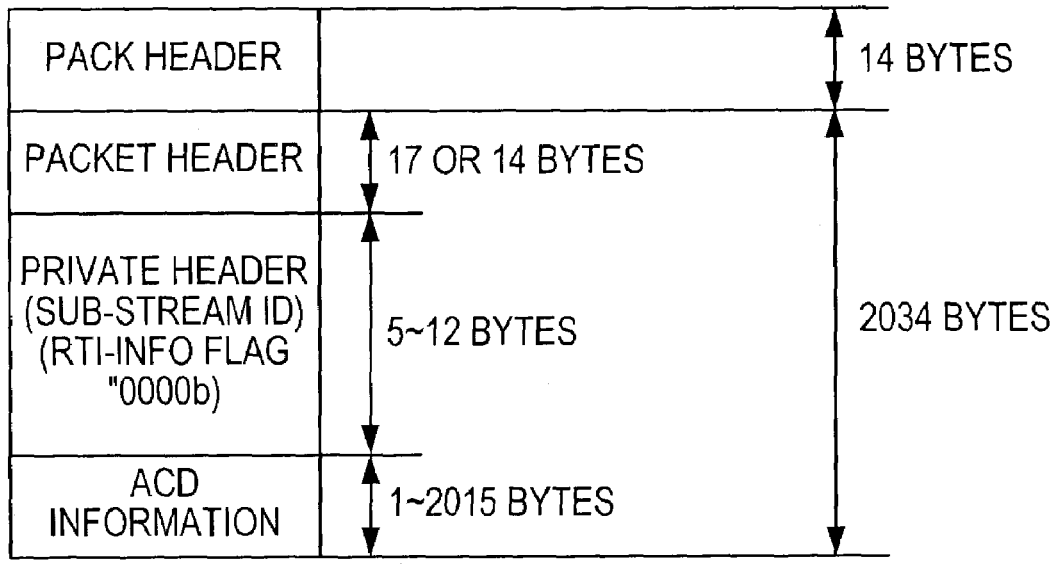
FIG. 30A is an explanatory view showing in detail a format of a real time information data (D) pack, in which audio character real time information data (ACD) is included, arranged in an audio contents block unit (ACBU) shown in FIG. 1B according to a modification of the third embodiment.
Figure 30B:
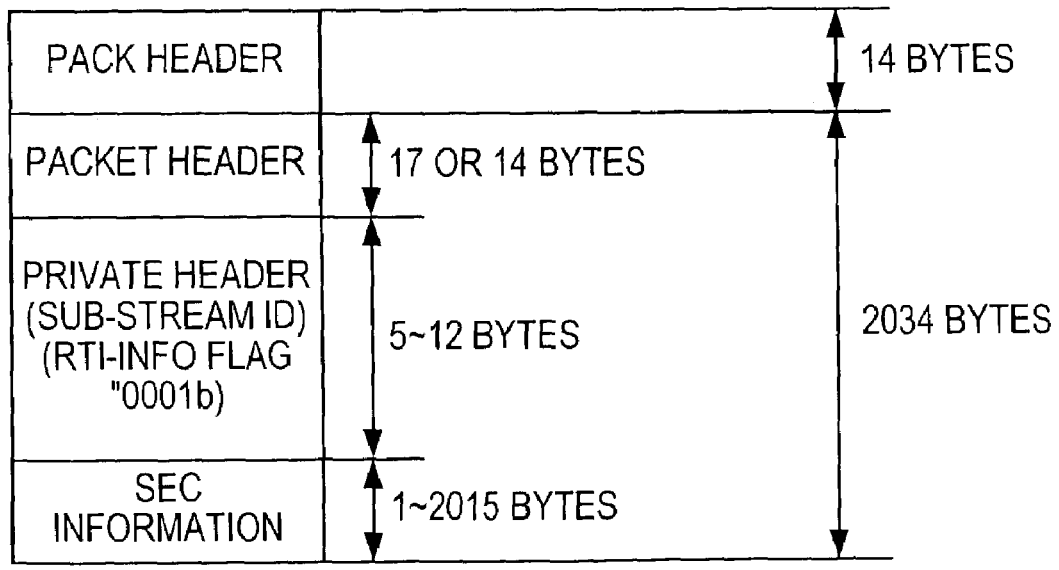
FIG. 30B is an explanatory view showing in detail a format of another real time information data (D) pack including sound effect control data (SEC) according to the modification of the third embodiment.

In this embodiment, the ACD information and the SEC information are recorded in the same D pack. The D pack is also called a real time information (RTI) pack. However, it is applicable that the ACD information be recorded in a first type of D pack shown in FIG. 30B and the SEC information be recorded in a second type of D pack shown in FIG. 30C. In this case, a length of the ACD packet and a length of the SEC packet can be arbitrarily set within 2034 bytes. As shown in FIG. 30A and FIG. 30B, a length of a packet header for a top ACD packet is 17 bytes, and a length of a packet header for another ACD packet following the top ACD packet is 14 bytes. A private header succeeding the packet header includes a sub-stream identification (1 byte) and a RTI-INFO flag denoting a pack type identification (1 byte), and a length of the private header is ranged from 5 to 12 bytes. In cases where the RTI-INFO flag="0000b" is set in the private header, the ACD information is recorded in the D pack as real time information. In contrast, in cases where the RTI-INFO flag "0001b" is set in the private header, the SEC information is recorded in the D pack as real time information. Therefore, the RTI-INFO flag functions as identification information for identifying the. ACD or SEC information recorded in the D pack. Accordingly, a DVD audio/video data (DVD-Avd) disc 41 having a data structure shown in FIG. 31 can be obtained by using the audio signal encoding apparatus shown in FIG. 24. Also, a DVD-audio disc 41 having a data structure shown in FIG. 32 can be obtained by using the audio signal encoding apparatus shown in FIG. 24.

Figure 33:
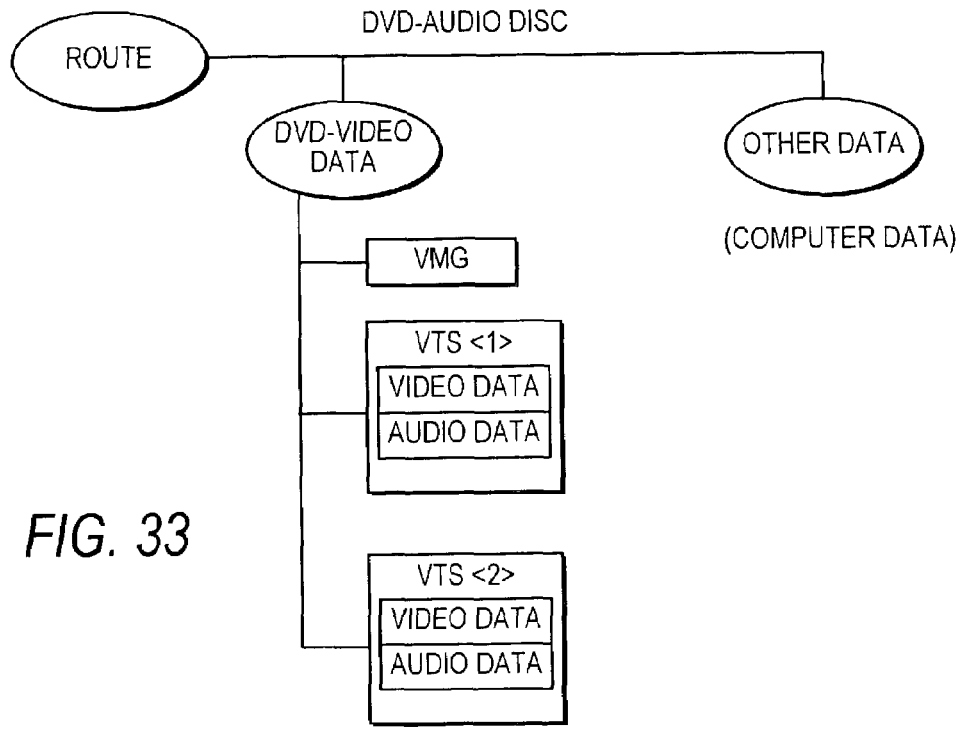
FIG. 33 is an explanatory view showing a data structure of a conventional DVD-video disc.

In general, as shown in FIG. 33, DVD-video data is recorded in a conventional DVD-video disc. In a data structure of the DVD-video data, a first video title set (VTS <1>) having audio data and video data, a second video title set (VTS <2>) having audio data and video data and a video manager (VMG) including video manager information (VMGI) for managing the first and second video title sets are included.

Figure 32:
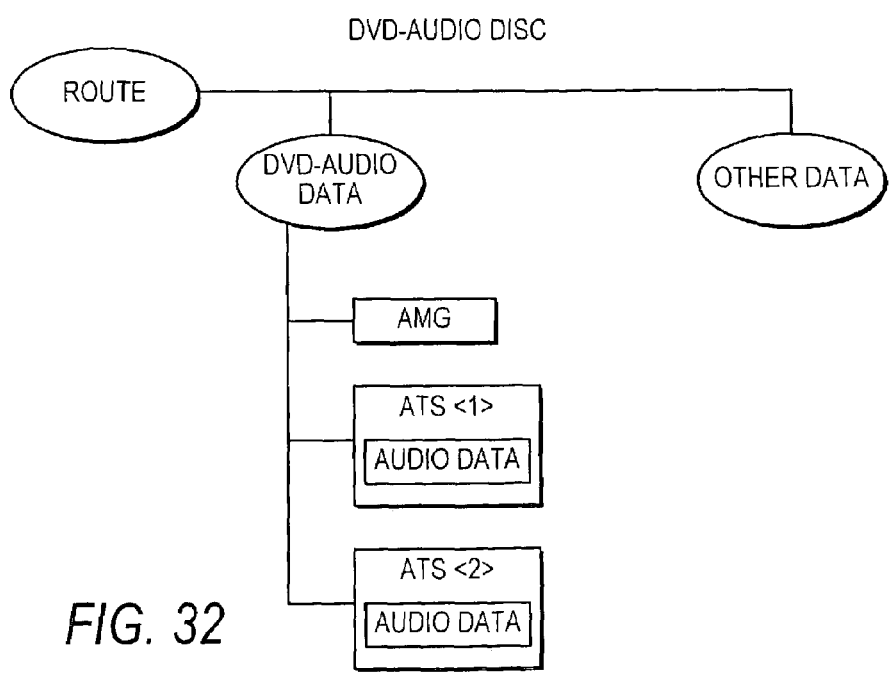
FIG. 32 is an explanatory view showing a data structure of a DVD-audio disc according to the present invention.

In contrast, as shown in FIG. 32, DVD-audio data is recorded in the DVD-audio disc 41. In a data structure of the DVD-audio data, a first audio title set (ATS <1>) having only audio data, a second audio title set (ATS <2>) having only audio data and an audio manager (AMG) including audio manager information (AMGI) for managing the first and second audio title sets are included (refer to FIG. 2). That is, the audio title sets of the DVD-audio disc 41 are dedicated to audio data and information relating to the audio data. In this specification, each audio title set dedicated to audio data and information relating to the audio data is called an audio dedicated title set, and each title of the audio dedicated title set is called an audio dedicated title.

Figure 31:
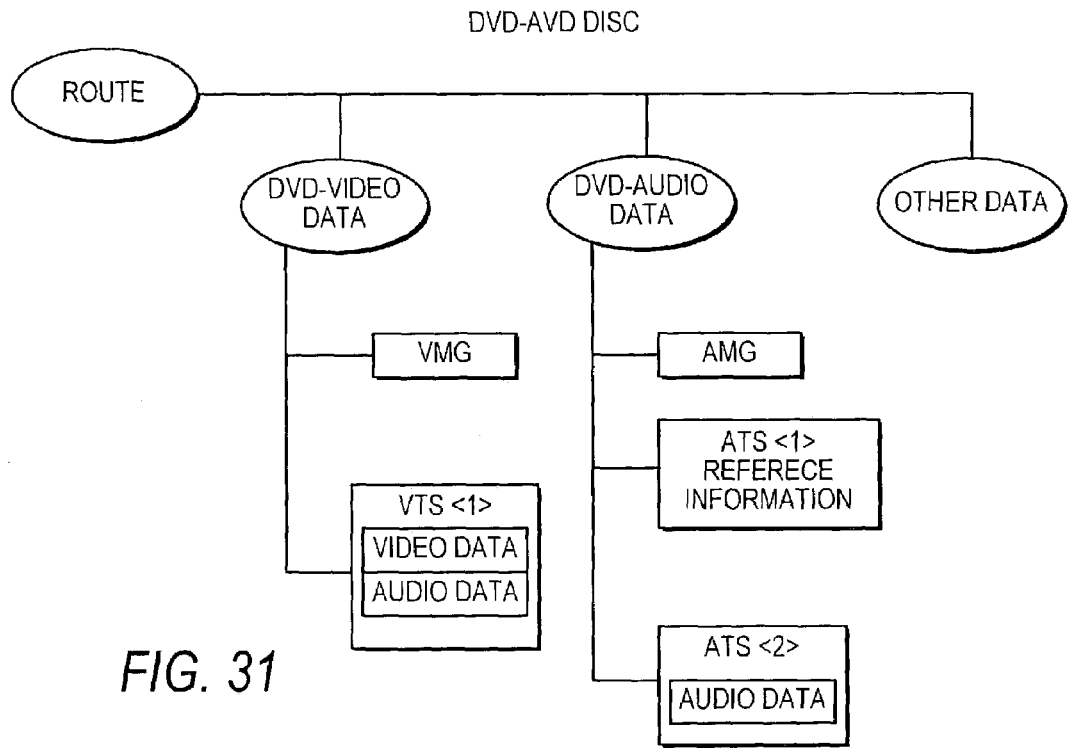
FIG. 31 is an explanatory view showing a data structure of a DVD audio-AV data (DVD-avd) disc according to the present invention.

Also, as shown in FIG. 31, DVD-video data and DVD-audio data are recorded in the DVD-Avd disc 41. In a data structure of the DVD-video data, a video manager (VMG) having video manager information (VMGI) and a first video title set (VTS <1>) having audio data and video data are included. The VTS <1> is managed by the video manager information. In a data structure of the DVD-audio data, a first audio title set (ATS <1>) having reference information, a second audio title set (ATS <2>) having only audio data and an audio manager (AMG) having audio manager information (AMGI) for managing the first and second audio title sets are included. That is, each audio title set of the DVD-Avd disc 41 is an audio dedicated title set, and each audio title is an audio dedicated title.

Accordingly, as shown in FIG. 32, the DVD-audio disc 41 having the data structure, in which a first pack (an audio pack) including audio data, a second pack (a D pack) including both sound control information (corresponding to sound effect control (SEC) information) relating to the audio data of the first pack and application time control data (corresponding to audio character display (ACD) information) for controlling an application time of the sound control information and a managing area of an audio manager information (AMGI) including information for managing the reproduction of the first pack are arranged for an audio specialized title having only the audio data, can be obtained.

Figure 34:
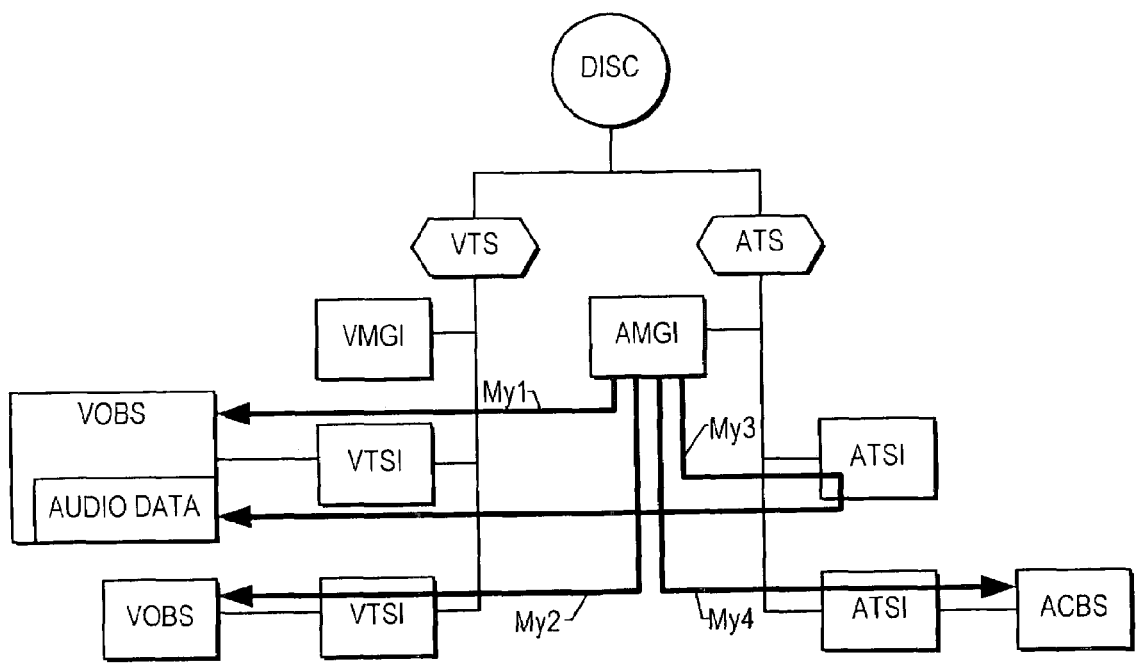
FIG. 34 is an explanatory view showing a disc reproducing method.

Also, as shown in FIG. 31, the DVD-Avd disc 41 having the data structure, in which a first pack (an audio pack) including audio data, a second pack including both sound control information (corresponding to sound effect control (SEC) information) relating to the audio data of the first pack and application time control data (corresponding to audio character display (ACD) information) for controlling an application time of the sound control information and a managing area of an audio manager information (AMGI) including information for managing the reproduction of the first pack are arranged for an audio specialized title having only the audio data and a first pack (an audio pack) including audio data, a third pack (a video pack) including video data, a navigation pack (CONT pack) of the DVD video standard including information for controlling the reproduction of the first and third packs and a managing area of a video manager information (VMGI) of the video manager (VMG) including information for managing the reproduction of the first and third packs are arranged for a title having the audio data and the video data, can be obtained. Next, a reproducing method for reproducing a signal from each of the three types of discs shown in FIG. 31 to FIG. 33 is described with reference to FIG. 34. FIG. 34 is an explanatory view showing a disc reproducing method according to the third embodiment of the present invention.

As shown in FIG. 34, in cases where a fourth reproducing method Mr4 is adopted, the audio title (ATS <2>) dedicated to audio data in the DVD-Avd disc 41 (FIG. 31) and the audio titles (ATS <1>, ATS <2>) dedicated to audio data in the DVD-audio disc 41 (FIG. 32) can be reproduced by accessing to the audio contents block set (ACBS) through the audio title set information (ATSI) according to the audio manager information (AMGI). A first reproducing method Mr1, a second reproducing method Mr2 and a third reproducing method Mr3 respectively indicate that the audio manager information (AMGI) is used to access to each video title of the video title set. For example, in case of the third reproducing method Mr3, audio contents of the VOBS is managed by the audio manager information (AMGI). Therefore, the audio specialized title recorded in the DVD-Avd disc 41 (FIG. 31) or the DVD-audio disc 41 (FIG. 32) can be reproduced while the disc 41 maintain the compatibility with the DVD as one type of DVD in a DVD family.

Next, a DVD reproducing apparatus is described with reference to FIG. 35.

Figure 35:
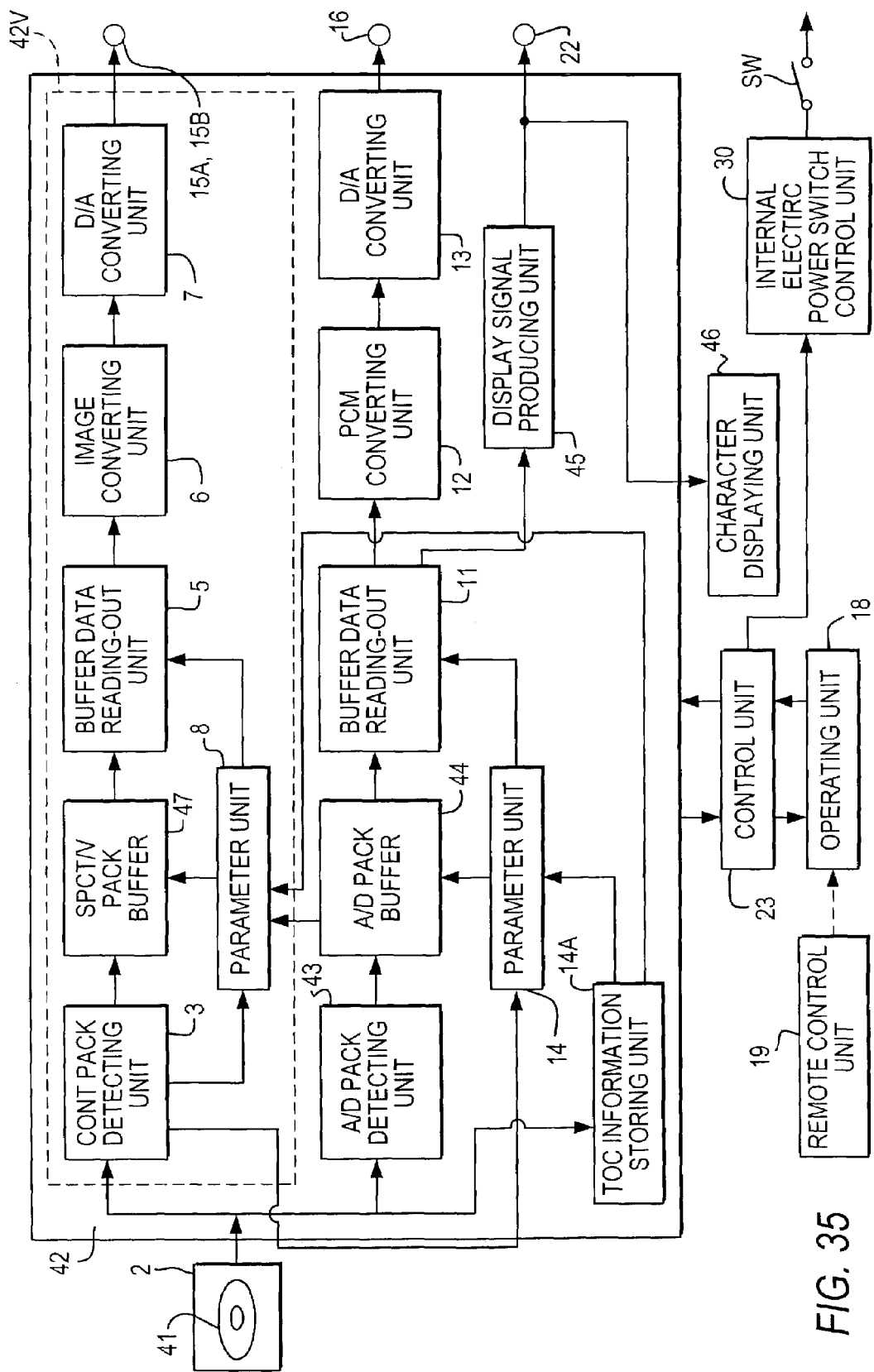
FIG. 35 is a block diagram showing a reproducing apparatus for a DVD-audio disc (or a DVD-avd disc) and its peripheral devices according to the third embodiment of the present invention.

FIG. 35 is a block diagram showing a reproducing apparatus for the DVD-Avd disc 41 (or the DVD-audio disc 41) and its peripheral devices according to the third embodiment of the present invention.

Pieces of data are modulated in the eight to fourteen modulation (EFM) to produce pieces of bit data, and the pieces of bit data are recorded in the DVD-Avd disc 41 (or the DVD-audio disc 41) to have a data structure described above according to the third embodiment. When a control signal indicating a music selection, a reproducing operation, a fast feeding operation or a reproduction stopping operation is sent from the remote control unit 19 or the operating unit 18 to the control unit 23, the driving unit 2 and a disc reproducing apparatus 42 are controlled by the control unit 23. In cases where the reproducing operation is instructed by the unit 18 or 19, the bit data recorded in the DVD-Avd disc 41 (or the DVD-audio disc 41) are read out by the driving unit 2, and an EFM demodulation is performed for the bit data. Therefore, a readout signal is obtained.

In the disc reproducing apparatus 42, the readout signal is sent to the CONT pack detecting unit 3 and an A/D pack detecting unit 43. In the CONT pack detecting unit 3, each CONT pack is detected from readout data of the readout signal, one or more control parameters of the CONT pack are set in the parameter unit 8 and the parameter unit 14, and a plurality of V packs controlled by the CONT pack are detected from the readout data of the readout signal and are written in the V pack buffer 4 one after another. Pieces of user data (a video signal, a still picture signal and sub-picture signal) of still picture (SPCT) packs and V packs written in a still picture and video (SPCT/V) pack buffer 47 are read out by the buffer data reading-out unit 5 in the pack order indicated by the SCR (refer to FIG. 13) of each V pack and SPCT pack and in the outputting time order indicated by a presentation time stamp (PTS). Thereafter, the user data are processed in the image converting unit 6 and the digital/analog (D/A) converting unit 7 and are output as an analog video signal through the pair of video output terminals 15a and 15b. The units 3 to 8 compose a video processing unit 42V, and the video processing unit 42V is operable in cases where an internal electric power switch control unit 30 sets an electric power switch SW to an "on" condition under the control of the control unit 23.

Also, in the A/D pack detecting unit 42, a plurality of A packs and D packs are detected from the readout data of the readout signal and are written in an A/D pack buffer 44 one after another. Pieces of user data (an audio signal) of the A packs written in the A/D pack buffer 44 are read out by the buffer data reading-out unit 11 in the pack order indicated by the SCR (refer to FIG. 13) of each A pack and in the arranged order of each pack specified by audio search data (ASD) of the TOC information of the disc 41. Thereafter, the user data are processed in the pulse count modulation (PCM) converting unit 12 and the D/A converting unit 13 and are output as an analog audio signal through the audio output terminals 16.

Also, display data (corresponding to audio character display (ACD) information shown in FIG. 29A and FIG. 29B) of the D pack is sent to a display signal producing unit 45, and a display signal is produced from the display data. The display signal is output through the display signal output terminal 22 and/or is output to a character displaying unit 46.

Figure 36:
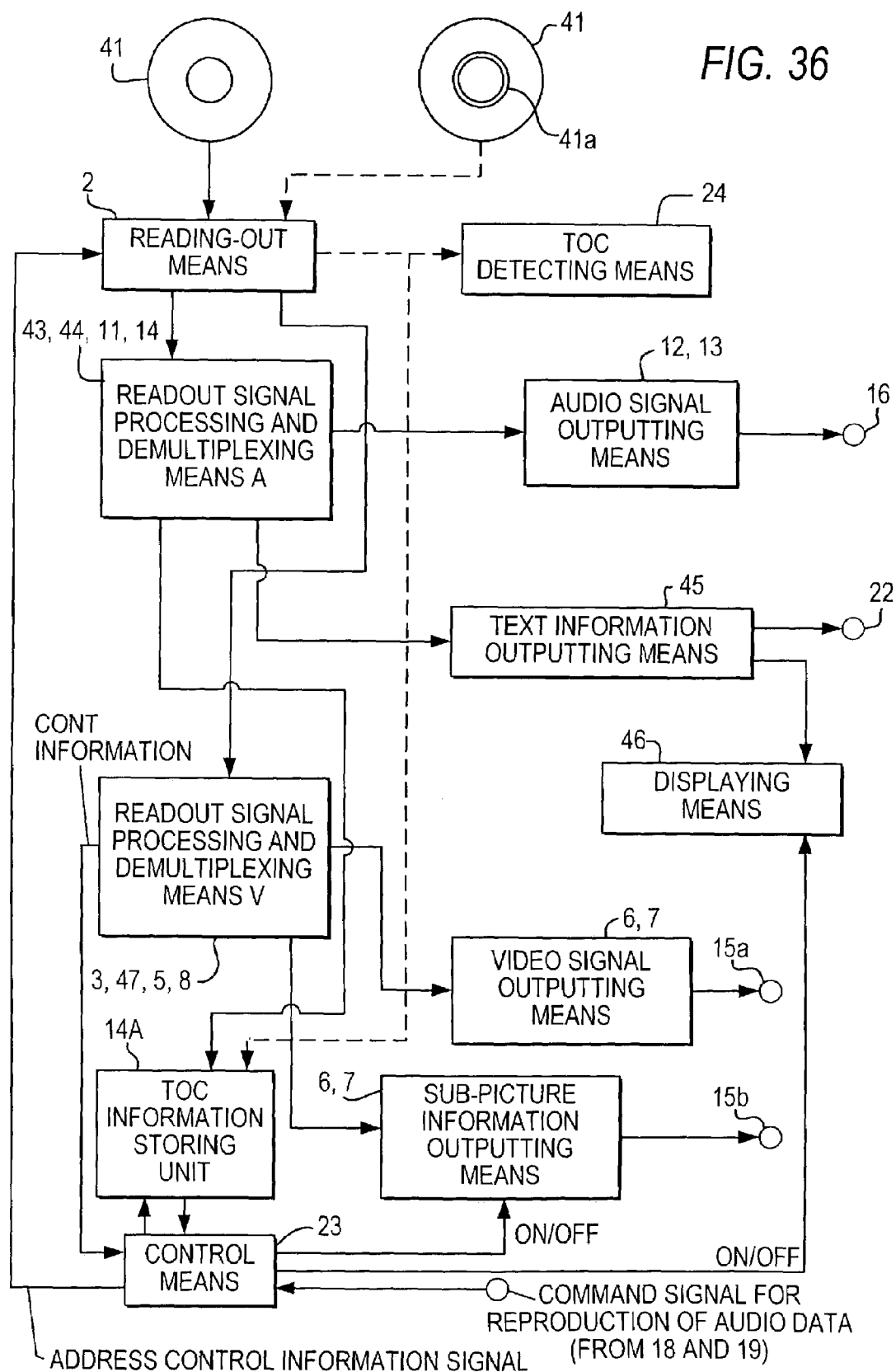
FIG. 36 is a block diagram functionally showing the reproducing apparatus and its peripheral devices shown in FIG. 35.

FIG. 36 is a block diagram functionally showing the reproducing apparatus 42 and its peripheral devices shown in FIG. 35.

In FIG. 36, the reading-out means 2 corresponds to the driving apparatus 2 shown in FIG. 35, a readout A/D signal processing and demultiplexing means (42, 44, 11 and 14) corresponds to the A/D pack detecting unit 42, the A/D pack buffer 44, the buffer data reading-out unit 11 and the parameter unit 14, and the audio signal outputting means (12, 13) corresponds to the PCM converting unit 12 and the D/A converting unit 13. Also, a text information outputting means 45 corresponds to the display signal producing unit 45, a displaying means 46 corresponds to the character displaying unit 46, and the readout signal processing and demultiplexing means V (3, 4, 5 and 8) corresponds to the CONT pack detecting unit 3, the SPCT/V pack buffer 47, the buffer data reading-out unit 5 and the parameter unit 8, and the video signal outputting means (6, 7) and the sub-picture information outputting means (6, 7) correspond to the image converting unit 6 and the D/A converting unit 7. The control means 23 corresponds to the control unit 23.

As shown in FIG. 36, when a command signal indicating to play back a remarked musical composition is transmitted from the operating unit 18 or the remote control apparatus 19 to the control means 23, an address control information signal corresponding to the command signal is transmitted from the control means 23 to the reading-out means 2, so that the reading-out means 2 reads out data of the remarked musical composition from the DVD-Avd disc 41 (or the DVD-audio disc 41) to obtain a readout data. The readout data is processed and demultiplexed in the readout A/D signal processing and demultiplexing means to obtain an audio signal and text information from the readout data. The audio signal is sent to the audio signal outputting means (12, 13), and the text information is sent to the text information outputting means 20. Also, the readout data is processed and demultiplexed in the readout signal processing and demultiplexing means V to obtain CONT information, a video signal and sub-picture information from the readout data. The CONT information is sent to the control means 23, the video signal is sent to the video signal outputting means (6, 7), and the sub-picture signal is sent to the sub-picture information outputting means (6, 7).

Also, as shown in FIG. 21 and FIG. 23, in cases where TOC information (TOC information is sometimes called a simple audio play pointer (SAPP) in DVD-audio technique) is additionally recorded in an empty area of the audio manager information (AMGI) or in an empty area of the audio title set information (ATSI), the reproducing apparatus 42 accesses to the TOC information to store the TOC information in a TOC information storing unit 14A, so that a top position of each musical composition can be detected. As the TOC information, information recorded in a read-in area of the CD can be used.

Thereafter, when a user selects a top position reading-out operation for a particular musical composition or a particular movement of the particular musical composition, the control means 23 refers the TOC information storing unit 14A in which the TOC information read-out from the DVD-Avd disc 41 (or the DVD-audio disc 41) at a start time of a reproducing operation is stored, and the reproducing apparatus 42 accesses to the DVD-Avd disc 41 (or the DVD-audio disc 41) to read out audio data of the particular musical composition (or the particular movement of the particular musical composition) from its top position.

In this embodiment, the TOC information is recorded in the audio manager information (AMGI) or in the audio title set information (ATSI). However, as shown in FIG. 36, it is applicable that the TOC information be additionally recorded in a TOC area 41a placed in the innermost circular read-in area. In this case, a TOC detecting means 24 accesses to the TOC area 41a at the start time of the reproducing operation to read out the TOC information, and the TOC information is recorded in-the TOC information storing unit 14A.

Next, an A-V-D synchronization reproduction processing for reproducing one or more V packs controlled by one CONT pack with one or more A packs and D packs by using control information such as TOC information and search information recorded in the DVD-Avd disc 41 is described with reference to FIG. 37 and FIG. 38.

Figure 37:
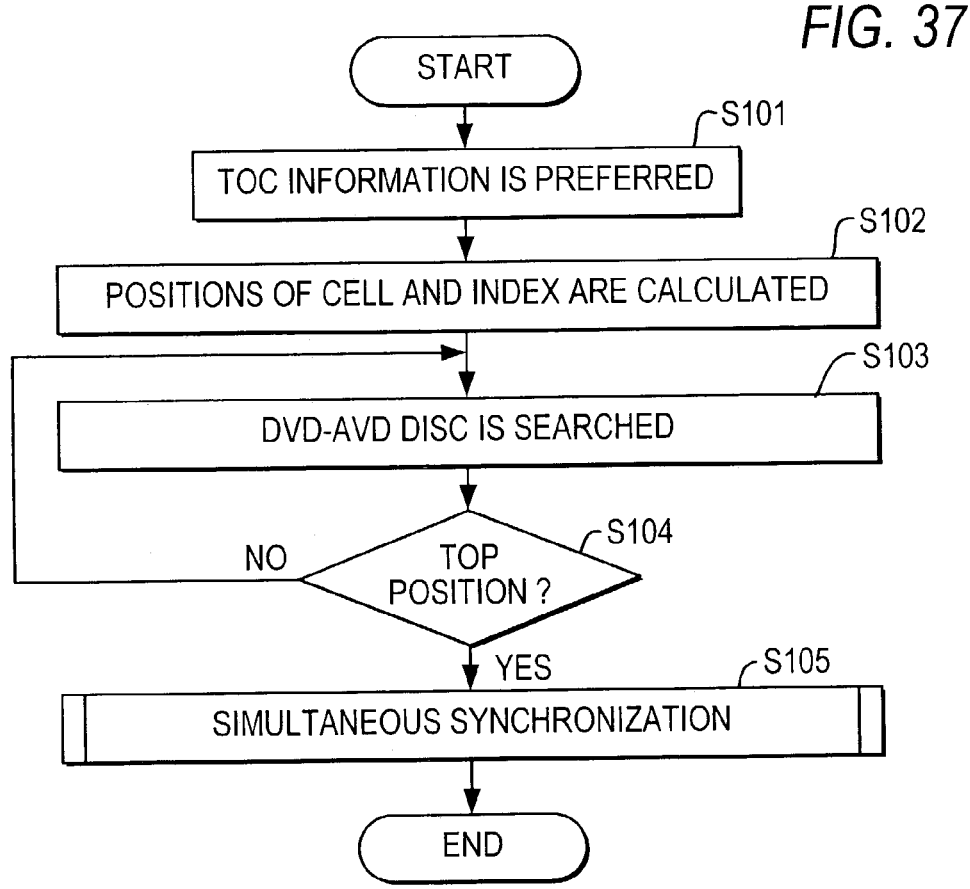
FIG. 37 is a flow chart of an A-V-D synchronization reproduction processing for reproducing control information.

FIG. 37 is a flow chart of an A-V-D synchronization reproduction processing for reproducing control information.

As shown in FIG. 37, when a user selects a top position reading-out operation to detect a top position of a particular musical composition or a particular movement of the particular musical composition recorded in the DVD-Avd disc 41, the control means 23 refers TOC information corresponding to the top position (step S101), and a position of a particular cell for a group of CONT packs and V packs and. a position of a particular index for a group of A packs are calculated according to the TOC information (step S102). Thereafter, the reading-out means 2 searches the DVD-Avd disc 41 for the top position of the particular musical composition (or the particular movement of the particular musical composition) (step S103). When the top position is found out (step S104), one or more V packs controlled by each CONT pack are reproduced with one or more A packs and D packs in simultaneous synchronization with each other (step S105).

Figure 38:
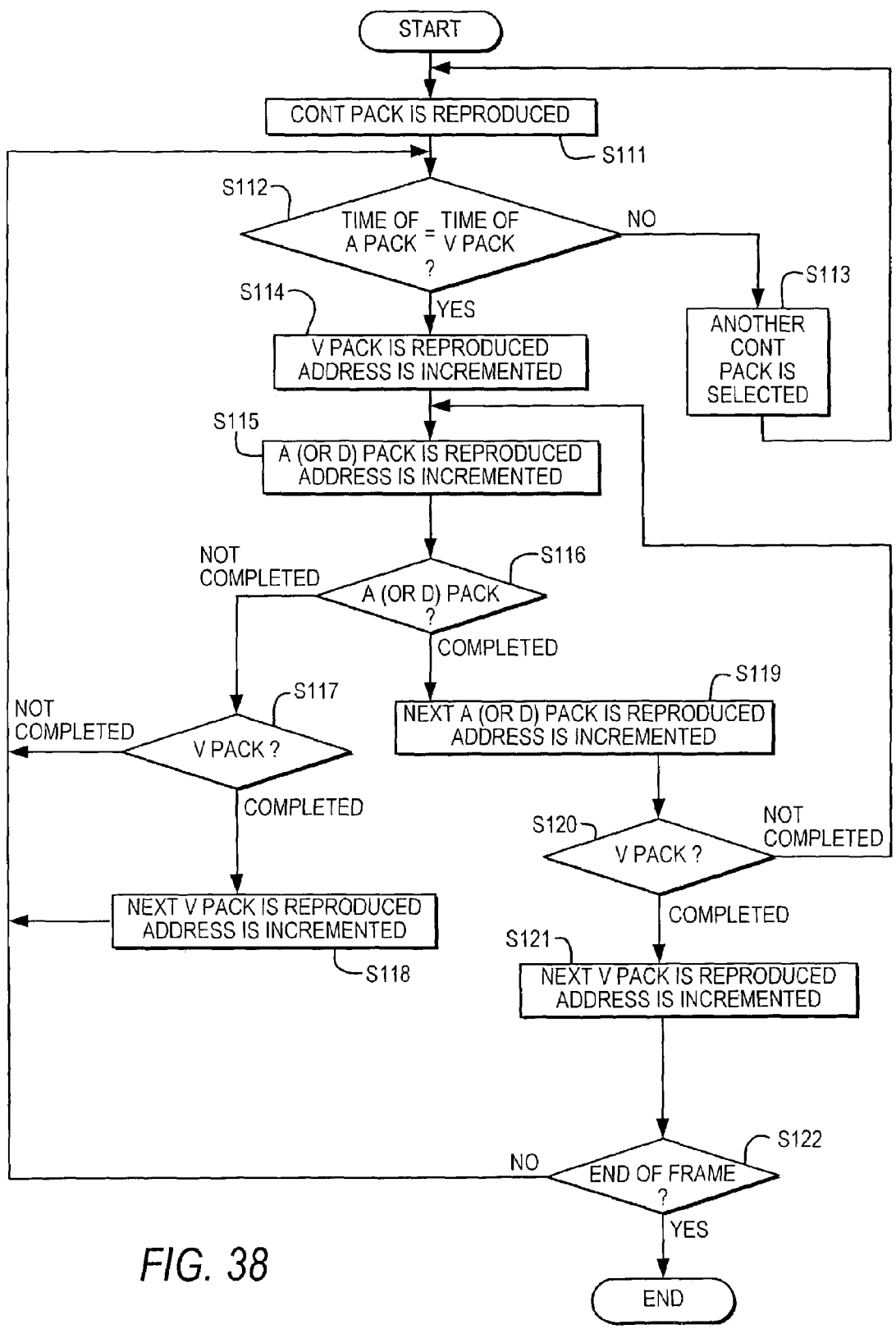
FIG. 38 is a flow chart of a synchronization reproduction of A packs, V packs and D packs performed in the A-V-D synchronization reproduction processing.

FIG. 38 is a flow chart of a synchronization reproduction (step S105) of A packs, V packs and D packs performed in the A-V-D synchronization reproduction processing.

As shown in FIG. 38, a particular CONT pack placed at the top position in the DVD-Avd disc 41 is reproduced (step S111), and it is checked by the control means 23 whether a time indicated by time information (system clock reference information SCR) of a particular A pack corresponding to the particular index agrees with that indicated by time information (system clock reference (SCR) information) of a particular V pack corresponding to the particular cell (step S112). In cases where the time for the particular A pack differs from that for the particular V pack, another CONT pack spaced apart from the particular CONT pack by one CONT pack in a time increasing or. decreasing direction is selected as another particular CONT pack (step S113), and the step S111 is repeated.

When the time for the particular A pack agrees with that for the particular V pack (step S112), the particular V pack controlled by the particular CONT pack is reproduced, a V pack address (SCR information) denoting a display time of the particular V pack is incremented by one (step S114), the particular A pack (or a particular D pack) is reproduced, and an A pack address (or a D pack address) denoting a reproduction time of the particular A pack is incremented by one (step S115). Therefore, a V pack succeeding the particular V pack and an A pack (or a D pack) succeeding the particular A pack (or D pack) can be specified. Thereafter, it is checked whether or not the reproduction of the particular A pack. (or the D pack) is completed (step S116).

In cases where the reproduction of the particular A pack (or the particular D pack) is not completed, it is checked whether or not the reproduction of the particular V pack is completed (step S117). In cases where the reproduction of the particular V pack is not completed, the step S112 is again performed. Therefore, the step S112 is repeated until the reproduction of the particular A pack (or the D pack) is completed in the step S116 or until the reproduction of the particular V pack is completed in the step S117. In contrast, in cases where the reproduction of the particular V pack is completed (step S117), another V pack controlled by the particular CONT pack and placed next to the particular V pack is selected as another particular V pack, the particular V pack selected is reproduced, and the V pack address is incremented (step S118). Thereafter, the step S112 is again performed.

In contrast, in cases where the reproduction of the particular A pack (or the particular D pack) is completed (step S116), an A pack (or a D pack) placed next to the particular A pack (or the particular D pack) is reproduced as another particular A pack (or another particular D pack), and the A pack address (or the D pack address) is incremented by one (step S119).

Thereafter, it is checked whether or not the reproduction of the particular V pack is completed (step S120). In cases where the reproduction of the particular V pack is not completed, the step S115 is again performed. In contrast, in cases where the reproduction of the particular V pack is completed (step S120), another V pack controlled by the particular CONT pack and placed next to the particular V pack is selected as another particular V pack, the particular V pack selected is reproduced, and the V pack address is incremented (step S121). Thereafter, it is checked whether or not the A-V-D synchronization reproduction processing reaches the end of a video frame (EOF) (step S122). In cases where the A-V-D synchronization reproduction processing does not reach the end of a frame, the step S112 is again performed. When the A-V-D synchronization reproduction processing reaches the end of the frame, the A-V-D synchronization reproduction processing for the DVD-Avd disc 41 is completed.

In contrast, in cases where the A-V-D synchronization reproduction processing is performed to play back a particular musical composition or a particular movement of the particular musical composition recorded in the DVD-audio disc 41, the step S105 is not required. That is, the particular musical composition (or the particular movement of the particular musical composition) is played back after the step S104.

Next, the display signal producing unit 45 and the character displaying unit 46 are described with reference to FIG. 39.

Figure 39:
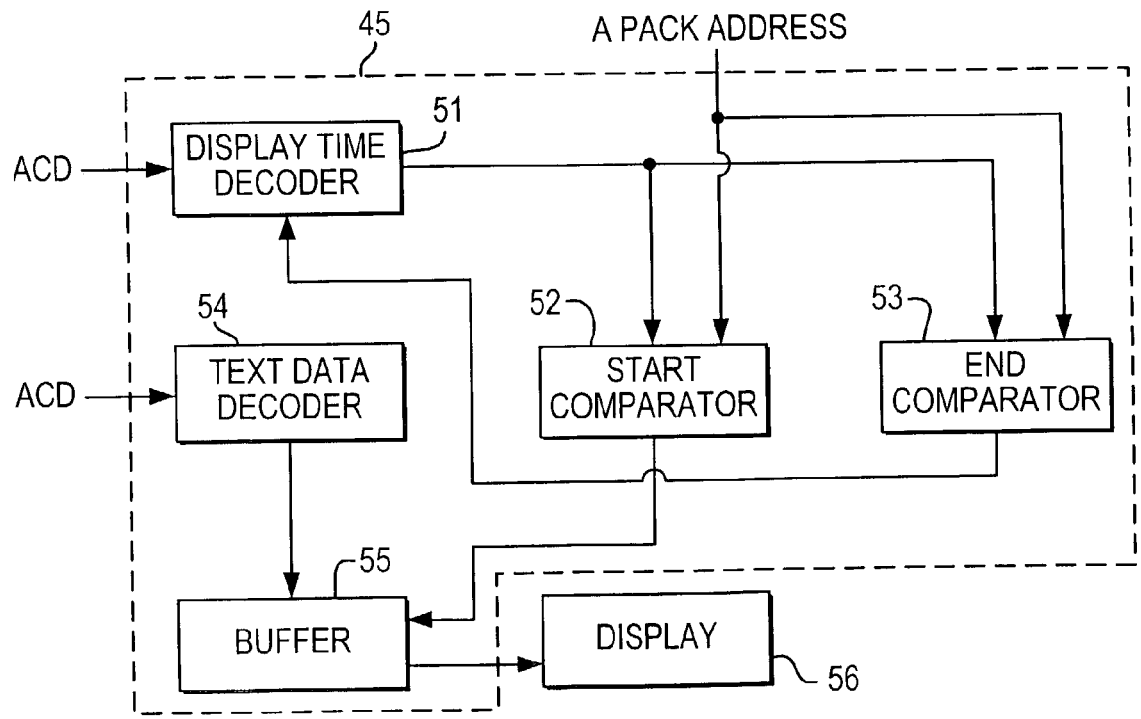
FIG. 39 is a block diagram of a display signal producing unit and a character displaying unit shown in FIG. 35.

FIG. 39 is a block diagram of the display signal producing unit 45 and the character displaying unit 46.

Display time data (corresponding to audio character display (ACD) information shown in FIG. 29A and FIG. 29B) of each D pack transmitted from the buffer data reading-out unit 11 is demultiplexed in a display time decoder 51 to display start time data and display end time data, the display start time data is sent to a start comparator 52, and the display end time data is sent to an end comparator 53. Also, text data of the D pack is converted into a dot matrix text data for display in a text data decoder 54, and the dot matrix text data is stored in a buffer 55.

Thereafter, in the start comparator 52, the display start time data is compared with the A pack address (or the SCR information) of an A pack currently reproduced. In cases where the display start time data agrees with the A pack address, a reading-out start control signal indicating the reading-out of the dot matrix text data is sent from the start comparator 52 to the buffer 55, and a display-on control signal indicating the display of the dot matrix text data is sent from the start comparator 52 to a display 56. Therefore, the dot matrix text data is read out from the buffer according to the reading-out start control signal and is displayed in the display 56.

Thereafter, in the end comparator 53, the display end time data is compared with the A pack address of an A pack currently reproduced. In cases where the display end time data agrees with the A pack address, a data outputting timing signal is sent from the end comparator 53 to the display time decoder 51, and a display-off control signal is sent from the end comparator 53 to the display 56. Therefore, the display of the dot matrix text data is ended in the display 56, and display time data is newly transmitted from the buffer data reading-out unit 11 to the display time decoder 51.

Next, a reproducing apparatus, in which the video processing unit 42V of the reproducing apparatus 42 shown in FIG. 35 is omitted, is described with reference to FIG. 40 according to a modification of the third embodiment.

Figure 40:
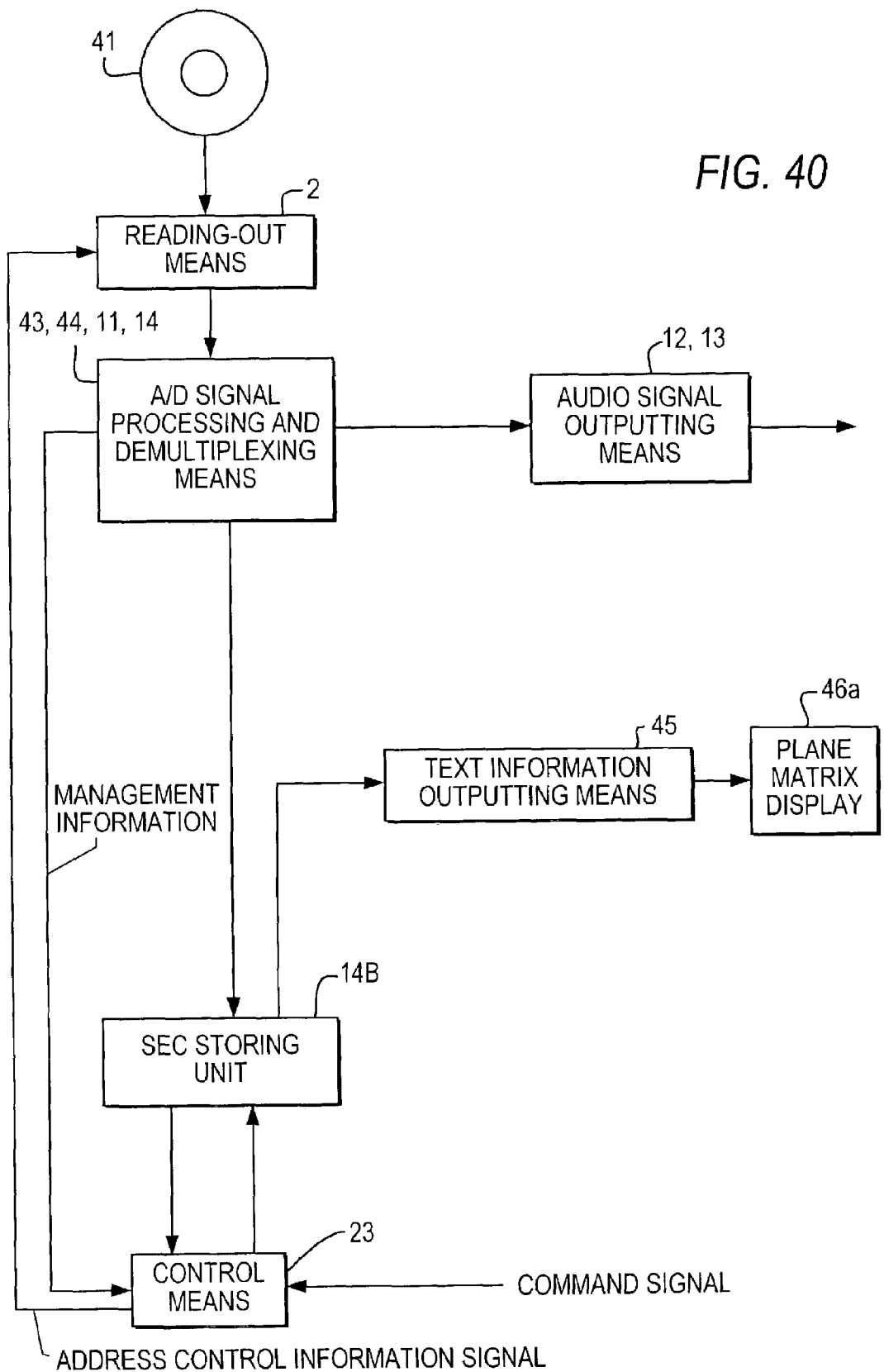
FIG. 40 is a block diagram functionally showing a reproducing apparatus and its peripheral devices according to a modification of the third embodiment.

FIG. 40 is a block diagram functionally showing a reproducing apparatus, in which the video processing unit 42V of the reproducing apparatus 42 is omitted, and its peripheral devices according to a modification of the third embodiment.

As shown in FIG. 40, sound effect control (SEC) information of a particular D pack recorded in the DVD-audio disc 41 before a D pack, which controls the reproduction of an A pack currently output from the audio signal outputting means (12, 13), is pre-read by the A/D signal processing and demultiplexing means (43, 44, 11, 14), and the SEC information of the particular D pack pre-read is stored in an SEC storing unit 14B. Thereafter, text information of the SEC information is displayed on a plane matrix display 46a (corresponding to the character display unit 46) through the text information outputting means 45.

Next, a reproducing apparatus, in which the video processing unit 42V of the reproducing apparatus 42 shown in FIG. 35 is omitted, for reproducing audio signal by using TOC information additionally recorded in the TOC area 41a of the innermost circular read-in area of the DVD-audio disc 41 is described with reference to FIG. 41 according to another modification of the third embodiment.

Figure 41:
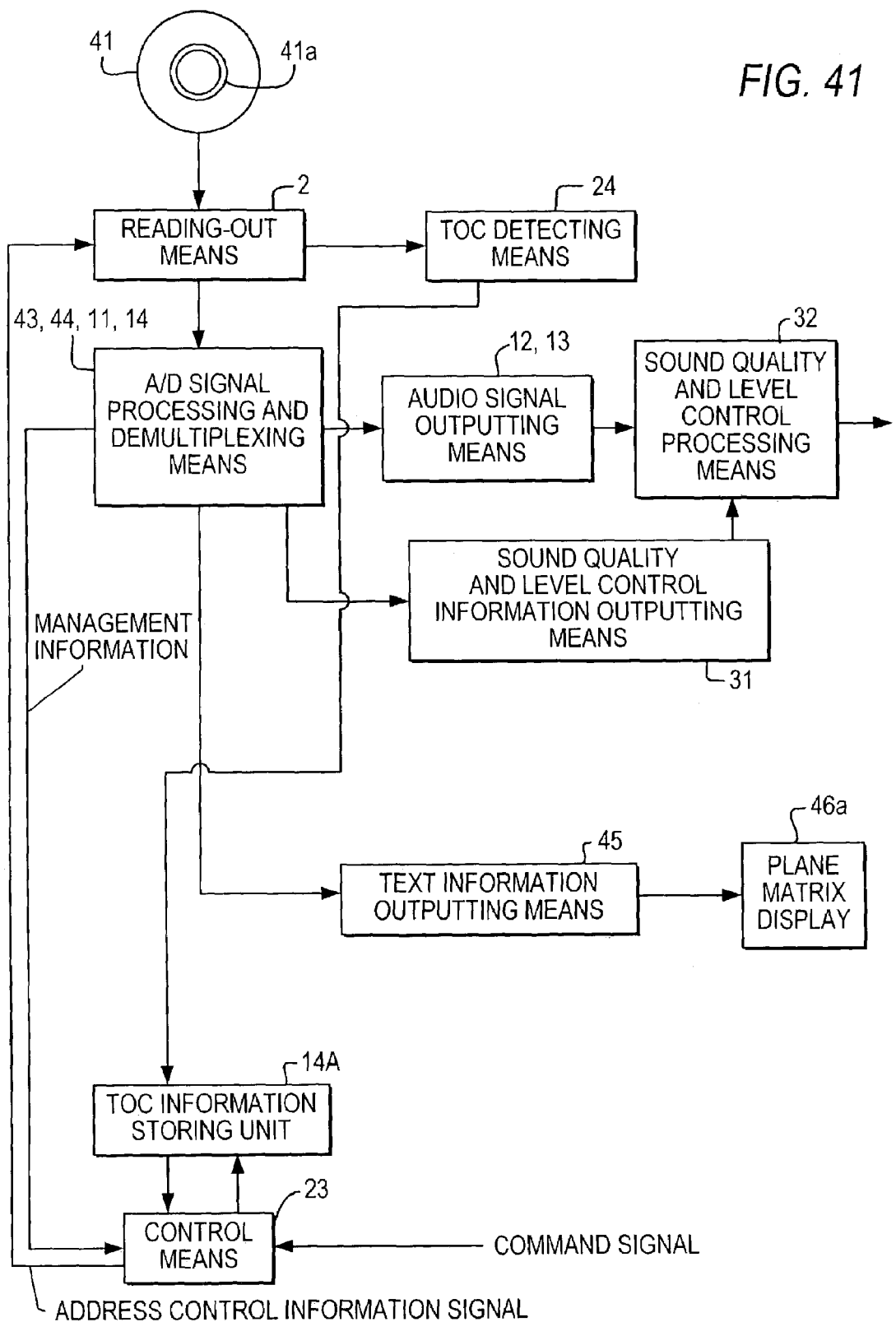
FIG. 41 is a block diagram functionally showing a reproducing apparatus and its peripheral devices according to another modification of the third embodiment.

FIG. 41 is a block diagram functionally showing an audio dedicated reproducing apparatus, in which the video processing unit 42V of the reproducing apparatus 42 is omitted, and its peripheral devices according to another modification of the third embodiment.

As shown in FIG. 41, in cases where the TOC information is additionally recorded in the TOC area 41a of the innermost circular read-in area of the DVD-audio disc 41, the TOC detecting means 24 accesses to the TOC information area 41a of the DVD-audio disc 41 at a start time of the reproducing operation, and the TOC information is stored in the TOC information storing unit 14A. In cases where audio reproduction control information to reproduce audio data in a sound quality recommended by professional human mixers is recorded in the SEC packet of each D pack, the audio reproduction control information is read out from the DVD-audio disc 41 to the A/D signal processing and demultiplexing means (43, 44, 11, 14) according to the TOC information under the control of the control means 23, and a sound quality of an audio signal is controlled according to the audio reproduction control information in a sound quality and level control information outputting means 31 and a sound quality and level control processing means 32.

Figure 42:
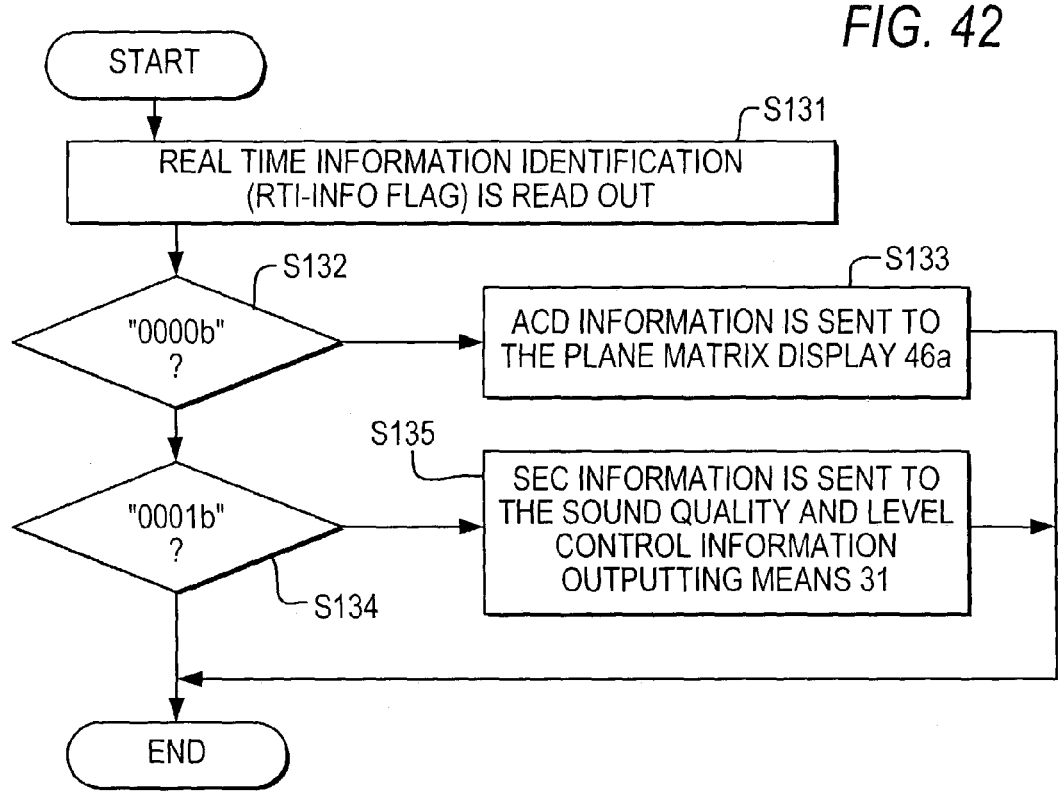
FIG. 42 is a flow chart showing a processing for distinguishing between a D pack including audio character display information and a D pack including sound effect control information.

As shown in FIG. 30A, in cases where the D pack including the ACD information differs from the D pack including the SEC information, a D pack type distinguishing means for distinguishing between the D pack including the ACD information and the D pack including the SEC information is arranged in the A/D signal processing and demultiplexing means (43, 44, 11, 14). In this case, as shown in FIG. 42, a real time information identification (RTI-INFO flag) set in the private header of the D pack is read out (step S131), and it is checked by the control means 23 whether or not the RTI-INFO flag set in the private header of the D pack is "0000b" (step S132). In case of the flag="0000b", because the ACD information is included in the D pack, user data indicating the audio character display (ACD) information is sent to the plane matrix display 46a through the text information outputting means 45 and is displayed (step S133). In contrast, in case of the flag="0001b" (step S134), because the SEC information is included in the D pack, user data indicating the sound effect control (SEC) information is sent to the sound quality and level control information outputting means 31, so that sound quality and level of the audio signal is adjusted according to the SEC information in the sound quality and level control processing means 32 (step S135).

Figure 43:
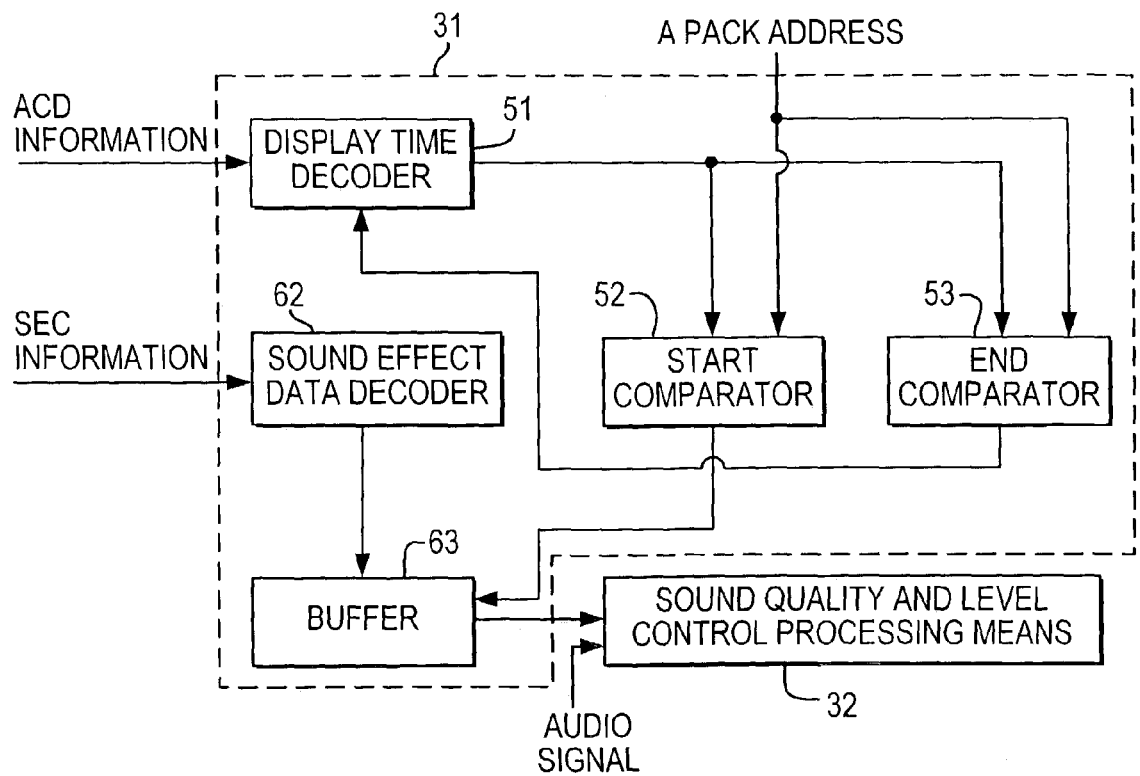
FIG. 43 is a block diagram of a sound quality and level control information outputting means shown in FIG. 41.

In this case, the sound quality and level control information outputting means 31 has a configuration shown in FIG. 43. A control start time and a control end time are extracted from the ACD information in a control time decoder 61, and sound effect data of the SEC information is decoded in a sound effect data decoder 62, and decoded sound effect data is stored in a buffer 63. In cases where it is judged in the start comparator 52 that an A pack address of the A pack agrees with the control start time, the decoded sound effect data is sent to the sound quality and level control processing means 32, and the adjustment of an audio signal of the A pack according to the decoded sound effect data is started. Also, in cases where it is judged in the end comparator 52 that an A pack address of the A pack agrees with the control end time, the adjustment of the audio signal performed in the control processing means 32 is ended, and another piece of SEC information is received in the control time decoder 61. Therefore, sound effect control can be performed within a time period between the control start time and the control end time for each A pack. The ACD information is called a real time text.

Next, a fourth embodiment of the present invention is described.

Figure 29C:
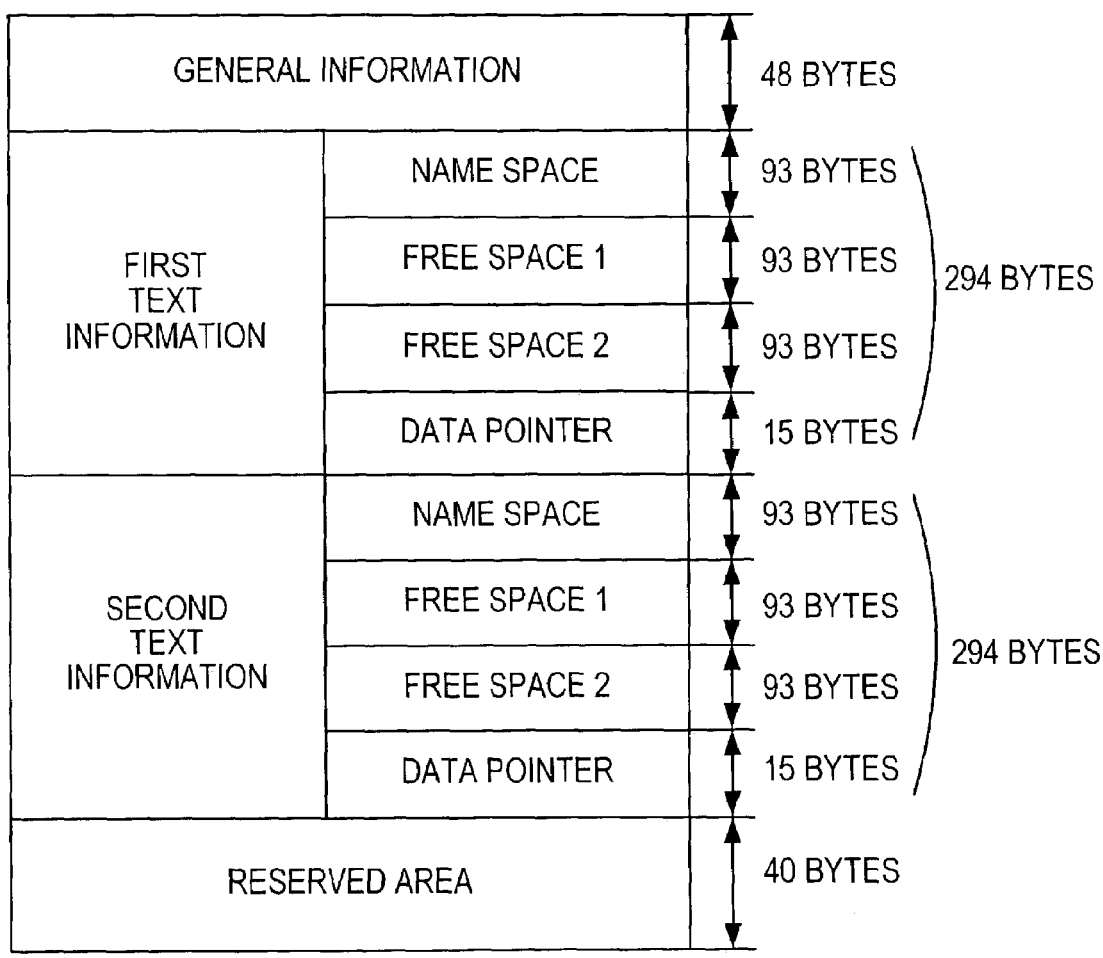
FIG. 29C is an explanatory view showing a second example of a format of an audio character display (ACD) area shown in FIG. 29A according to fourth and fifth embodiments.

FIG. 29C is an explanatory view showing a second example of a format of the ACD information area.

In the fourth embodiment, each D pack has the format shown in FIG. 29A, and a format of the ACD information included in each D pack is shown in FIG. 29C. Therefore, though text information is arranged in the ACD information, but any display time data is not arranged in the ACD information. In this embodiment, display time data is arranged in a reserve area of the data search information (DSI) shown in FIG. 28. The data search information (DSI) is arranged in each CONT pack shown in FIG. 26.

Next, a fifth embodiment of the present invention is described.

In the fifth embodiment, each D pack has the format shown in FIG. 29A, and a format of the ACD information included in each D pack is shown in FIG. 29C. Therefore, though text information is arranged in the ACD information, but any display time data is not arranged in the ACD information. In this embodiment, display time data (16 bytes) and generalized display control data other than the display time data is arranged in a reserve area (471 bytes) of the data search information (DSI) shown in FIG. 28. A maximum of bytes of generalized display control data is 52.

As an example of the generalized display control data, to display an image of the text information on a display unit in which the number of pixels is larger than that in the display 56 shown in FIG. 39, a display start address of 8 bytes (an address corresponding to the display start address of the ACD information shown in FIG. 29B) and division number data of 8 bytes are arranged in the reserve area (471 bytes) of the data search information (DSI). Therefore, when pieces of text information indicating 16 (8*2) characters are displayed, the display of the characters can be controlled by the display start address and the division number data.

Figure 44:
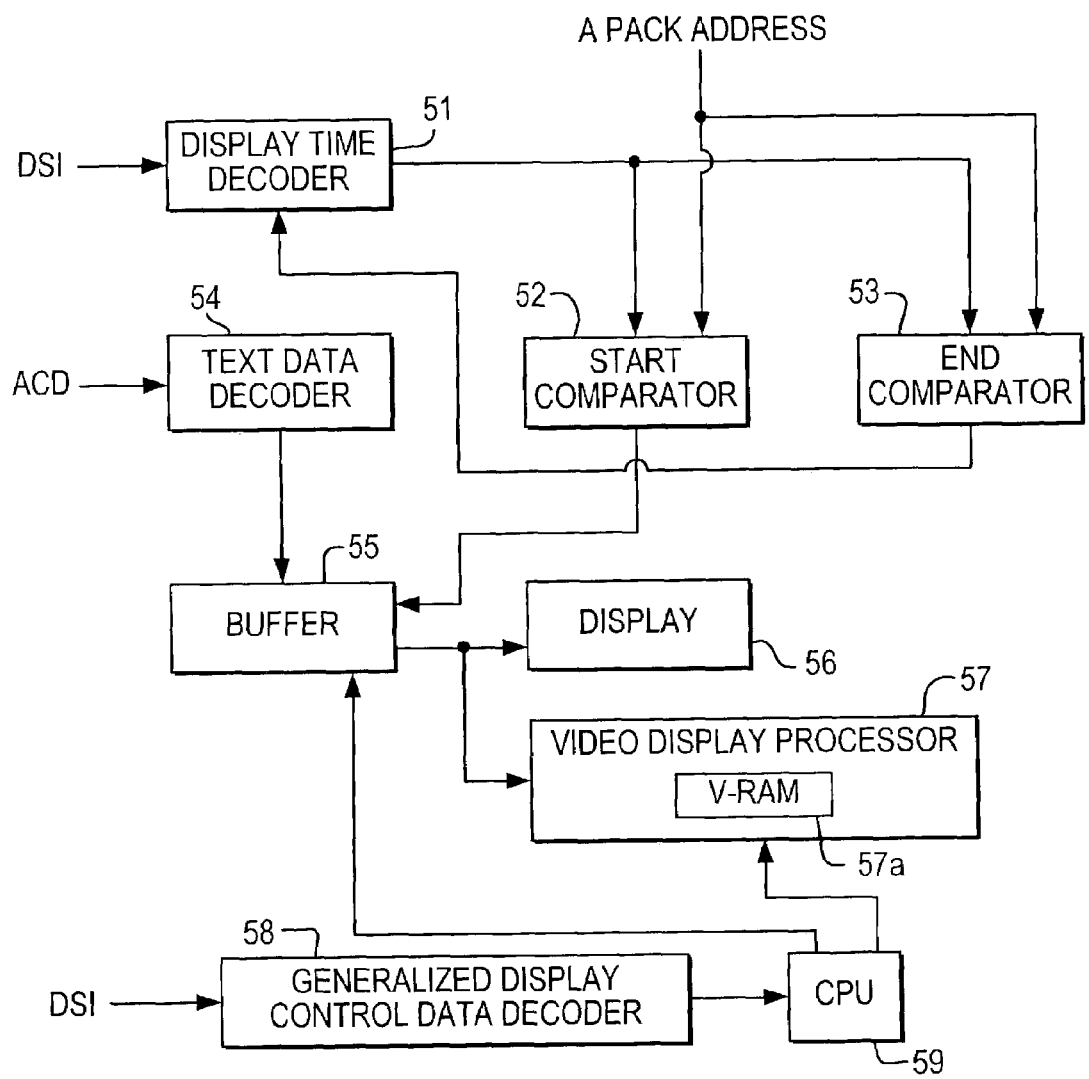
FIG. 44 is a block diagram of a character displaying circuit according to a fifth embodiment of the present invention.

FIG. 44 is a block diagram of a character displaying circuit according to the fifth embodiment.

Figure 45:
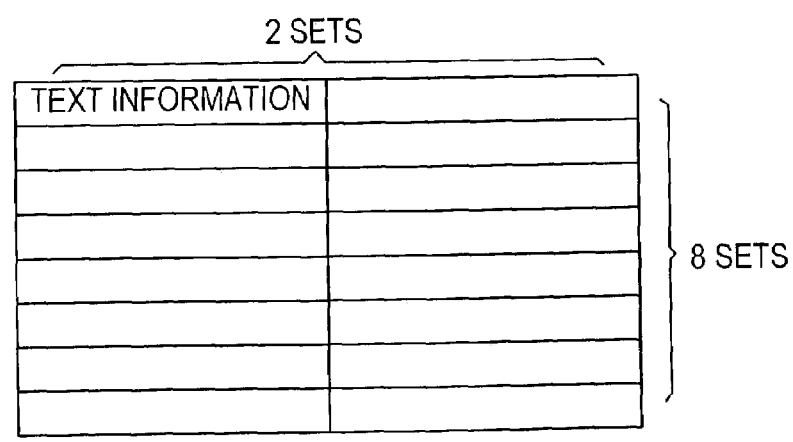
FIG. 45 shows a recording area of a V-RAM shown in FIG. 44.

As shown in FIG. 44, the display time decoder 51, the start comparator 52, the end comparator 53, the text data decoder 54, the buffer 55 and the display 56 are operated in the same manner as those shown in FIG. 39. Also, a recording capacity of the buffer 55 and the arrangement of pixels in the display 56 are set to display 15 full-sized characters (or 31 half-sized characters) for each of 2.5 lines as shown in FIG. 16. Information corresponding to the 15 full-sized characters (or 31 half-sized characters)*2.5 lines is called one set of text information. As shown in FIG. 45, a recording capacity of a V-RAM 57a of a video display processor 57 is set to store 16 (2*8) sets of text information.

In the character displaying circuit shown in FIG. 44, each set of text information is displayed on the display 56 in a normal mode. Also, 16 (2*8) sets of text information are transmitted to an external display apparatus (not shown) through an external output terminal and are displayed in a special mode.

In the normal mode, display time data of each CONT pack is demultiplexed to display start time data and display end time data in the display time decoder 51, the display start time data is sent to the start comparator 52, the display end time data is sent to the end comparator 53. Also, text data of each D pack is converted into dot matrix text data for display in the text data decoder 54, and the dot matrix text data is stored in the buffer 55.

Thereafter, in the start comparator 52, the display start time data is compared with the A pack address of an A pack currently reproduced. In cases where the display start time data agrees with the A pack address, a reading-out start control signal is sent from the start comparator 52 to the buffer 55, and a display-on control signal is sent from the start comparator 52 to a display 56. Therefore, the dot matrix text data is read out from the buffer according to the reading-out start control signal and is displayed in the display 56. Thereafter, in the end comparator 53, the display end time data is compared with the A pack address of an A pack currently reproduced. In cases where the display end time data agrees with the A pack address, a data outputting timing signal is sent from the end comparator 53 to the display time decoder 51, and a display-off control signal is sent from the end comparator 53 to the display 56. Therefore, the display of the dot matrix text data is ended in the display 56, and display time data is newly transmitted from the buffer data reading-out unit 11 to the display time decoder 51.

In contrast, in the special mode, display time data of each CONT pack is demultiplexed to display start time data and display end time data in the display time decoder 51, the display start time data is sent to the start comparator 52 and a central processing unit (CPU) 59, the display end time data is sent to the end comparator 53 and the CPU 59. Also, text data of each D pack is converted into dot matrix text data for display in the text data decoder 54, and the dot matrix text data is stored in the buffer 55. Also, the display start address and the division number data of each CONT pack representing the generalized display control data are decoded in a generalized display control data decoder 58 and are sent to the CPU 59.

Thereafter, in the start comparator 52, the display start time data is compared with the A pack address of an A pack currently reproduced, and a reading-out start control signal is sent from the start comparator 52 to-the buffer 55 in cases where the display start time data agrees with the A pack address. Thereafter, in the end comparator 53, the display end time data is compared with the A pack address of an A pack currently reproduced, a data outputting timing signal is sent from the end comparator 53 to the display time decoder 51 in cases where the display end time data agrees with the A pack address.

Thereafter, the display start time data, corresponding to each set of text information, decoded in the display time decoder 51 is checked in the CPU 59 according to the display start address and the division number data decoded in the generalized display control data decoder 58. When the display start time data agrees with the display start address, the CPU 59 specifies a write-in address corresponding to one set in the V-RAM 57a of the video display processor 57. Therefore, one set of dot matrix data read out from the buffer 55 is written in the write-in address of the V-RAM 57a of the video display processor 57 specified by the CPU 59 according to the display start address and the division number data for each of the 16 sets. When 16 sets of dot matrix data are written in the V-RAM 57a, the 16 sets of dot matrix data are extended to a video signal corresponding to one display image in the video display processor 57. Thereafter, the video signal is output to the external display apparatus (not shown) through an external output terminal.

Next, a sixth embodiment of the present invention is described.

Figure 46:
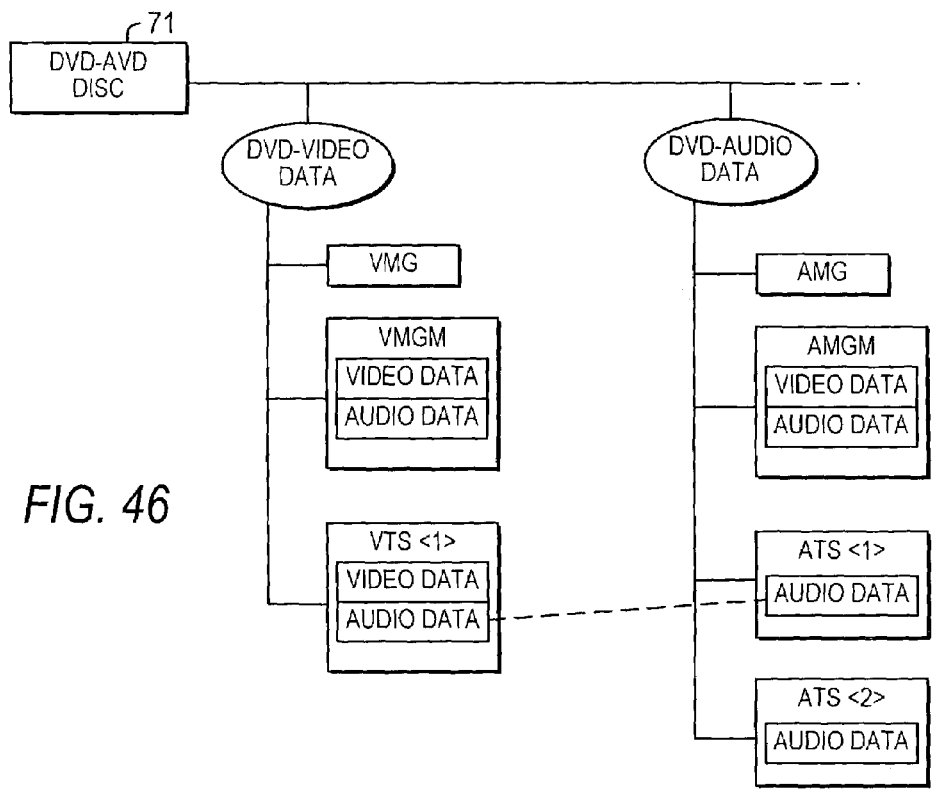
FIG. 46 shows a data structure of data recorded in a DVD-avd disc according to a sixth embodiment of the present invention.

FIG. 46 shows a data structure of data recorded in a DVD-Avd disc according to a sixth embodiment of the present invention.

Figure 47:
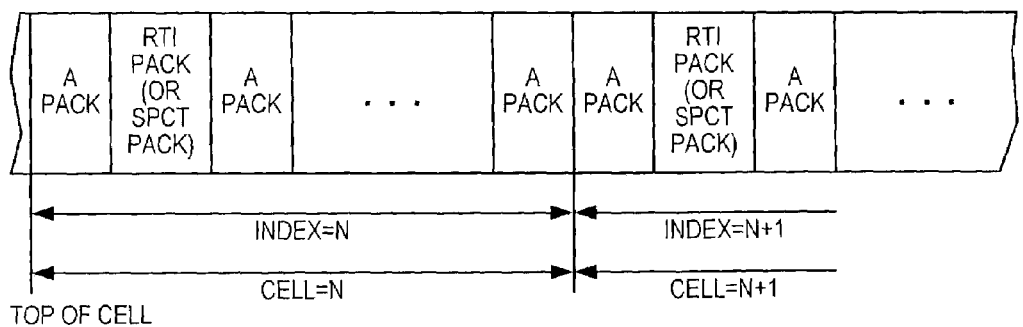
FIG. 47 shows a series of A packs and a D pack included in a second group of audio title set (ATS <2>) of the DVD-avd disc shown in FIG. 46.

As shown in FIG. 46, DVD-video data and DVD-audio data are recorded in a DVD-Avd disc 71 according to a sixth embodiment. In a data structure of the DVD-video data, a video manager (VMG) shown in FIG. 1A, a video manager menu (VMGM) corresponding to video data and audio data and a first video title set (VTS <1>) managed by video manager information (VMGI) of the VMG are included. The VTS <1> has video data and audio data. In a data structure of the DVD-audio data, an audio manager menu (AMGM) corresponding to video data and audio data, a first audio title set (ATS <1>) managed by audio manager information (AMGI) of the AMG and a second audio title set (ATS <2>) managed by the audio manager information (AMGI) of the AMG are included. The ATS <1> has only audio data, and the audio data of the ATS <1> is the same as audio data of the VTS <1> or corresponds to audio data of the VTS <1>, so that audio contents of the VTS <1> are managed by the AMG. The ATS <2> has only audio data, and the audio data of the ATS <2> has no connection with audio data of the VTS. Also, as shown in FIG. 47, the ATS <2> do not have any A-CONT pack, but the ATS <2> has A packs and a real time information (RTI) pack (or a still picture (SPCT) pack) for each cell (or index). In the RTI pack, real time text data and real time information such as sound effect control (SEC) information is packed. Also, still picture data is packed in the SPCT pack (refer to FIG. 51A, FIG. 51E and FIG. 51G). That is, a data format according to the sixth embodiment differs from that shown in FIG. 1C, and, a plurality of SPCT packs are arranged in a specific area of the ATS <2>.

As another type of disc, as shown in FIG. 48, DVD-video data and DVD-audio navigation data are recorded in a DVD-Van (video data+audio navigation data) disc. In a data structure of the DVD-video data, a video manager (VMG) having video manager information (VMGI), a video manager menu (VMGM) corresponding to video data and audio data, a first video title set (VTS <1>) having video data and audio data and a second video title set (VTS <2>) having video data and audio data are included. In a data structure of the DVD-audio navigation data, a first audio title set (ATS <1>) having only audio data, a second audio title set (ATS <2>) having only audio data and an audio manager (AMG) having audio manager information (AMGI) for managing the first and second audio title sets are included. The audio data of the ATS <1> is the same as audio data of the VTS <1> or corresponds to audio data of the VTS <1>, and the audio data of the ATS <2> is the same as audio data of the VTS <2> or corresponds to audio data of the VTS <2>.

Also, as shown in FIG. 49, DVD-video data is recorded in a DVD-video disc. In a data structure of the DVD-video data, a video manager (VMG) having video manager information (VMGI), a video manager menu (VMGM) corresponding to video data and audio data a first video title set (VTS <1>) having video data and audio data and a second video title set (VTS <2>) having video data and audio data are included. Therefore, any audio title set (ATS) is not included in the data structure of the DVD-video data.

Also, as shown in FIG. 50, DVD-audio data is recorded in a DVD-audio disc. In a data structure of the DVD-audio data, an audio manager menu (AMGM) corresponding to video data and audio data, a first audio title set (ATS <1>) having only audio data, a second audio title set (ATS <2>) having only audio data and an audio manager (AMG) having audio manager information (AMGI) for managing the first and second audio title sets are included. Therefore, any video title set (VTS) is not included in the data structure of the DVD-audio data. The ATS <2> (and the ATS <1>) recorded in the DVD-Avd disc 71, of which the data structure is shown in FIG. 46 and FIG. 47, is reproduced while referring the AMGI by using a DVD-Avd disc player according to the present invention. In this case, because the VMGI is referred when a DVD-video disc player is used, the ATS <2> not managed by the VMGI cannot be reproduced by using the DVD-video disc player.

The function of the AMGI includes the function of the VMGI. Therefore, as a reproducing method for reproducing information recorded in a disc is shown in FIG. 34, the AMGI can manage the VOBS (the first and second reproducing methods Mr1 and Mr2), the AMGI can manage only audio contents of the VOBS (the third reproducing method Mr3), and the AMGI can manage the ACBS (the fourth reproducing method Mr4).

Next, a data structure of DVD-audio data in the DVD-Avd disc 71 shown in FIG. 46 is described.

Figure 51A:
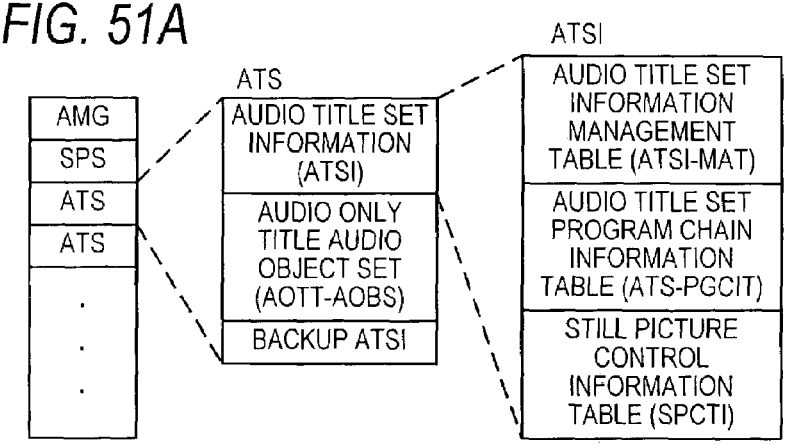
FIG. 51A shows a data structure of DVD-audio data in the DVD-Avd disc shown in FIG. 46.

FIG. 51A shows a data structure of DVD-audio data in the DVD-Avd disc 71 shown in FIG. 46.

As shown in FIG. 51A, DVD-audio data in the DVD-Avd disc 71 includes an audio manager (AMG), a still picture set (SPS) and a plurality of audio title sets (ATSs). Each ATS has an audio title set information (ATSI), an audio only title audio object set (AOTT-AOBS) and a backup ATST. The ATSI has an audio title set information management table (ATSI-MAT), an audio title set program chain information table (ATS-PGCIT) and a still picture control information table (SPCIT).

Figure 51B:
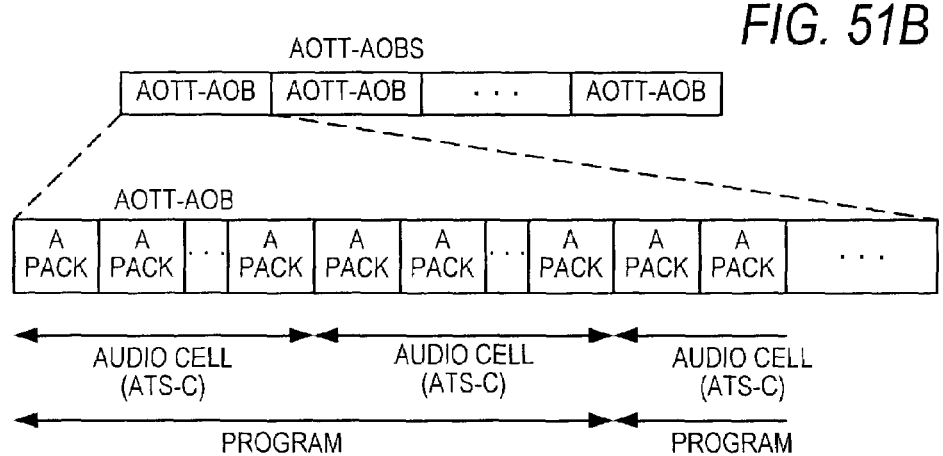
FIG. 51B shows a configuration of an AOTT-AOBS shown in FIG. 51A.

FIG. 51B shows a configuration of the audio only title audio object set (AOTT-AOBS) shown in FIG. 51A.

Figure 51C:
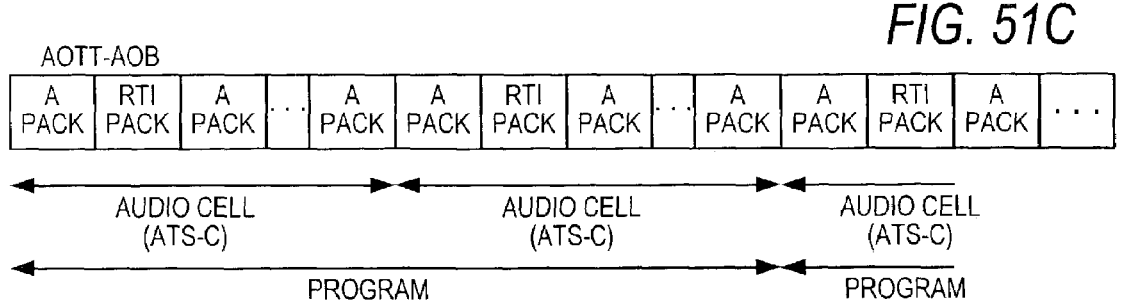
FIG. 51C shows a configuration of an AOTT-AOB of the AOTT-AOBS shown in FIG. 51A, the configuration of the AOTT-AOB corresponding to FIG. 47.

As shown in FIG. 51B, the audio only title audio object set (AOTT-AOBS) has a plurality of audio only title audio objects (AOTT-AOBs), each AOTT-AOB is classified into a plurality of audio cells, and each audio cell is basically composed of a plurality of audio (A) packs. In this embodiment, as shown in FIG. 51C, each audio cell is composed of a plurality of audio (A) packs and a real time information (RTI) pack.

FIG. 51D shows a configuration of the audio title set information management table (ATSI-MAT) data shown in FIG. 51A.

Figure 51E:
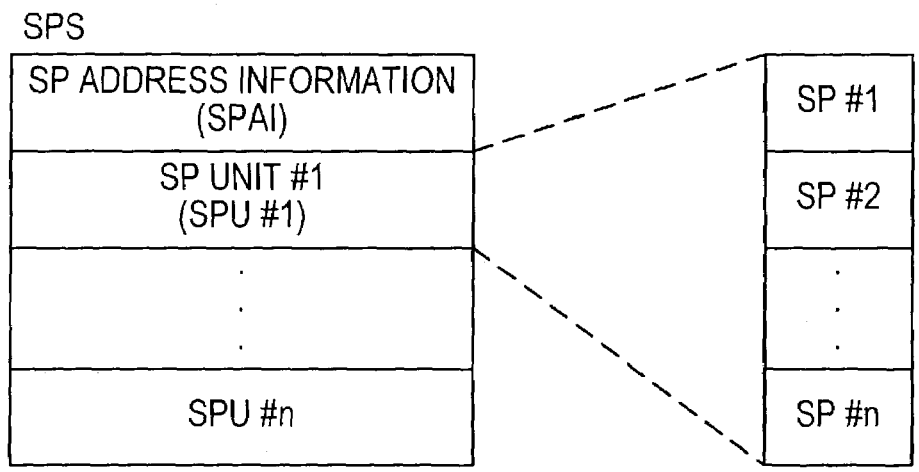
FIG. 51E shows a configuration of the still picture set (SPS) shown in FIG. 51A.

As shown in FIG. 51D, the audio title set information management table (ATSI-MAT) has an ATS identifier (ATS-ID) of 12 bytes, an ATS end address (ATS-EA) of 4 bytes, a reserved area of 12 bytes, an ATSI end address (ATSI-EA) of 4 bytes, a version number (VERN) of 2 bytes, a reserved area of 94 bytes, an ATSI-MAT end address of 4 bytes, a reserved area of 60 bytes, an AOTT VTS start address of 4 bytes, an AOTT AOBS start address (or AOTT VOBS start address) of 4 bytes, a reserved area of 4 bytes, an ATS-PGCIT start address of 4 bytes, a reserved area of 48 bytes, an audio only title audio object attribute (AOTT-AOB-ATR) and an AOTT-VOB-AST-ATR of 128 bytes, an ATS-DM-COEFT#0-#15 of 288 bytes, a reserved area of 32 bytes, a still picture data attribute (ATS-SPCT-ATR) of 2 bytes and a reserved area of 1342 bytes in that order. FIG. 51E shows a configuration of the still picture set (SPS) shown in FIG. 51A.

Figure 51F:
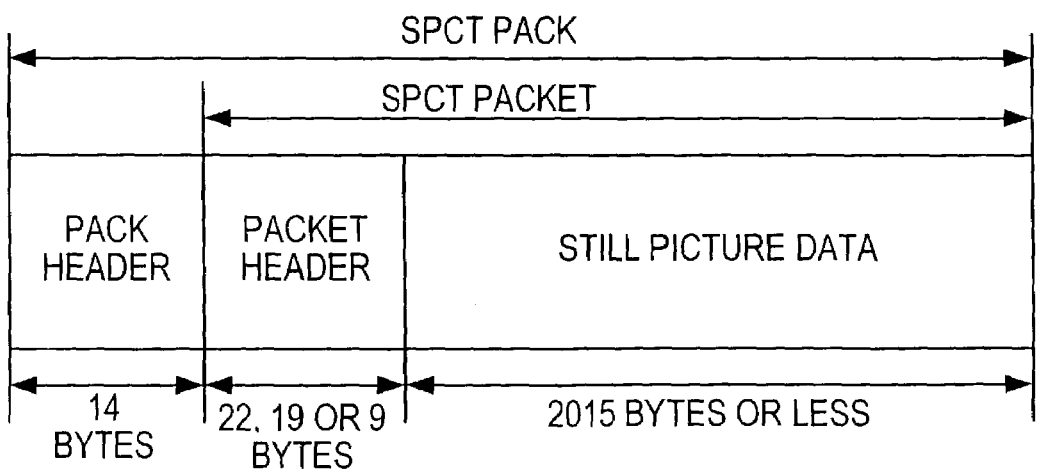
FIG. 51F shows a still picture (SPCT) pack of each SP shown in FIG. 51E.

As shown in FIG. 51E, the still picture set (SPS) has an SP address information (SPAI) and a plurality of still picture units (SPUs) #1 to #n. Each SPU is composed of a plurality of still pictures (SPs) #1 to #n. As shown in FIG. 51F, a still picture (SPCT) pack of each SP is composed of a pack header and a still picture (SPCT) packet, and the SPCT packet is composed of a packet header and still picture data.

Figure 51G:
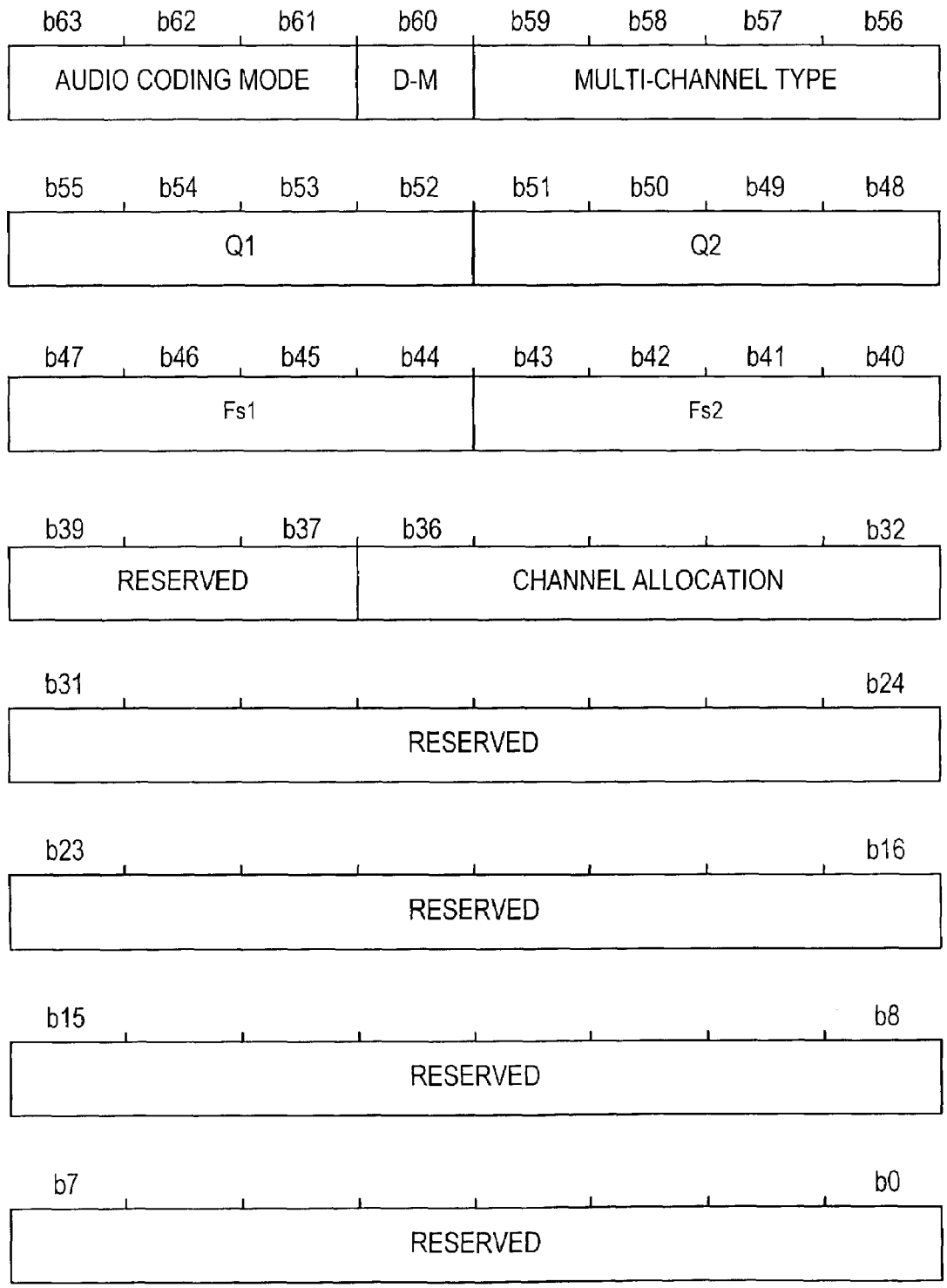
FIG. 51G shows a format of audio only title audio object attribute (AOTT-AOB-ATR) data shown in FIG. 51D.

FIG. 51G shows a format of audio only title audio object attribute (AOTT-AOB-ATR) data shown in FIG. 51D. The AOTT-AOB-ATR data recorded in the DVD-avd disc 71 is expressed by 8 bytes (64 bits from the bit No. b63 to the bit No. b0). The format of the AOTT-AOB-ATR data is described in a direction from the most significant bit (MSB) to the least significant bit (LSB).

The AOTT-AOB-ATR data is composed of:
an audio coding mode of 4 bits (b63 to b60),
a down mix (D-M) mode of 1 bit (b59),
a multi-channel type of 3 bits (b58 to b56),
a quantizing bit number Q1 of a channel group 1 having 4 bits (b55 to b52),
a quantizing bit number Q2 of a channel group 2 having 4 bits (b51 to b48),
a sampling frequency Fs1 of a channel group 1 having 4 bits (b47 to b44),
a sampling frequency Fs2 of a channel group 2 having 4 bits (b43 to b40),
a reserve area of 3 bits (b39 to b37),
a channel allocation of 5 bits (b36 to b32), and
a reserve area of remaining 32 bits (b31 to b0).

The remaining 32 bits are used to record attribute data of each channel.

The data of the AOTT-AOB-ATR is described in detail.

(1) The audio coding mode (b63 to b60)
0000b: linear pulse count modulation (PCM) mode,
0001b: reserve for compressed audio data (Dolby digital),
0010b: reserve for compressed audio data (MPEG 2, no extension)
0011b: reserve for compressed audio data (MPEG 2, extension),
0100b: reserve for compressed audio data (digital theater system (DTS)),
0101b: reserve for compressed audio data (SDDS), and others: reserve for other coding modes.

(2) The down mix mode (b59)
0b: authorization of down mix stereo output, and
1b: inhibition of down mix stereo output.

(3) The multi-channel type (b58 to b56)
000b: type 1, and others: reserve.

(4) The quantizing bit number Q1 of the channel group 1 (b55 to b52)
0000b: 16 bits,
0001b: 20 bits,
0010b: 24 bits, and others: reserve.

(5) The quantizing bit number Q2 of the channel group 2 (b51 to b48)
0000b: 16 bits,
0001B: 20 bits,
0010b: 24 bits, and others: reserve.

In case of the quantizing bit number Q1=16 bits ("0000b") of the channel group 1, "0000b" is set.
In case of the quantizing bit number Q1=20 bits ("0001b") of the channel group 1, "0000b" or "0001b" is set.
In case of the quantizing bit number Q1=24 bits ("0010b") of the channel group 1, "0000b", "0001b" or "0010b" is set.

(6) The sampling frequency Fs1 of the channel group 1 (b47 to b44)
0000b: 48 kHz,
0001b: 96 kHz,
0010b: 192 kHz,
1000b: 44.1 kHz,
1001b: 88.2 kHz,
1010b: 176.4 kHz, and others: reserve.

(7) The sampling frequency Fs2 of the channel group 2 (b43 to b40)
0000b: 48 kHz,
0001b: 96 kHz,
0010b: 192 kHz,
1000b: 44.1 kHz,
1001b: 88.2 kHz,
1010b: 176.4 kHz, and others: reserve.

In case of the sampling frequency Fs1=48 kHz ("0000b") of the channel group 1, "0000b" is set.
In case of the sampling frequency Fs1=96 kHz ("0001b") of the channel group 1, "0000b" or "0001b" is set.
In case of the sampling frequency Fs1=192 kHz ("0010b") of the channel group 1, "0000b", "0001b" or "0010b" is set.
In case of the sampling frequency Fs1=44.1 kHz ("1000b") of the channel group 1, "1000b" is set.
In case of the sampling frequency Fs1=88.2 kHz ("1001b") of the channel group 1, "1000b" or "1001b" is set.
In case of the sampling frequency Fs1=176.4 kHz ("1010b") of the channel group 1, "1000", "1001b" or "1010b" is set.

In the sixth embodiment, the linear PCM mode is adopted. As shown in FIG. 52, a private header of the linear PCM is composed of:
a sub-stream identification (ID) of 8 bits,
a reserve area of 4 bits,
an International Standard Recording Code (ISRC) number of 4 bits,
ISRC data of 8 bits,
A private header length of 8 bits, a first access unit pointer of 16 bits,
an audio emphasis flag F1 of 1 bit, and
an audio emphasis flag F2 of 1 bit.

In case of the sampling frequency Fs1=96 kHz or 88.2 kHz, the audio emphasis flag F1 is set to "0b" "emphasis-off".
In other cases, the audio emphasis flag F1 is set to "1b"="emphasis-on".
In case of the sampling frequency Fs2=192 kHz or 176.4 kHz, the audio emphasis flag F2 is set to "0b"="emphasis-off".
In other cases, the audio emphasis flag F2 is set to "1b"="emphasis-on".

Next, a reproducing processing performed in a reproducing apparatus according to the sixth embodiment is described with reference to FIG. 53 to FIG. 57.

Figure 53A:
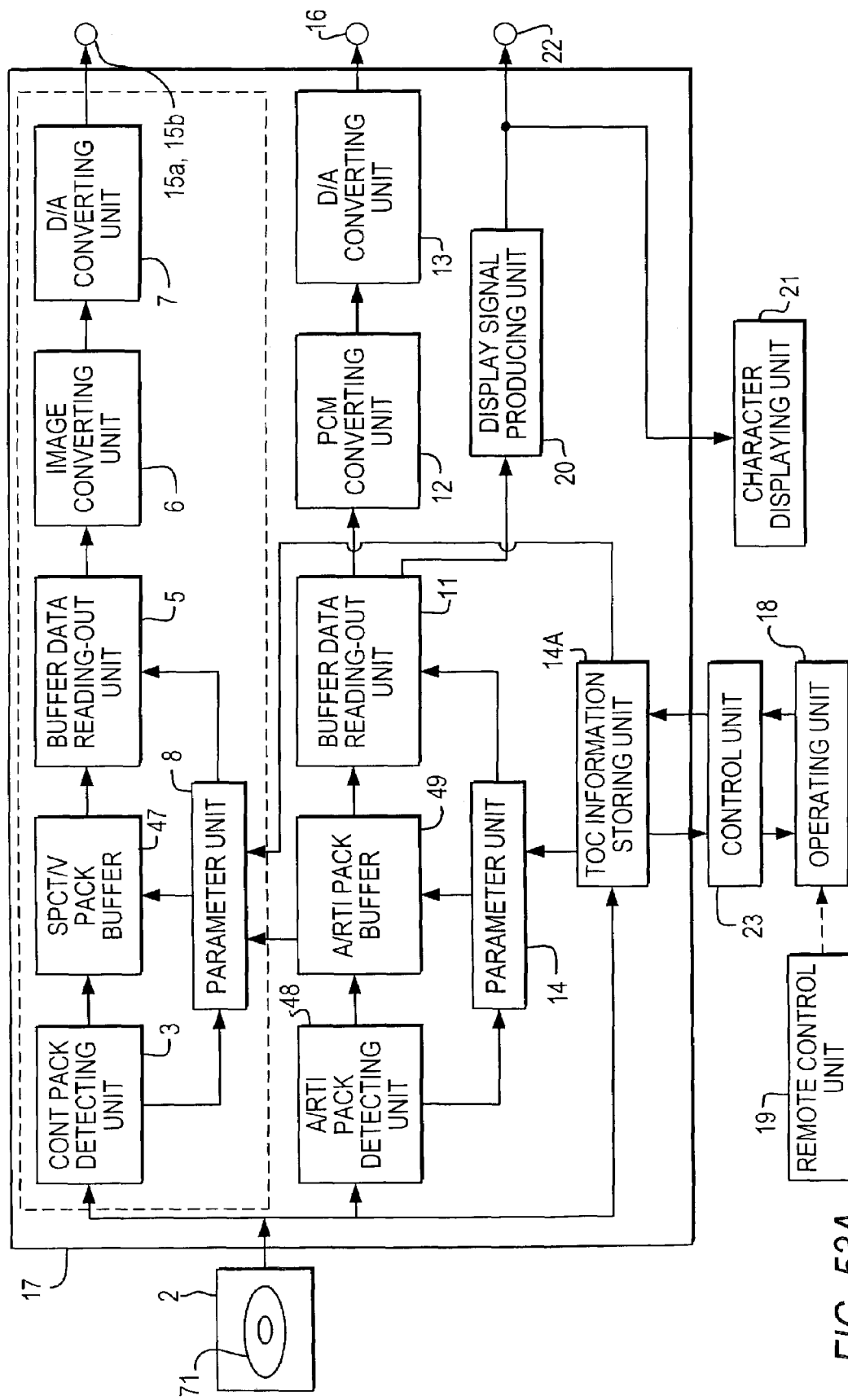
FIG. 53A is a block diagram showing a reproducing apparatus for the DVD-Avd disc shown in FIG. 46 and its peripheral devices according to the sixth embodiment of the present invention.
Figure 53B:
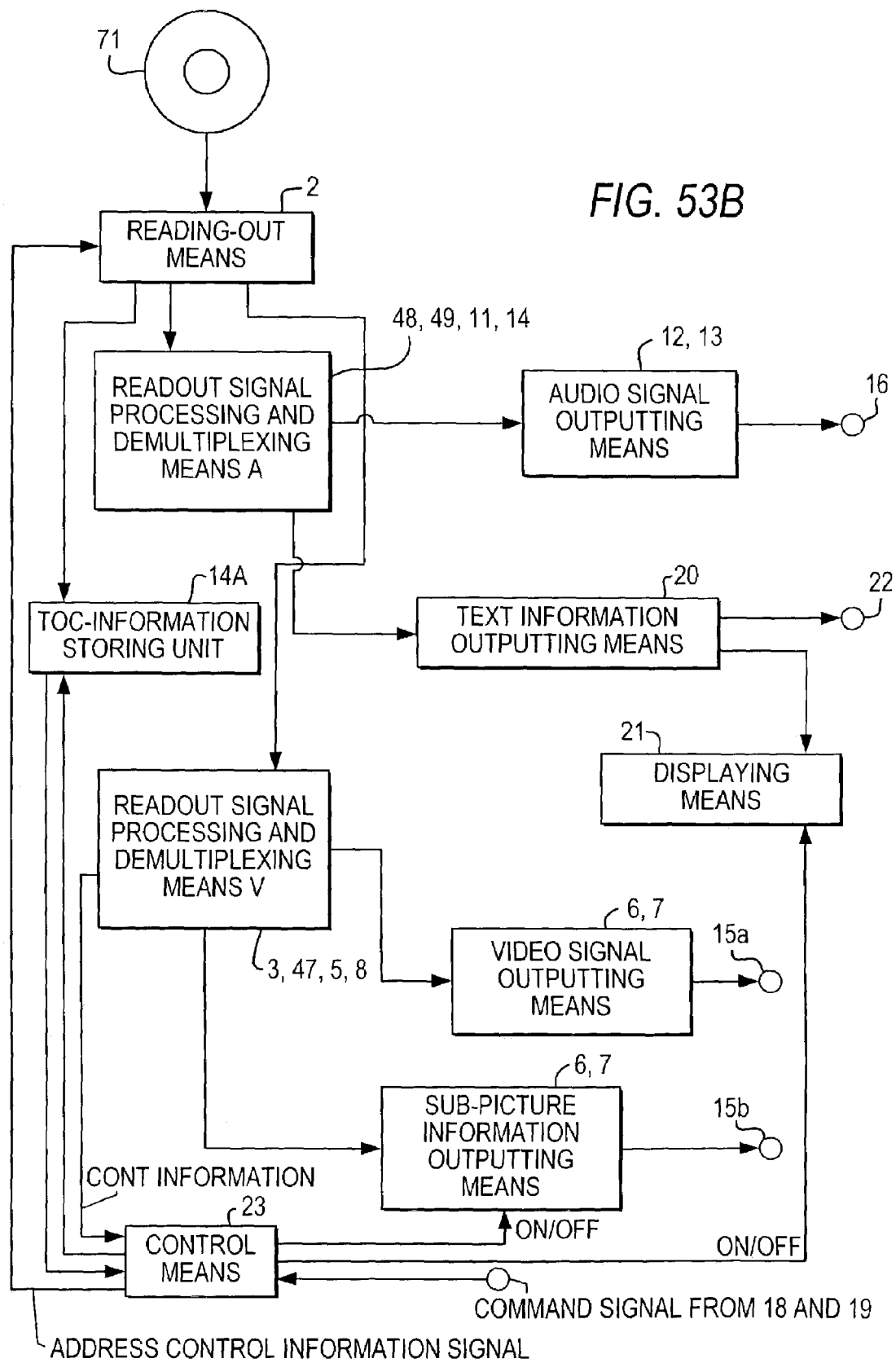
FIG. 53B is a block diagram functionally showing the reproducing apparatus shown in FIG. 53A and its peripheral devices according to the sixth embodiment.
Figure 54:
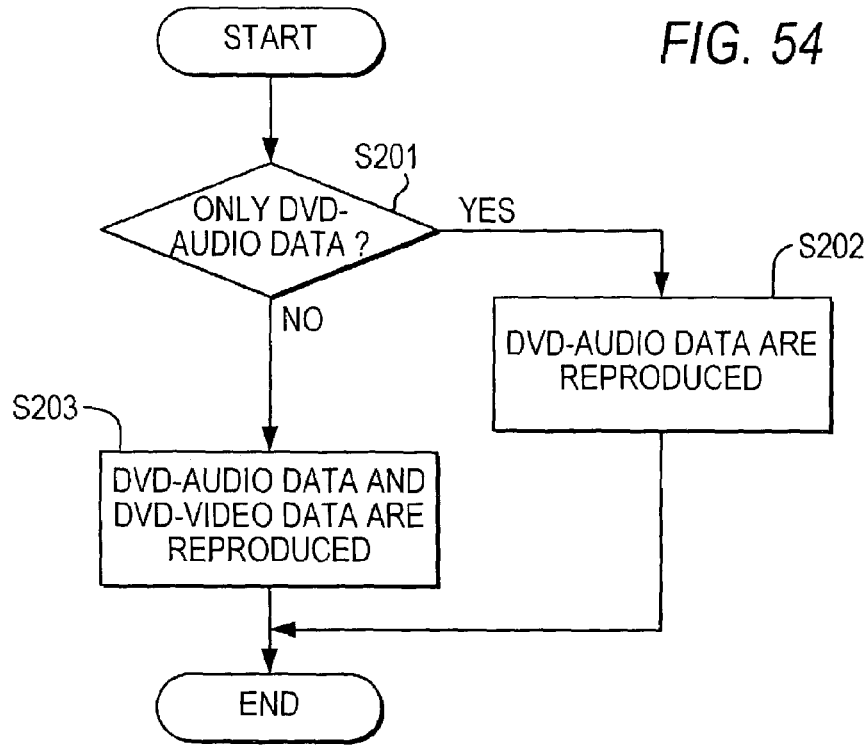
FIG. 54 is a flow chart showing a reproducing processing of an ATS and a VTS performed in a reproducing apparatus according to the sixth embodiment.

FIG. 53A is a block diagram showing a reproducing apparatus for the DVD-Avd disc shown in FIG. 46 and its peripheral devices according to the sixth embodiment of the present invention, FIG. 53B is a block diagram functionally showing the reproducing apparatus and its peripheral devices according to the sixth embodiment, and FIG. 54 is a flow chart showing a reproducing processing of an ATS and a VTS performed in a reproducing apparatus according to the sixth embodiment.

As shown in FIG. 53A and FIG. 53B and FIG. 54, it is judged in the control means 23 whether or not data recorded in a disc is only DVD-audio data or both DVD-video data and DVD-audio data according to a signal reproduced in the reproducing apparatus 17 (step S201). In cases where only DVD-audio data is recorded in the disc, it is judged that the disc is a DVD-audio disc shown in FIG. 50, and the AMG, the AMGM, the ATS<1> and the ATS<2> are processed and demultiplexed in the readout signal processing and demultiplexing means A (48, 49, 11, 14) and are output from the outputting means 12, 13 and 20. Therefore, audio signal and text information of the DVD-audio data are reproduced (step S202). In contrast, in cases where both DVD-video data and DVD-audio data are recorded in the disc (step S201), it is judged that the disc is the DVD-Avd disc 71 shown in FIG. 46, and the AMG, the AMGM, the ATS<1> and the ATS<2> of the DVD-audio data and the VMG, the VMGM, the VTS<1> and the VTS<2> of the DVD-video data are processed and demultiplexed in the readout signal processing and demultiplexing means A (48, 49, 11, 14) and the readout signal processing and demultiplexing means V (3, 47, 5, 8) and are output from the outputting means 6, 7, 12, 13 and 20. Therefore, video signal, sub-picture information and audio signal of the DVD-video data and text information of the DVD-audio data are reproduced (step S203). In this case, still picture data or real time information packed in each SPCT pack or RTI pack is detected in an audio and real time information (A/RTI) pack detecting unit 48 and is stored an A/RTI pack buffer 49, and a still picture or text information is reproduced and displayed.

Figure 55:
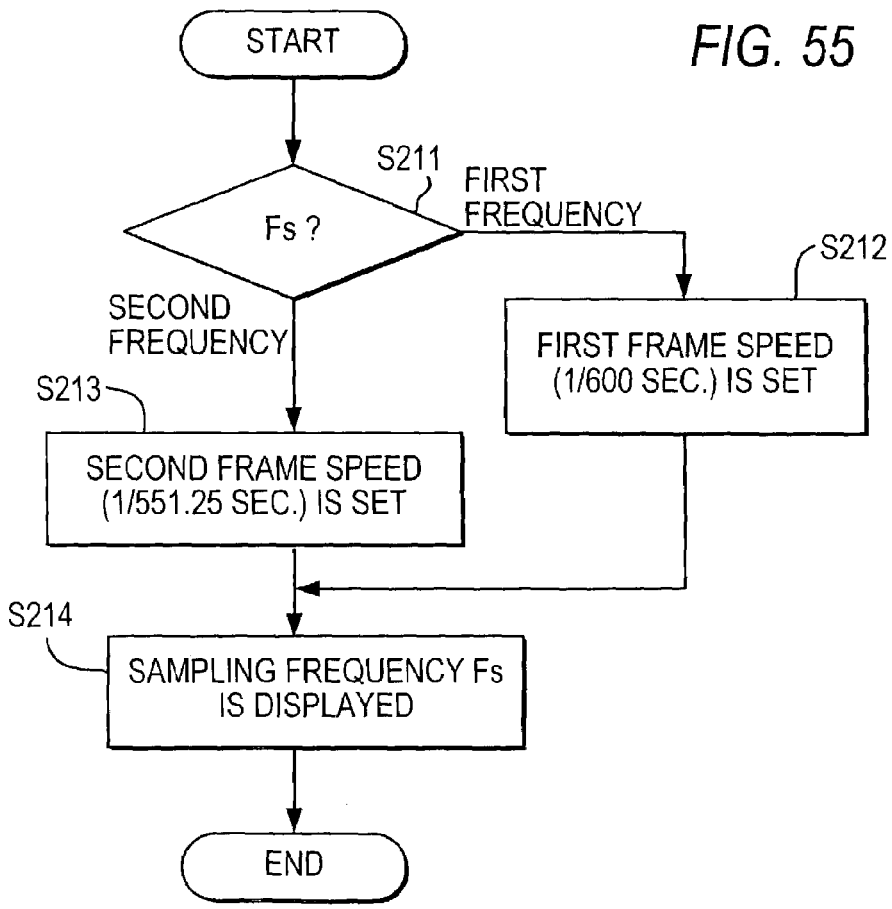
FIG. 55 is a flow chart showing a frame reproducing processing performed in correspondence to a sampling frequency of audio data in the reproducing apparatus according to the sixth embodiment.

FIG. 55 is a flow chart showing a frame reproducing processing performed in correspondence to a sampling frequency of audio data in the reproducing apparatus according to the sixth embodiment.

As shown in FIG. 53A, FIG. 53B and FIG. 55, it is judged in the control means 23 whether a sampling frequency Fs, at which an analog audio signal is converted into digital data to obtain audio data of an audio title set (ATS) recorded in the DVD-Avd disc 71, is a multiple of 48 kHz (48, 96 or 192 kHz) corresponding to a first frequency or is a multiple of 44.1 kHz (44.1, 88.2 or 176.4 kHz) corresponding to a second frequency (step S211). In cases where the sampling frequency Fs is the first frequency, a frame speed is set to a first frame speed (1/600 second) (step S212). In contrast, in cases where the sampling frequency Fs is the second frequency, a frame speed is set to a second frame speed (1/551.25 second) (step S213). Thereafter, the sampling frequency Fs judged in the step S211 is displayed in the displaying means 21 (step S214).

Figure 56:
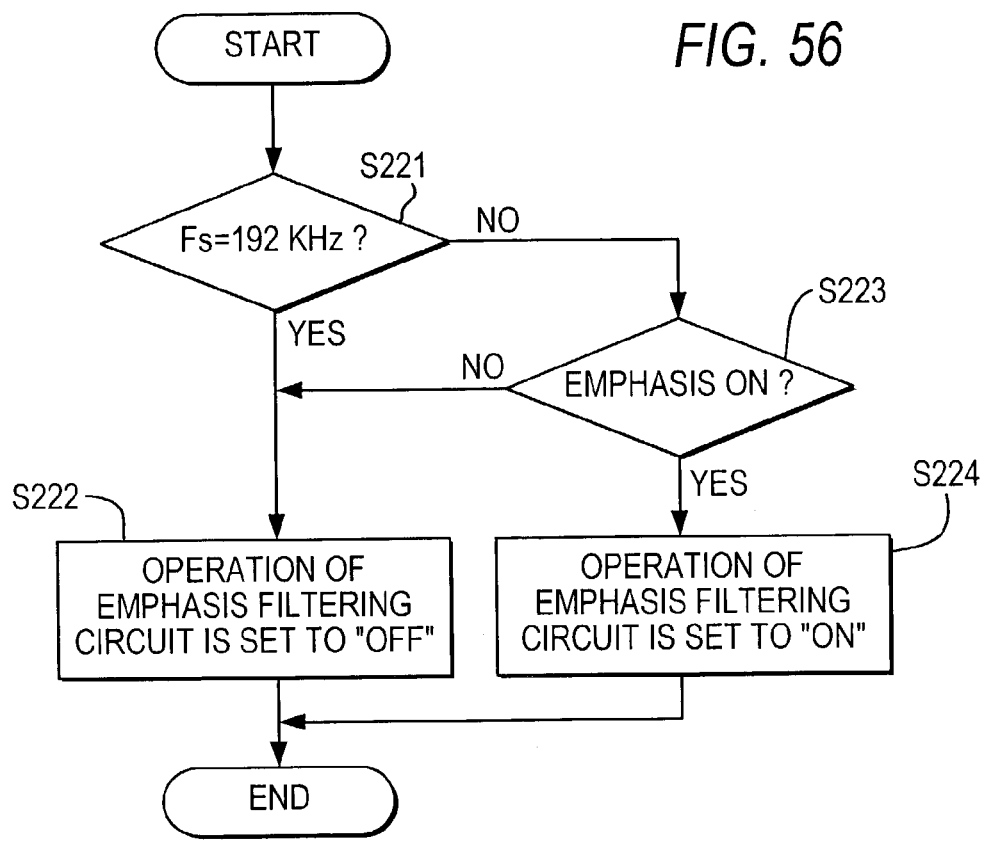
FIG. 56 is a flow chart showing an emphasis reproducing processing of audio data performed in the reproducing apparatus according to the sixth embodiment.

FIG. 56 is a flow chart showing an emphasis reproducing processing of audio data performed in the reproducing apparatus according to the sixth embodiment.

As shown in FIG. 53A, FIG. 53B and FIG. 56, it is judged in the control means 23 whether or not the sampling frequency Fs is 192 kHz (step S221). In cases where the sampling frequency Fs is 192 kHz, an filtering operation of an emphasis filtering circuit is set to an "off" condition (step S222). In contrast, in cases where the sampling frequency Fs is not 192 kHz, it is judged in the control means 23 whether or not an audio emphasis flag F is set in an "emphasis on" (step S223). In cases where the audio emphasis flag F is set in an "emphasis on", an operating condition of the emphasis filtering circuit is changed to an "on" condition (step S224). In contrast, in cases where the audio emphasis flag F is not set in an "emphasis on", an filtering operation of the emphasis filtering circuit is set to the "off" condition (step S222).

Figure 57:
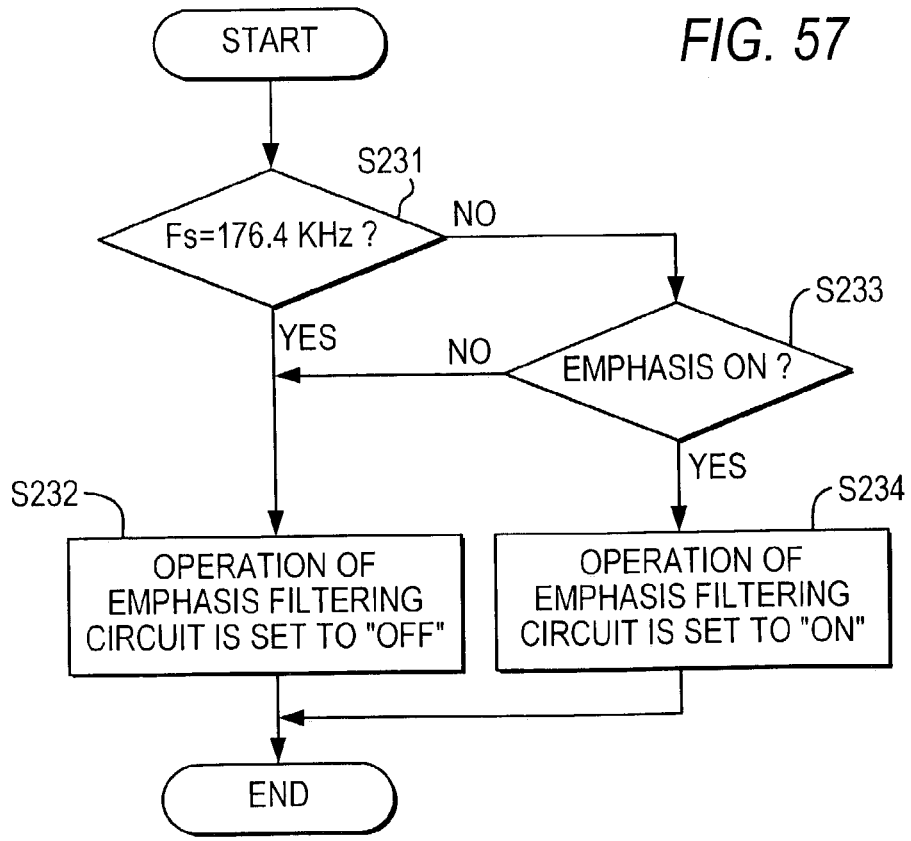
FIG. 57 is a flow chart showing another emphasis reproducing processing of audio data performed in the reproducing apparatus according to the sixth embodiment.

FIG. 57 is a flow chart showing another emphasis reproducing processing of audio data performed in the reproducing apparatus according to the sixth embodiment.

As shown in FIG. 53A, FIG. 53B and FIG. 57, it is judged in the control means 23 whether or not the sampling frequency Fs is 176.4 kHz (step S231). In cases where the sampling frequency Fs is 176.4 kHz, an filtering operation of an emphasis filtering circuit is set to an "off" condition (step S232). In contrast, in cases where the sampling frequency Fs is not 176.4 kHz, it is judged in the control means 23 whether or not the audio emphasis flag F is set in an "emphasis on" (step S233). In cases where the audio emphasis flag F is set in an "emphasis on", a filtering operation of the emphasis filtering circuit is changed to an "on" condition (step S234). In contrast, in cases where the audio emphasis flag F is not set in an "emphasis on", the filtering operation of the emphasis filtering circuit is set to the "off" condition (step S232).

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An apparatus for decoding a signal recorded on a disc, comprising:
   first means for decoding audio title set information (ATSI) into control information (SPCIT) for control of still picture data, the audio title set information (ATSI) existing in an audio title set (ATS) recorded on the disc;
   second means for decoding first and second packs in an audio object set (AOTT-AOBS) existing in the audio title set (ATS) recorded on the disc into audio data and real time information, respectively, and for decoding a third pack existing in a still-picture set (SPS) recorded on the disc into still picture data;
   third means for controlling and outputting the still picture data generated by the second means in response to the control information (SPCIT) generated by the first means; and
   fourth means for decoding audio manager menu data (AMGM) in a managing area (AMG).

* * * * *